under 35 U.S.C. 154(b) by 148 days.

(12) United States Patent
Yoneda

(10) Patent No.: US 7,784,577 B2
(45) Date of Patent: Aug. 31, 2010

(54) VEHICLE TACK-IN PREVENTION CONTROL DEVICE

(75) Inventor: Takeshi Yoneda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 148 days.

(21) Appl. No.: 12/285,174

(22) Filed: Sep. 30, 2008

(65) Prior Publication Data

US 2009/0120707 A1 May 14, 2009

(30) Foreign Application Priority Data

Oct. 1, 2007 (JP) ............................. 2007-258015

(51) Int. Cl.
*B60K 28/16* (2006.01)

(52) U.S. Cl. ........................................ 180/197; 701/72

(58) Field of Classification Search ................. 180/197; 701/70, 72, 82, 90
See application file for complete search history.

(56) References Cited

U.S. PATENT DOCUMENTS

| | | | | |
|---|---|---|---|---|
| 4,809,181 A * | 2/1989 | Ito et al. | ........................ | 701/70 |
| 5,132,908 A * | 7/1992 | Eto et al. | ........................ | 701/89 |
| 6,185,497 B1 * | 2/2001 | Taniguchi et al. | ............. | 701/70 |
| 6,208,929 B1 * | 3/2001 | Matsuno et al. | ................ | 701/89 |
| 6,374,162 B1 * | 4/2002 | Tanaka et al. | ................... | 701/1 |
| 6,438,474 B1 * | 8/2002 | Tanaka et al. | .................. | 701/41 |
| 6,873,896 B2 * | 3/2005 | Maekawa et al. | .............. | 701/69 |
| 7,455,142 B2 * | 11/2008 | Post, II | ........................ | 180/197 |

FOREIGN PATENT DOCUMENTS

| | | |
|---|---|---|
| JP | 2000-052953 | 2/2000 |
| JP | 2003-159966 | 6/2003 |
| JP | 2006-273102 | 10/2006 |
| JP | 2006-341828 | 12/2006 |

* cited by examiner

*Primary Examiner*—Tony H. Winner
(74) *Attorney, Agent, or Firm*—McGinn IP Law Group, PLLC

(57) ABSTRACT

In a driving-force distribution control unit, a first transfer-torque calculation unit calculates an input-torque sensitive transfer torque, a second transfer-torque calculation unit calculates a steering-angle/yaw-rate sensitive transfer torque, and a third transfer-torque calculation unit calculates a tack-in preventing transfer torque. In the third transfer-torque calculation unit, tack-in prevention control is performed during turning at a high speed not only when the accelerator opening is substantially reduced and the current accelerator opening becomes small, but also when the torque amount to be reduced by a traction control unit is more than a preset value. Further, when at least one of a side-slip prevention control unit and an ABS is started, tack-in prevention control is prohibited.

7 Claims, 27 Drawing Sheets

VEHICLE TACK-IN PREVENTION CONTROL DEVICE

CROSS-REFERENCE TO RELATED APPLICATIONS

The disclosure of Japanese patent Application No. 2007-258015 filed on Oct. 1, 2007 including the specification, drawings and abstract is incorporated herein by reference in it entirety.

BACKGROUND OF THE INVENTION

1. Field of the Invention

The present invention relates to a vehicle tack-in prevention control device having a traction control function of preventing slipping of driving wheels by reducing the over torque amount of the driving force calculated from a driving state of a vehicle, and a tack-in prevention control function of exerting tack-in prevention control when the accelerator opening is less than or equal to a predetermined value during turning of the vehicle. More particularly, the present invention relates to a vehicle tack-in prevention control device that properly prevents a tack-in phenomenon when traction control is exerted.

2. Description of the Related Art

When an accelerator pedal is released in a state in which the lateral acceleration is high, the cornering force of the front wheel side increases, and this may sometimes cause a tack-in phenomenon. In an all-wheel drive vehicle in which the longitudinal driving-force distribution can be changed by electronic control, the release of the accelerator pedal during turning is detected by an accelerator-opening sensor, and a front-rear driving-force distribution control unit is controlled so as to generate a yaw moment in a direction opposite the turning direction, thereby suppressing a tack-in phenomenon (tack-in prevention control) (for example, see Japanese Unexamined Patent Application Publication No. 2006-341828).

In the above-described publication, since tack-in prevention control is triggered by the accelerator opening, it can be exerted earlier before a vehicle behavior appears than the control triggered by the throttle opening. Therefore, it is effective to use the accelerator opening as a trigger for tack-in prevention control.

Traction control is known which reduces the driving force when the driving wheels are slipping or are likely to slip. However, when traction control is exerted during turning of the vehicle, the grounding load on the front wheels is increased by the reduction of driving force, and the cornering force of the front wheels is increased. In this case, a tack-in phenomenon may be promoted by traction control. For this reason, in a case in which tack-in prevention control is triggered by the accelerator opening that is dependent on the driver's operation, as in the technique disclosed in the above publication, even when traction control starts during turning of the vehicle, tack-in prevention control does not start unless the driver releases the accelerator pedal. Therefore, there is a fear that a tack-in phenomenon will not be prevented effectively. In particular, when traction control starts and the speed of the vehicle decreases, the driver does sometimes not operate the accelerator. Accordingly, the probability that tack-in prevention control will not start increases.

SUMMARY OF THE INVENTION

The present invention has been made in view of the above-described circumstances, and an object of the invention is to provide a vehicle tack-in prevention control device that can effectively perform tack-in prevention control even when traction control is started.

A vehicle tack-in prevention control device according to an aspect of the present invention includes traction control means for preventing a slip of a driving wheel by reducing an over torque of a driving force calculated from a driving state of a vehicle; and tack-in prevention control means for performing tack-in prevention control when the vehicle is in a turning state and an accelerator opening is less than or equal to a predetermined value. The tack-in prevention control means also performs the tack-in prevention control, regardless of the accelerator opening, when the vehicle is in the turning state and the traction control is started.

The vehicle tack-in prevention control device according to the present invention can effectively perform tack-in prevention control even when traction control is started.

DESCRIPTION OF THE PREFERRED EMBODIMENTS

An embodiment of the present invention will be described below with reference to the drawings.

FIGS. 1 to 32 show an embodiment of the present invention.

Figure 1:
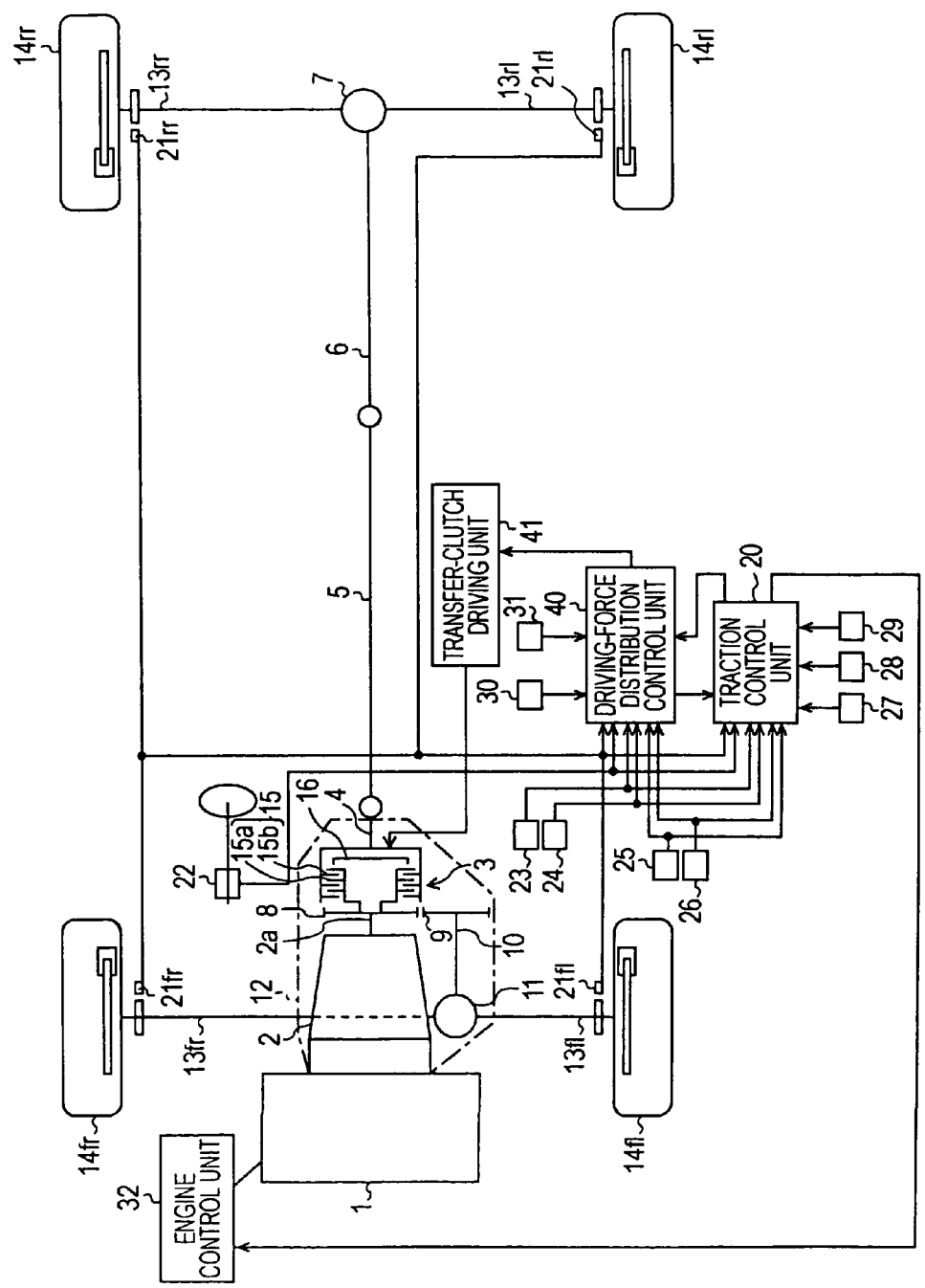
FIG. 1 is an explanatory view schematically showing the configuration of a driving system for the entire vehicle.

Referring to FIG. 1, an engine 1 is provided at the front of a vehicle. Driving force of the engine 1 is transmitted from an automatic transmission (including a torque converter in FIG. 1) 2 provided behind the engine 1 to a transfer 3 via a transmission output shaft 2a.

The driving force transmitted to the transfer 3 is input to a rear-wheel final reduction unit 7 via a rear drive shaft 4, a propeller shaft 5, and a drive bevel pinion shaft 6, and to a front-wheel final reduction unit 11 via a reduction drive gear 8, a reduction driven gear 9, and a front drive shaft 10 serving as a drive bevel pinion shaft. The automatic transmission 2, the transfer 3, the front-wheel final reduction unit 11 and so on are provided together in a case 12.

The driving force input to the rear-wheel final reduction unit 7 is transmitted to a left rear wheel 14rl via a left rear drive shaft 13rl, and to a right rear wheel 14rr via a right rear drive shaft 13rr.

In contrast, the driving force input to the front-wheel final reduction unit 11 is transmitted to a left front wheel 14fl via a left front drive shaft 13fl, and to a right front wheel 14fr via a right front drive shaft 13fr.

The transfer 3 includes a multiplate wet clutch (transfer clutch) 15 serving as a variable torque transmission capacity clutch, and a transfer piston 16. In the transfer clutch 15, drive plates 15a provided close to the reduction drive gear 8 and driven plates 15b provided close to the rear drive shaft 4 are stacked alternately. The transfer piston 16 variably supplies the engaging force (transfer torque: engaging torque) of the transfer clutch 15.

Therefore, this vehicle is a four-wheel drive vehicle of a front-engine front-drive vehicle base (FF base) in which the torque distribution ratio between the front wheels and the rear wheels can be changed within a range of 100:0 to 50:50 by controlling the pressing force of the transfer piston 16 so as to control the transfer torque of the transfer clutch 15.

The pressing force of the transfer piston 16 is given by a transfer-clutch driving unit 41 formed by a hydraulic circuit including a plurality of solenoid valves. A control signal (an output signal in accordance with the transfer torque to the solenoid valves) for driving the transfer-clutch driving unit 41 is output from a driving-force distribution control unit 40 that will be described below.

The vehicle also includes a traction control unit 20 serving as a traction control means. As will be described below, traction control is performed by the traction control unit 20, and driving-force distribution control is performed by the driving-force distribution control unit 40.

For this reason, the vehicle includes sensors and switches for detecting parameters necessary for the control. In other words, wheel speeds $\omega fl$, $\omega fr$, $\omega rl$, and $\omega rr$ from wheel speed sensors 21fl, 21fr, 21rl, and 21rr corresponding to the wheels 14fl, 14fr, 14fl, and 14rr, a steering wheel angle $\theta_H$ from a steering-wheel angle sensor 22, a lateral acceleration actually produced in the vehicle (hereinafter abbreviated as actual lateral acceleration) $(d^2y/dt^2)$ from a lateral-acceleration sensor 23, a yaw rate actually produced in the vehicle (hereinafter abbreviated as actual yaw rate) $\gamma$ from a yaw-rate sensor 24, an accelerator opening $\theta_{ACC}$ from an accelerator-opening sensor 25, and an engine speed $N_e$ from an engine-speed sensor 26 are input to the traction control unit 20 and the driving-force distribution control unit 40. Further, a throttle opening $\theta_{th}$ from a throttle-opening sensor 27, a main transmission gear ratio i from a transmission control unit 28, a turbine speed $N_t$ of the torque converter, and a road-surface friction coefficient $\mu$ from a road-surface friction coefficient estimating unit 29 are input to the traction control unit 20. The vehicle also includes a side-slip prevention control unit 30 serving as a side-slip prevention control means for preventing a side slip of the vehicle, and a known anti-lock brake system (ABS) 31 serving as an anti-lock brake control means for preventing the wheels from being locked, by controlling the braking force. Actuation signals from the side-slip prevention control unit 30 and the ABS 31 are input to the driving-force distribution control unit 40. For example, the above-described side-slip prevention control unit 30 compares an actual yaw moment with a target yaw moment obtained by using the equation of motion of the vehicle. The side-slip prevention control unit 30 prevents a side slip of the vehicle by adding a predetermined braking force to the rear wheel on the inner side of the turn when the vehicle is currently in an understeer driving condition, and adding a predetermined braking force to the rear wheel on the outer side of the turn when the vehicle is currently in an oversteer driving condition.

A proper driving force calculated from the above-described input signals by the traction control unit 20 is output as a control amount $T_{req}$ to the engine control unit 32, and a necessary torque down amount calculated by the traction control unit 20 is output as an over torque $T_{over}$ to the driving-force distribution control unit 40. The control amount $T_{rec}$ and the over torque $T_{over}$ will be described in detail below.

Further, a transfer torque $T_{LSD}$ calculated from the above-described input signals is output from the driving-force distribution control unit 40 to the transfer-clutch driving unit 41 and the traction control unit 20.

First, the traction control unit 20 will be described in detail.

Figure 2A:
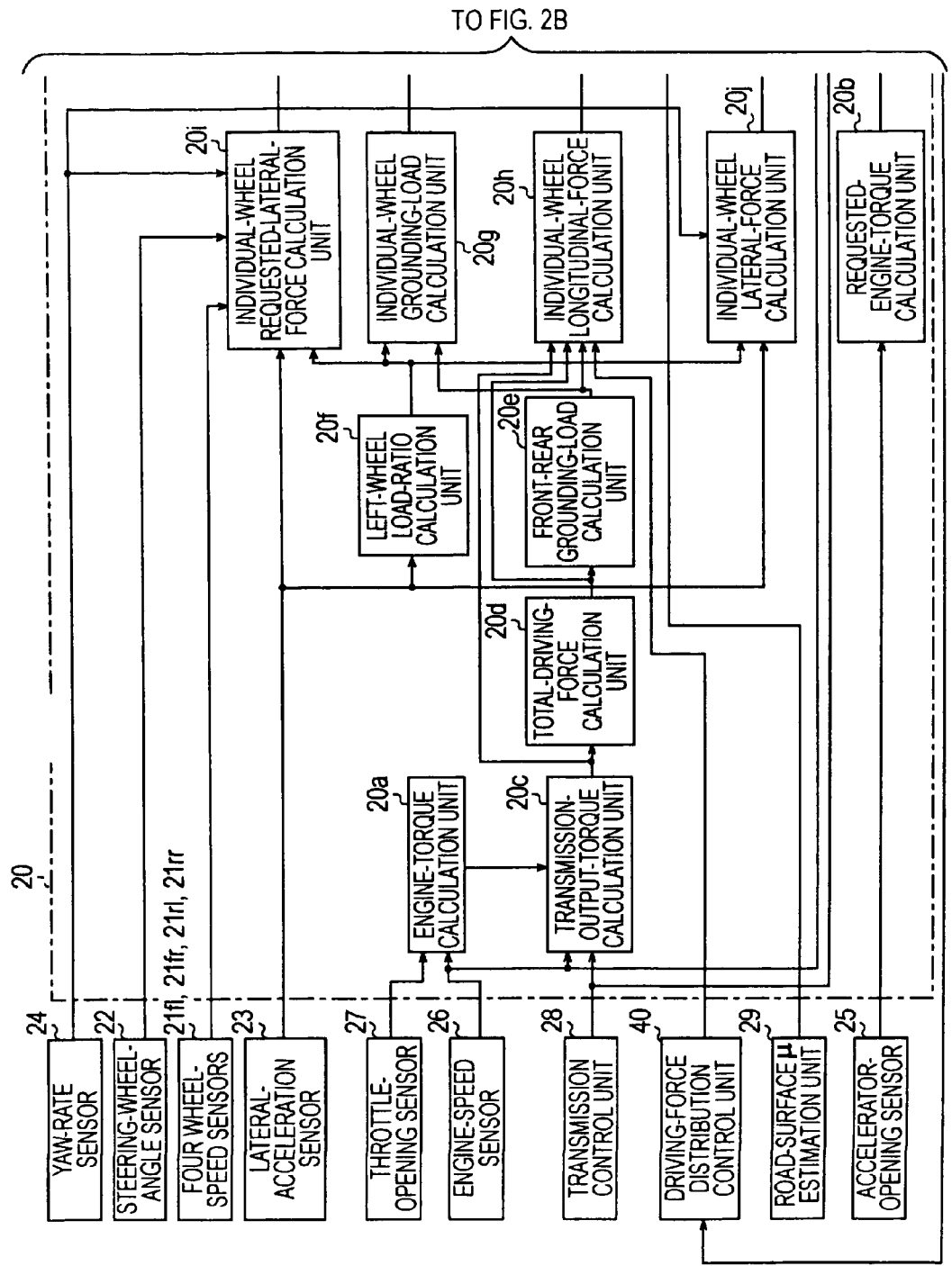
FIGS. 2A and 2B are functional block diagrams showing the configuration of a traction control unit.
Figure 2B:
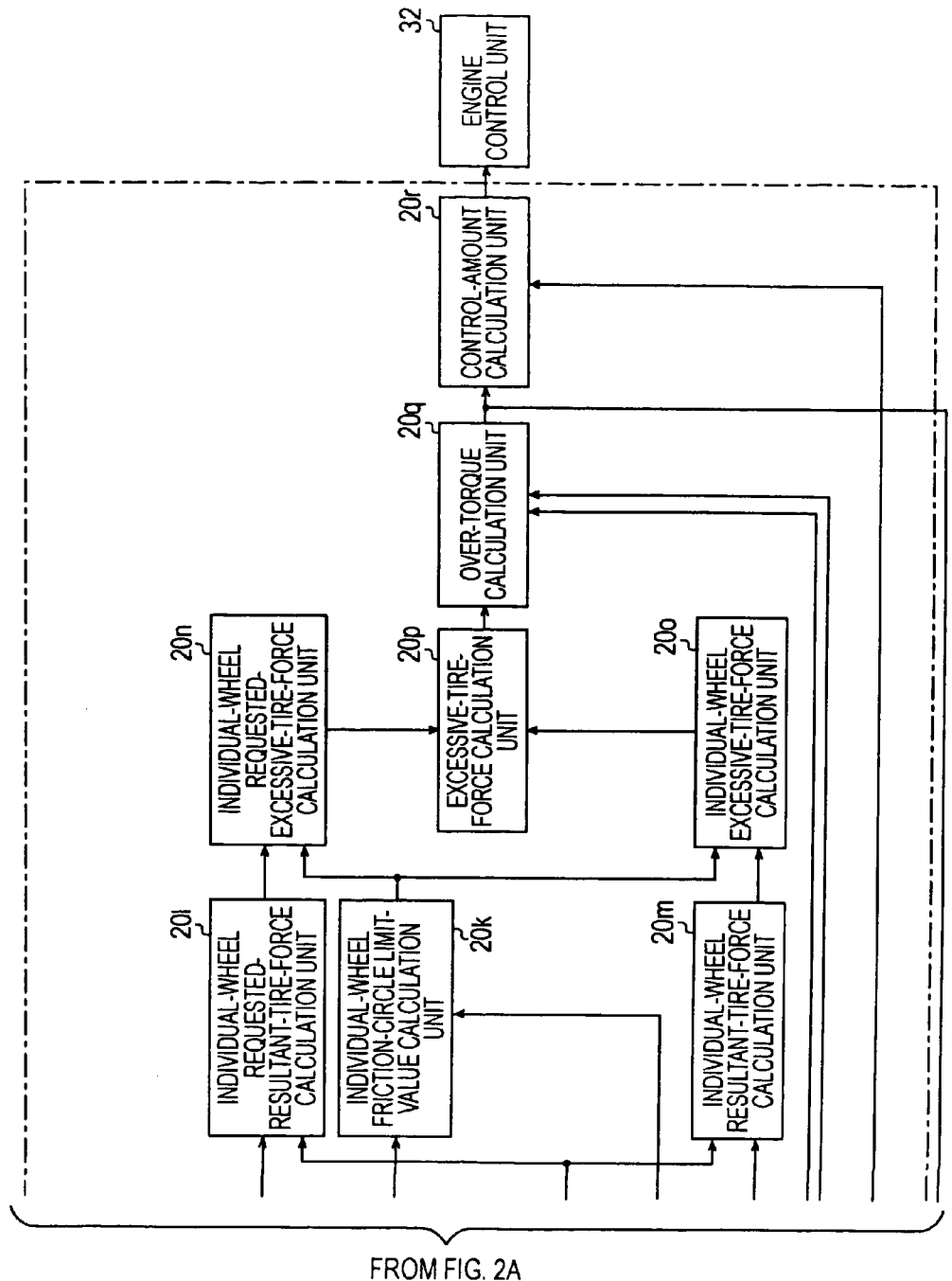

As shown in FIGS. 2A and 2B, the traction control unit 20 mainly includes an engine-torque calculation unit 20a, a required-engine-torque calculation unit 20b, a transmissionoutput-torque calculation unit 20c, a total-driving-force calculation unit 20d, a front-rear grounding-load calculation unit 20e, a left-wheel load-ratio calculation unit 20f, an individual-wheel grounding-load calculation unit 20g, an individual-wheel longitudinal-force calculation unit 20h, an individual-wheel requested-lateral-force calculation unit 20i, an individual-wheel lateral-force calculation unit 20j, an individual-wheel friction-circuit limit-value calculation unit 20k, an individual-wheel required-tire-resultant-force calculation unit 20l, an individual-wheel tire-resultant-force calculation unit 20m, an individual-wheel required-excessive-tire-resultant-force calculation unit 20n, an individual-wheel excessive-tire-resultant-force calculation unit 20o, an excessive-tire-force calculation unit 20p, an over-torque calculation unit 20q, and a control-amount calculation unit 20r.

The engine-torque calculation unit 20a receives a throttle opening $\theta_{th}$ from the throttle-opening sensor 27 and an engine speed $N_e$ from the engine-speed sensor 26. With reference to a map set beforehand on the basis of the engine characteristics (for example, a map shown in FIG. 5), the engine-torque calculation unit 20a finds an engine torque $T_{eg}$ produced currently, and outputs the engine torque $T_{eg}$ to the transmission-output-torque calculation unit 20c. The engine torque $T_{eg}$ may be read from the engine control unit 32.

The required-engine-torque calculation unit 20b receives an accelerator opening $\theta_{ACC}$ from the accelerator-opening sensor 25. Then, the required-engine-torque calculation unit 20b finds a throttle opening $\theta_{th}$ with reference to a preset map (for example, a map showing the relationship between $\theta_{ACC}$ and $\theta_{th}$ in FIG. 6), finds an engine torque $T_{eg}$ on the basis of the throttle opening $\theta_{th}$ with reference to the above-described map shown in FIG. 5, and outputs the engine torque $T_{eg}$ as a requested engine torque $T_{drv}$ to the control-amount calculation unit 20r. The requested engine torque $T_{drv}$ may be found with reference to a map set beforehand in accordance with the accelerator opening $\theta_{ACC}$, or may be read from the engine control unit 32.

The transmission-output-torque calculation unit 20c receives an engine speed $N_e$ from the engine-speed sensor 26, a main transmission gear ratio i from the transmission control unit 28, a turbine speed $N_t$ of the torque converter, and the engine torque $T_{eg}$ from the engine-torque calculation unit 20a.

For example, the transmission-output-torque calculation unit 20c calculates a transmission output torque $T_t$ according to the following Expression (1), and outputs the transmission output torque $T_t$ to the total-driving-force calculation unit 20d and the individual-wheel longitudinal-force calculation unit 20h:

$$T_t = T_{eg} \cdot t \cdot i \quad (1)$$

where t represents the torque ratio of the torque converter, which is found with reference to a preset map indicating the rotation speed ratio e ($=N_t/N_e$) of the torque converter and the torque ratio of the torque converter.

The total-driving-force calculation unit 20d receives the transmission output torque $T_t$ from the transmission-output-torque calculation unit 20c.

For example, the total-driving-force calculation unit 20d calculates a total driving force $F_x$ according to the following Expression (2), and outputs the total driving force $F_x$ to the front-rear grounding-load calculation unit 20e and the individual-wheel longitudinal-force calculation unit 20h:

$$F_x = T_t \cdot \eta \cdot if/R_t \quad (2)$$

where $\eta$ represents the driving-system transmission efficiency, if represents the final gear ratio, and $R_t$ represents the tire radius.

The front-rear grounding-load calculation unit 20e receives the total driving force $F_x$ from the total-driving-force calculation unit 20d. The front-rear grounding-load calculation unit 20e calculates a front-wheel grounding load $F_{zf}$ according to the following Expression (3), and outputs the front-wheel grounding load $F_{zf}$ to the individual-wheel grounding-load calculation unit 20g and the individual-wheel longitudinal-force calculation unit 20h. The front-rear grounding-load calculation unit 20e also calculates a rear-wheel grounding load $F_{zr}$ according to the following Expression (4), and outputs the rear-wheel grounding load $F_{zr}$ to the individual-wheel grounding-load calculation unit 20g:

$$F_{zf} = W_f - ((m \cdot (d^2x/dt^2) \cdot h)/L) \quad (3)$$

$$F_{zr} = W - F_{zf} \quad (4)$$

where $W_f$ represents the front-wheel static load, m represents the vehicle mass, $(d^2x/dt^2)$ represents the longitudinal acceleration ($=F_x/m$), h represents the height of center of gravity, L represents the wheel base, and W represents the vehicle weight ($=m \cdot G$; G represents the gravitational acceleration).

The left-wheel load-ratio calculation unit 20f receives an actual lateral acceleration ($d^2y/dt^2$) from the lateral-acceleration sensor 23. Then, the left-wheel load-ratio calculation unit 20f calculates a left-wheel load ratio WR__l according to the following Expression (5), and outputs the left-wheel load ratio WR__l to the individual-wheel grounding-load calculation unit 20g, the individual-wheel requested-lateral-force calculation unit 20i, and the individual-wheel lateral-force calculation unit 20j:

$$WR\_l = 0.5 - ((d^2y/dt^2)/G) \cdot (h/L_{tred}) \quad (5)$$

where $L_{tred}$ represents the average tread value of the front and rear wheels.

The individual-wheel grounding-load calculation unit 20g receives the front-wheel grounding load $F_{zf}$ and the rear-wheel grounding load $F_{zr}$ from the front-rear grounding-load calculation unit 20e, and the left-wheel load ratio WR__l from the left-wheel load-ratio calculation unit 20f. Then, the individual-wheel grounding-load calculation unit 20g calculates a left-front-wheel grounding load $F_{zf\_l}$, a right-front-wheel grounding load $F_{zf\_r}$, a left-rear-wheel grounding load $F_{zr\_l}$, and a right-rear-wheel grounding load $F_{zr\_r}$ according to the following Expressions (6), (7), (8), and (9), and outputs these values to the individual-wheel friction-force limit-value calculation unit 20k:

$$F_{zf\_l} = F_{zf} \cdot WR\_l \quad (6)$$

$$F_{zf\_r} = F_{zf} \cdot (1 - WR\_l) \quad (7)$$

$$F_{zr\_l} = F_{zr} \cdot WR\_l \quad (8)$$

$$F_{zr\_r} = F_{zr} \cdot (1 - WR\_l) \quad (9)$$

The individual-wheel longitudinal-force calculation unit 20h receives the transfer torque $T_{LSD}$ from the driving-force distribution control unit 40, the transmission output torque $T_t$ from the transmission-output-torque calculation unit 20c, the total driving force $F_x$ from the total-driving-force calculation unit 20d, and the front-wheel grounding load $F_{zf}$ from the front-rear grounding-load calculation unit 20e. For example, the individual-wheel longitudinal-force calculation unit 20h calculates a left-front-wheel longitudinal force $F_{xf\_l}$, a right-front-wheel longitudinal force $F_{xf\_r}$, a left-rear-wheel longitudinal force $F_{xr\_l}$, and a right-rear-wheel longitudinal force $F_{xr\_r}$ through the following procedure, and outputs these values to the individual-wheel requested-tire-resultant-force calculation unit 20l and the individual-wheel tire-resultant-force calculation unit 20m.

A description will be given below of an example of a procedure for calculating a left-front-wheel longitudinal force $F_{xf\_l}$, a right-front-wheel longitudinal force $F_{xf\_r}$, a left-rear-wheel longitudinal force $F_{xr\_l}$, and a right-rear-wheel longitudinal force $F_{xr\_r}$.

First, a front-wheel load distribution ratio $WR\_f$ is calculated according to the following Expression (10):

$$WR\_f = F_{zf}/W \tag{10}$$

Next, the minimum front-wheel longitudinal torque $T_{fmin}$ and the maximum front-wheel longitudinal torque $T_{fmax}$ are calculated according to the following Expressions (11) and (12):

$$T_{fmin} = T_t \cdot R_{f\_cd} - T_{LSD} (\geq 0) \tag{11}$$

$$T_{fmax} = T_t \cdot R_{f\_cd} + T_{LSD} (\geq 0) \tag{12}$$

Subsequently, the minimum front-wheel longitudinal force $F_{xmin}$ and the maximum front-wheel longitudinal force $F_{xmax}$ are calculated according to the following Expressions (13) and (14):

$$F_{xmin} = T_{fmin} \cdot \eta \cdot if/Rt \tag{13}$$

$$F_{xmax} = T_{fmax} \cdot \eta \cdot if/Rt \tag{14}$$

Then, state judgment is performed as follows:

(a) When $WR\_f \leq F_{xfmin}/F_x$, it is determined that the differential limit torque is increased to the rear wheel side, and a judgment value I is set at 1.

(b) When $WR\_f \geq F_{xfmax}/F_x$, it is determined that the differential limit torque is increased to the front wheel side, and a judgment value I is set at 3.

(c) In other cases, it is determined that the state is normal, and a judgment value I is set at 2.

Next, a front-wheel longitudinal force $F_{xf}$ is calculated from the above-described judgment value I as follows:

(1) When $I=1$, $F_{xf} = T_{fmin} \cdot \eta \cdot if/Rt$ \hfill (15)

(2) When $I=2$, $F_{xf} = F_x \cdot WR\_f$ \hfill (16)

(3) When $I=3$, $F_{xf} = T_{fmax} \cdot \eta \cdot if/Rt$ \hfill (17)

Then, according to the following Expression (18), a rear-wheel longitudinal force $F_{xr}$ is calculated from the front-wheel longitudinal force $F_{xf}$ that is calculated according to the above Expression (15), (16), or (17):

$$F_{xr} = F_x - F_{xf} \tag{18}$$

By using the front-wheel longitudinal force $F_{xf}$ and the rear-wheel longitudinal force $F_{xr}$ described above, a left-front-wheel longitudinal force $f_{xf\_l}$, a right-front-wheel longitudinal force $F_{xf\_r}$, a left-rear-wheel longitudinal force $F_{xr\_l}$, and a right-rear-wheel longitudinal force $F_{xr\_r}$ are calculated according to the following Expressions (19) to (22):

$$F_{xf\_l} = F_{xf}/2 \tag{19}$$

$$F_{xf\_r} = F_{xf\_l} \tag{20}$$

$$F_{xr\_l} = F_{xr}/2 \tag{21}$$

$$F_{xr\_r} = F_{xr\_l} \tag{22}$$

The calculation methods of the longitudinal forces of the wheels described in this embodiment are just exemplary, and calculation methods can be appropriately selected, for example, in accordance with the driving manner of the vehicle and the driving mechanism.

The individual-wheel requested-lateral-force calculation unit 20i receives the actual lateral acceleration ($d^2y/dt^2$) from the lateral-acceleration sensor 23, an actual yaw rate γ from the yaw-rate sensor 24, a steering wheel angle $\theta_H$ from the steering-wheel-angle sensor 22, wheel speeds ωfl, ωfr, ωrl, and ωrr from the wheel-speed sensors 21fl, 21fr, 21rl, and 21rr for the wheels (four wheels), and the left-wheel load ratio $WR\_l$ from the left-wheel load-ratio calculation unit 20f.

According to the following procedure (according to a flow-chart shown in FIG. 7), the individual-wheel requested-lateral-force calculation unit 20i calculates an additional yaw moment $M_Z\theta$, calculates a requested front-wheel lateral force $F_{yf\_FF}$ on the basis of the additional yaw moment $M_Z\theta$ according to the following Expression (23), and calculates a requested rear-wheel lateral force $F_{yr\_FF}$ according to the following Expression (24). On the basis of the requested front-wheel lateral force $F_{yf\_FF}$ and the requested rear-wheel lateral force $F_{yr\_FF}$, the individual-wheel requested-lateral-force calculation unit 20i calculates a left-front-wheel requested lateral force $F_{yf\_l\_FF}$, a right-front-wheel requested lateral force $F_{yf\_r\_FF}$, a left-rear-wheel requested lateral force $F_{yr\_l\_FF}$, and a right-rear-wheel requested lateral force $F_{yr\_r\_FF}$ according to the following Expressions (25) to (28), and outputs these values to the individual-wheel requested tire-resultant-force calculation unit 20l:

$$F_{yf\_FF} = M_Z\theta/L \tag{23}$$

$$F_{yr\_FF} = (-Iz \cdot (d\gamma/dt) + m \cdot (d^2y/dt^2) \cdot Lf)/L \tag{24}$$

where Iz represents the yaw moment of inertia of the vehicle, and Lf represents the distance between the front shaft and the center of gravity.

$$F_{yf\_l\_FF} = F_{yf\_FF} \cdot W_{R\_l} \tag{25}$$

$$F_{yf\_r\_FF} = F_{yf\_FF} \cdot (1 - W_{R\_l}) \tag{26}$$

$$F_{yr\_l\_FF} = F_{yr\_FF} \cdot W_{R\_l} \tag{27}$$

$$F_{yr\_r\_FF} = F_{yr\_FF} \cdot (1 - W_{R\_l}) \tag{28}$$

Figure 7:
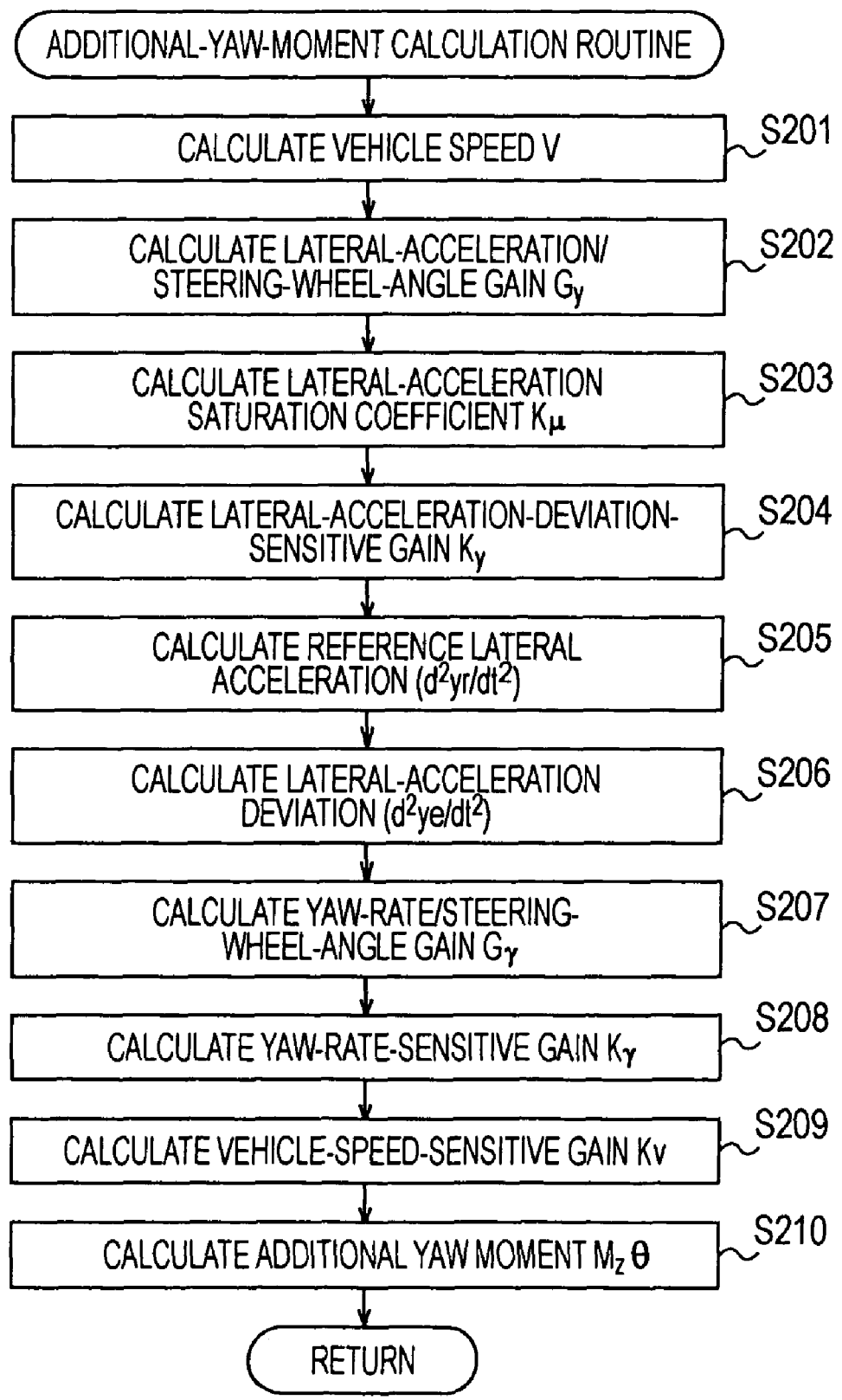
FIG. 7 is a flowchart of a an additional-yaw-moment calculation routine.

In order to calculate the additional yaw moment $M_Z\theta$, as shown in FIG. 7, a vehicle speed V is first calculated in Step (hereinafter abbreviated as "S") 201 (for example, V=(ωfl+ωfr+ωrl+ωrr)/4), and a lateral-acceleration/steering-wheel-angle gain Gy is calculated according to the following Expression (29) in S202:

$$Gy = (1/(1 + A \cdot V^2)) \cdot (V^2/L) \cdot (1/n) \tag{29}$$

where A represents the stability factor, and n represents the steering gear ratio.

Figure 8A:
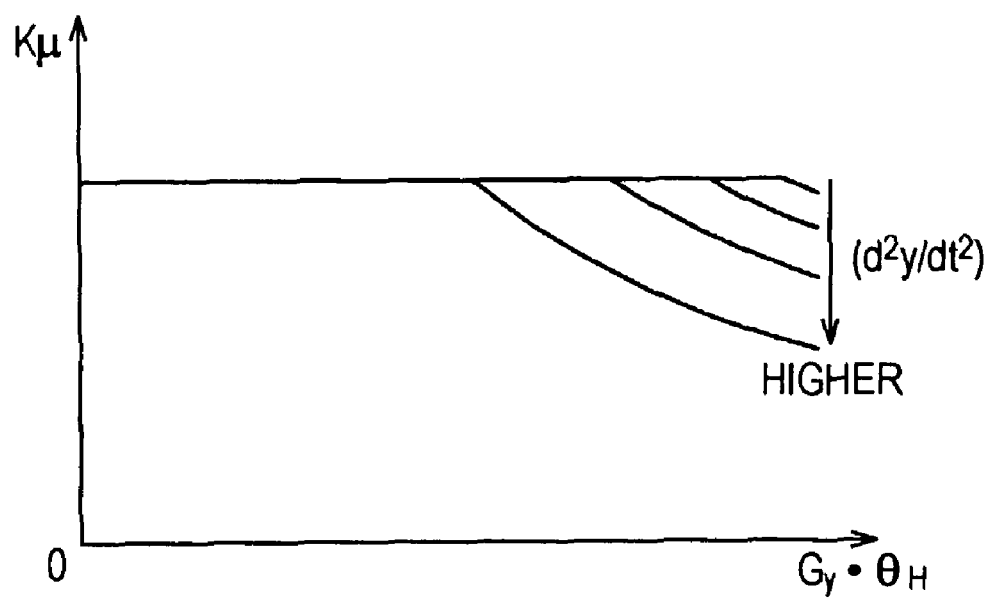
FIGS. 8A and 8B are explanatory views showing a lateral acceleration saturation coefficient.
Figure 8B:
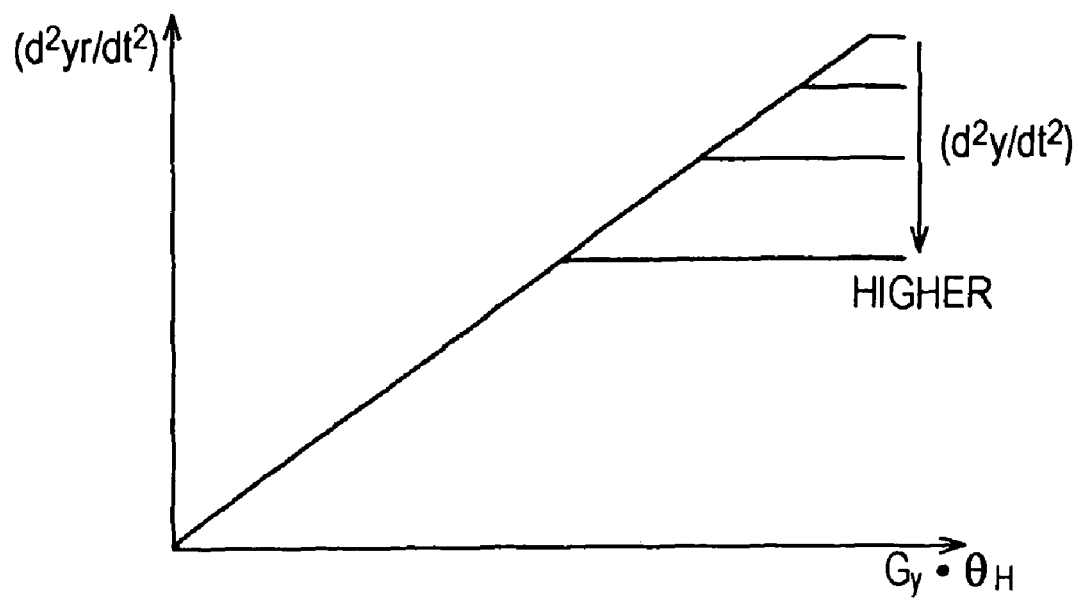

In S203, a lateral-acceleration saturation coefficient Kμ is calculated with reference to a map set beforehand in accordance with the product of the lateral-acceleration/steering-wheel-angle gain Gy and the steering wheel angle $\theta_H$ (Gy·$\theta_H$) and the lateral acceleration ($d^2y/dt^2$). The map for obtaining the lateral-acceleration saturation coefficient Kμ is preset in accordance with the product of the lateral-acceleration/steering-wheel-angle gain Gy and the steering wheel angle $\theta_H$ (Gy·$\theta_H$) and the lateral acceleration ($d^2y/dt^2$), as shown in FIG. 8A. When the steering wheel angle $\theta_H$ is more than or equal to a predetermined value, the lateral-acceleration saturation coefficient Kμ is set to decrease as the lateral acceleration $(d^2y/dt^2)$ increases. In other words, while the lateral acceleration $(d^2y/dt^2)$ increases as the friction coefficient μ of the road increases when $Gy \cdot \theta_H$ is large, a lateral acceleration $(d^2y/dt^2)$ is not easily produced when the friction coefficient μ of the road is low. Accordingly, a reference lateral acceleration $(d^2yr/dt^2)$, which will be described below, is set at a low value when $Gy \cdot \theta_H$ is large, the lateral acceleration $(d^2y/dt^2)$ is high, and the road surface seems to have a high friction coefficient μ, as shown in FIG. 8B, so that the correction amount of the additional yaw moment $M_Z\theta$ is small.

Next, in S204, a lateral-acceleration-deviation sensitive gain Ky is calculated according to the following Expression (30):

$$Ky = K\theta/Gy \quad (30)$$

where Kθ represents the steering-angle sensitive gain, which is calculated according to the following Expression (31):

$$K\theta = (Lf \cdot Kf)/n \quad (31)$$

where Kf represents the equivalent cornering power of the front shaft.

In other words, the lateral-acceleration deviation sensitive gain Ky is calculated according to the above-described Expression (30) so as to become the maximum value when the additional yaw moment $M_Z\theta$ (steady-state value) is 0 in a state in which steering is completely impossible on the road surface having an extremely low friction coefficient μ (γ=0, $(d^2y/dt^2)=0$).

Next, in S205, a reference lateral acceleration $(d^2yr/dt^2)$ is calculated according to the following Expression (32):

$$(d^2yr/dt^2) = K\mu \cdot Gy \cdot (1/(1+Ty \cdot s)) \cdot \theta_H \quad (32)$$

where s is a differential operator, and Ty is a first-order delay time constant of the lateral acceleration. For example, the first-order delay time constant Ty is calculated according to the following Expression (33):

$$Ty = Iz/(L \cdot Kr) \quad (33)$$

where Kr represents the equivalent cornering power of the rear shaft.

Next, in S206, a lateral acceleration deviation $(d^2ye/dt^2)$ is calculated according to the following Expression (34):

$$(d^2ye/dt^2) = (d^2y/dt^2) - (d^2yr/dt^2) \quad (34)$$

In S207, a yaw-rate/steering-wheel-angle gain Gγ is calculated according to the following Expression (35):

$$G\gamma = (1/(1+A \cdot V^2)) \cdot (V/L) \cdot (1/n) \quad (35)$$

In S208, for example, a yaw-rate sensitive gain Kγ is calculated according to the following Expression (36), in consideration of a case in which the additional yaw moment $M_Z\theta$ (steady-state value) is 0 during grip driving $((d^2ye/dt^2)=0)$:

$$K\gamma = K\theta/G\gamma \quad (36)$$

Figure 9:
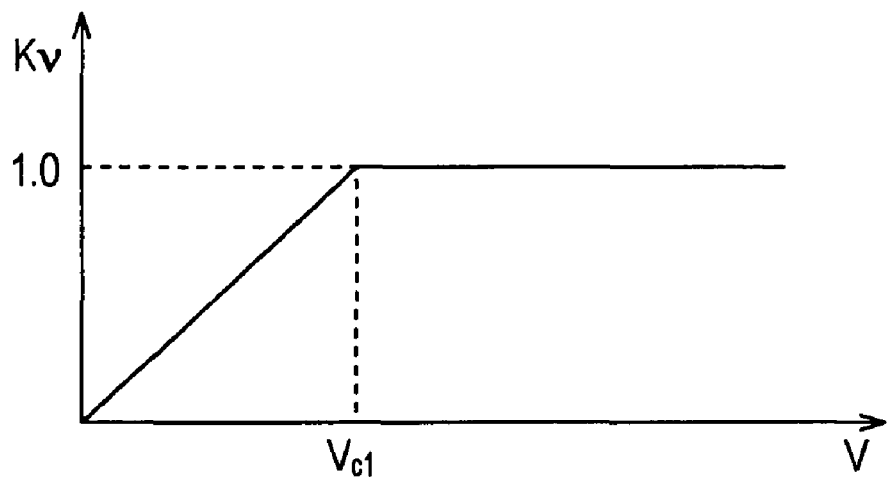
FIG. 9 is a characteristic map of a vehicle-speed sensitive gain.

In S209, a vehicle-speed sensitive gain Kv is calculated from a preset map. For example, this map is set to avoid an unnecessary additional yaw moment $M_Z\theta$ in the low speed region, as shown in FIG. 9. In FIG. 9, Vcl is, for example, 40 km/h.

In S210, an additional yaw moment $M_Z\theta$ is calculated according to the following Expression (37):

$$M_Z\theta = Kv \cdot (-K\gamma \cdot \gamma + Ky \cdot (d^2ye/dt^2) + K\theta \cdot \theta_H) \quad (37)$$

Figure 10:
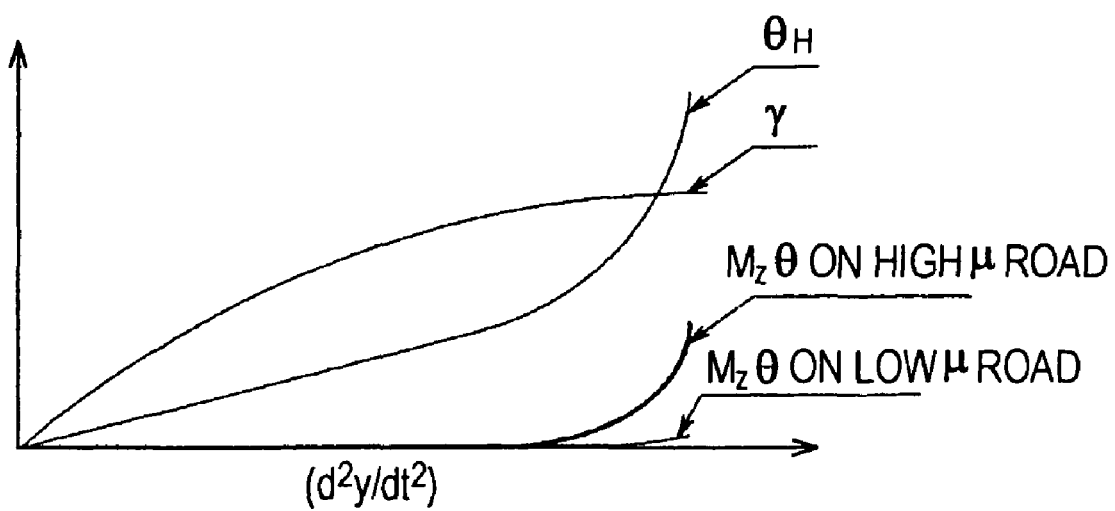
FIG. 10 is an explanatory view showing the difference in additional yaw moment between road having a road having a high friction coefficient and a road having a low friction coefficient.

In other words, as shown in this Expression (37), the term $-K\gamma \cdot \gamma$ represents the yaw moment that is sensitive to the yaw rate γ, the term $K\theta \cdot \theta_H$ represents the yaw moment that is sensitive to the steering wheel angle $\theta_H$, and the term $Ky \cdot (d^2ye/dt^2)$ represents the correction value of the yaw moment. For this reason, as shown in FIG. 10, when driving is performed with a high lateral acceleration $(d^2y/dt^2)$ on the road having a high friction coefficient, the additional yaw moment $M_Z\theta$ increases, and the motion performance increases. In contrast, when driving is performed on the road having a low friction coefficient, the additional yaw moment $M_Z\theta$ is reduced by the above-described correction value. Therefore, the cornering ability will not increase, and a stable running performance can be obtained.

The individual-wheel lateral-force calculation unit 20j receives the actual lateral acceleration $(d^2y/dt^2)$ from the lateral-acceleration sensor 23, the actual yaw rate γ from the yaw-rate sensor 24, and the left-wheel load ratio $WR\_{_l}$ from the left-wheel load-ratio calculation unit 20f. The individual-wheel lateral-force calculation unit 20j calculates a front-wheel lateral force $F_{yf\_FB}$ according to the following Expression (38), and calculates a rear-wheel lateral force $F_{yr\_FB}$ according to the following Expression (39). On the basis of the front-wheel lateral force $F_{yf\_FB}$ and the rear-wheel lateral force $F_{yr\_FB}$, the individual-wheel lateral-force calculation unit 20j calculates a left-front-wheel lateral force $F_{yf\_l\_FB}$, a right-front-wheel lateral force $F_{yf\_r\_FB}$, a left-rear-wheel lateral force $F_{yr\_l\_FB}$, and a right-rear-wheel lateral force $F_{yr\_r\_FB}$ according to the following Expressions (40) to (43), and outputs these values to the individual-wheel tire-resultant-force calculation unit 20m:

$$F_{yf\_FB} = (Iz \cdot (d\gamma/dt) + m \cdot (d^2y/dt^2) \cdot Lr)/L \quad (38)$$

$$F_{yr\_FB} = (-Iz \cdot (d\gamma/dt) + m \cdot (d^2y/dt^2) \cdot Lf)/L \quad (39)$$

where Lr represents the distance between the rear shaft and the center of gravity.

$$F_{yf\_l\_FB} = F_{yf\_FB} \cdot W_{R\_1} \quad (40)$$

$$F_{yf\_r\_FB} = F_{yf\_FB} \cdot (1 - W_{R\_1}) \quad (41)$$

$$Fy_{r\_l\_FB} = F_{yr\_FB} \cdot W_{R\_1} \quad (42)$$

$$F_{yr\_r\_FB} = F_{yr\_FB} \cdot (1 - W_{R\_1}) \quad (43)$$

The individual-wheel friction-circle limit-value calculation unit 20k receives the road-surface friction coefficient μ from the road-surface friction coefficient estimating unit 29, and the left-front-wheel grounding load $F_{zf\_l}$, the right-front-wheel grounding load $F_{zf\_r}$, the left-rear-wheel grounding load $F_{zr\_l}$, and the right-rear-wheel grounding load $F_{zr\_r}$ from the individual-wheel grounding-load calculation unit 20g.

Then, the individual-wheel friction-circle limit-value calculation unit 20k calculates a left-front-wheel friction-circle limit-value $\mu\_{Ffl}$, a right-front-wheel friction-circle limit-value $\mu\_{Ffr}$, a left-rear-wheel friction-circle limit-value $\mu\_{Frl}$, and a right-rear-wheel friction-circle limit-value $\mu\_{Frr}$ according to the following Expressions (44) to (47), and outputs these values to the individual-wheel requested-excessive-tire-force calculation unit 20n and the individual-wheel excessive-tire-force calculation unit 20o:

$$\mu\_{Ffl} = \mu \cdot F_{zf\_l} \quad (44)$$

$$\mu\_{Ffr} = \mu \cdot F_{zf\_r} \quad (45)$$

$$\mu\_{Frl} = \mu \cdot F_{zr\_l} \quad (46)$$

$$\mu\_{Frr} = \mu \cdot F_{zr\_r} \quad (47)$$

The individual-wheel requested-tire-resultant-force calculation unit 20*l* receives the left-front-wheel longitudinal force $F_{xf\_l}$, the right-front-wheel longitudinal force $Fx_{f\_r}$, the left-rear-wheel longitudinal force $F_{xr\_l}$, and the right-rear-wheel longitudinal force $F_{xr\_r}$ from the individual-wheel longitudinal-force calculation unit 20*h*, and the left-front-wheel requested lateral force $F_{yf\_l\_FF}$, the right-front-wheel requested lateral force $F_{yf\_r\_FF}$, the left-rear-wheel requested lateral force $F_{yr\_l\_FF}$, and the right-rear-wheel requested lateral force $F_{yr\_r\_FF}$ from the individual-wheel requested-lateral-force calculation unit 20*i*. The, the individual-wheel requested-tire-resultant-force calculation unit 20*l* calculates a left-front-wheel requested tire resultant force $F\_fl\_FF$, a right-front-wheel requested tire resultant force $F\_fr\_FF$, a left-rear-wheel requested tire resultant force $F\_rl\_FF$, and a right-rear-wheel requested tire resultant force $F\_rr\_FF$ according to the following Expressions (48) to (51), and outputs these values to the individual-wheel requested-excessive-tire-force calculation unit 20*n*:

$$F\_fl\_FF = (Fxf\_l^2 + Fyf\_lFF^2)^{1/2} \tag{48}$$

$$F\_fr\_FF = (Fxf\_r^2 + Fyf\_rFF^2)^{1/2} \tag{49}$$

$$F\_rl\_FF = (Fxr\_l^2 + Fyr\_lFF^2)^{1/2} \tag{50}$$

$$F\_rr\_FF = (Fxr\_r^2 + Fyr\_rFF^2)^{1/2} \tag{51}$$

The individual-wheel tire-resultant-force calculation unit 20*m* receives the left-front-wheel longitudinal force Fxf_l, the right-front-wheel longitudinal force Fxf_r, the left-rear-wheel longitudinal force Fxr_l, and the right-rear-wheel longitudinal force Fxr_r from the individual-wheel longitudinal-force calculation unit 20*h*, and the left-front-wheel lateral force Fyf_l_FB, the right-front-wheel lateral force Fyf_r_FB, the left-rear-wheel lateral force Fyr_l_FB, and the right-rear-wheel lateral force Fyr_r_FB from the individual-wheel lateral-force calculation unit 20*j*. Then, the individual-wheel tire-resultant-force calculation unit 20*m* calculates a left-front-wheel tire resultant force F_fl_FB, a right-front-wheel tire resultant force F_fr_FB, a left-rear-wheel tire resultant force F_rl_FB, and a right-rear-wheel tire resultant force F_rr_FB according to the following Expressions (52) to (55), and outputs these values to the individual-wheel excessive-tire-force calculation unit 20*o*:

$$F\_fl\_FB = (Fxf\_l^2 + Fyf\_l\_FB^2)^{1/2} \tag{52}$$

$$F\_fr\_FB = (Fxf\_r^2 + Fyf\_r\_FB^2)^{1/2} \tag{53}$$

$$F\_rl\_FB = (Fxr\_l^2 + Fyr\_l\_FB^2)^{1/2} \tag{54}$$

$$F\_rr\_FB = (Fxr\_r^2 + Fyr\_r\_FB^2)^{1/2} \tag{55}$$

The individual-wheel requested-excessive-tire-force calculation unit 20*n* receives the left-front-wheel friction-circle limit value μ_Fzfl, the right-front-wheel friction-circle limit value μ_Fzfr, the left-rear-wheel friction-circle limit value μ_Fzrl, and the right-rear-wheel friction-circle limit value μ_Fzrr from the individual-wheel friction-circle-limit-value calculation unit 20*k*, and the left-front-wheel requested tire resultant force F_fl_FF, the right-front-wheel requested tire resultant force F_fr_FF, the left-rear-wheel requested tire resultant force F_rl_FF, and the right-rear-wheel requested tire resultant force F_rr_FF from the individual-wheel requested-tire-resultant-force calculation unit 20*l*. Then, the individual-wheel requested-excessive-tire-force calculation unit 20*n* calculates a left-front-wheel requested excessive tire force ΔF_fl_FF, a right-front-wheel requested excessive tire force ΔF_fr_FF, a left-rear-wheel requested excessive tire force ΔF_rl_FF, and a right-rear-wheel requested excessive tire force ΔF_rr_FF according to the following Expressions (56) to (59), and outputs these values to the excessive-tire-force calculation unit 20*p*:

$$\Delta F\_fl\_FF = F\_fl\_FF - \mu\_Fzfl \tag{56}$$

$$\Delta F\_fr\_FF = F\_fr\_FF - \mu\_Fzfr \tag{57}$$

$$\Delta F\_rl\_FF = F\_rl\_FF - \mu\_Fzrl \tag{58}$$

$$\Delta F\_rr\_FF = F\_rr\_FF - \mu\_Fzrr \tag{59}$$

The individual-wheel excessive-tire-force calculation unit 20*o* receives the left-front-wheel friction-circle limit value μ_Fzfl, the right-front-wheel friction-circle limit value μ_Fzfr, the left-rear-wheel friction-circle limit value μ_Fzrl, and the right-rear-wheel friction-circle limit value μ_Fzrr from the individual-wheel friction-circle limit-value calculation unit 20*k*, and the left-front-wheel tire resultant force F_fl_FB, the right-front-wheel tire resultant force F_fr_FB, the left-rear-wheel tire resultant force F_rl_FB, and the right-rear-wheel tire resultant force F_rr_FB from the individual-wheel tire-resultant-force calculation unit 20*m*. Then, the individual-wheel excessive-tire-force calculation unit 20*o* calculates a left-front-wheel excessive tire force ΔF_fl_FB, a right-front-wheel excessive tire force ΔF_fr_FB, a left-rear-wheel excessive tire force ΔF_rl_FB, and a right-rear-wheel excessive tire force ΔF_rr_FB according to the following Expressions (60) to (63), and outputs these values to the excessive-tire-force calculation unit 20*p*:

$$\Delta F\_fl\_FB = F\_fl\_FB - \mu l\_Fzfl \tag{60}$$

$$\Delta F\_fr\_FB = F\_fr\_FB - \mu\_Fzfr \tag{61}$$

$$\Delta F\_rl\_FB = F\_rl\_FB - \mu\_Fzrl \tag{62}$$

$$\Delta F\_rr\_FB = F\_rr\_FB - \mu\_Fzrr \tag{63}$$

The excessive-tire-force calculation unit 20*p* receives the left-front-wheel requested excessive tire force ΔF_fl_FF, the right-front-wheel requested excessive tire force ΔF_fr_FF, the left-rear-wheel requested excessive tire force ΔF_rl_FF, and the right-rear-wheel requested excessive tire force ΔF_rr_FF from the individual-wheel requested-excessive-tire-force calculation unit 20*n*, and the left-front-wheel excessive tire force ΔF_fl_FB, the right-front-wheel excessive tire force ΔF_fr_FB, the left-rear-wheel excessive tire force ΔF_rl_FB, and the right-rear-wheel excessive tire force ΔF_rr_FB from the individual-wheel excessive-tire-force calculation unit 20*o*. Then, the excessive-tire-force calculation unit 20*p* compares the sum of the requested excessive tire forces ΔF_fl_FF, ΔF_fr_FF, ΔF_rl_FF, and ΔF_rr_FF with the sum of the excessive tire forces ΔF_fl_FB, ΔF_fr_FB, ΔF_rl_FB, and ΔF_rr_FB, and sets the larger sum as excessive tire forces $F_{over}$. In other words, the excessive tire forces $F_{over}$ are calculated as follows:

$$F_{over} = \text{MAX}((\Delta F\_fl\_FF + \Delta F\_fr\_FF + \Delta F\_rl\_FF + \Delta F\_rr\_FF) \cdot (\Delta F\_fl\_FB + \Delta F\_fr\_FB + \Delta F\_rl\_FB + \Delta F\_rr\_FB)) \tag{64}$$

The over-torque calculation unit 20*q* receives the engine speed $N_e$ from the engine-speed sensor 26, the main transmission gear ratio i from the transmission control unit 28, the turbine speed Nt of the torque converter, and the excessive tire force $F_{over}$ from the excessive-tire-force calculation unit 20*p*. Then, the over-torque calculation unit 20*q* calculates an over torque $T_{over}$ according to the following Expression (65), and outputs the over torque $T_{over}$ to the control-amount calculation unit 20r and the driving-force distribution control unit 40:

$$T_{over}=F_{over} \cdot Rt/t/i/\eta/if \qquad (65)$$

The control-amount calculation unit 20r receives the requested engine torque $T_{drv}$ from the requested-engine-torque calculation unit 20b and an over torque $T_{over}$ from the over-torque calculation unit 20q. Then, the control-amount calculation unit 20r calculates a control amount $T_{req}$ according to the following Expression (66), and outputs the control amount $T_{req}$ to the engine control unit 32:

$$T_{req}=T_{drv}-T_{over} \qquad (66)$$

Figure 3:
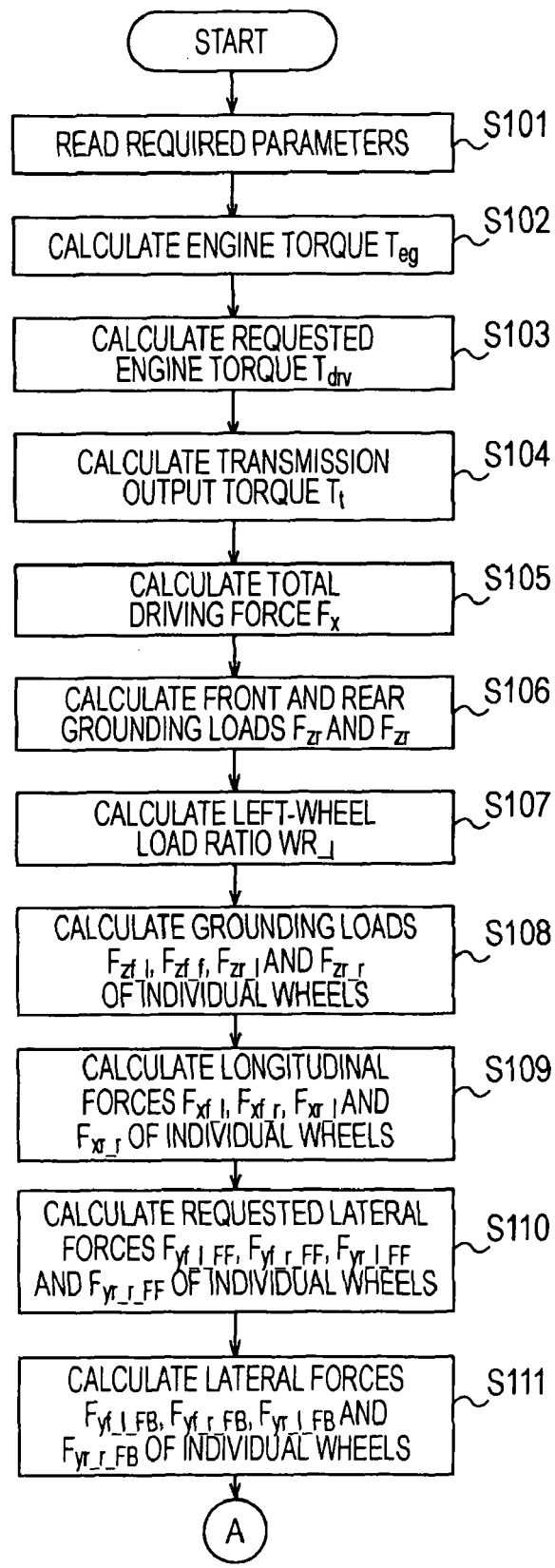
FIG. 3 is a flowchart showing a traction control program.
Figure 4:
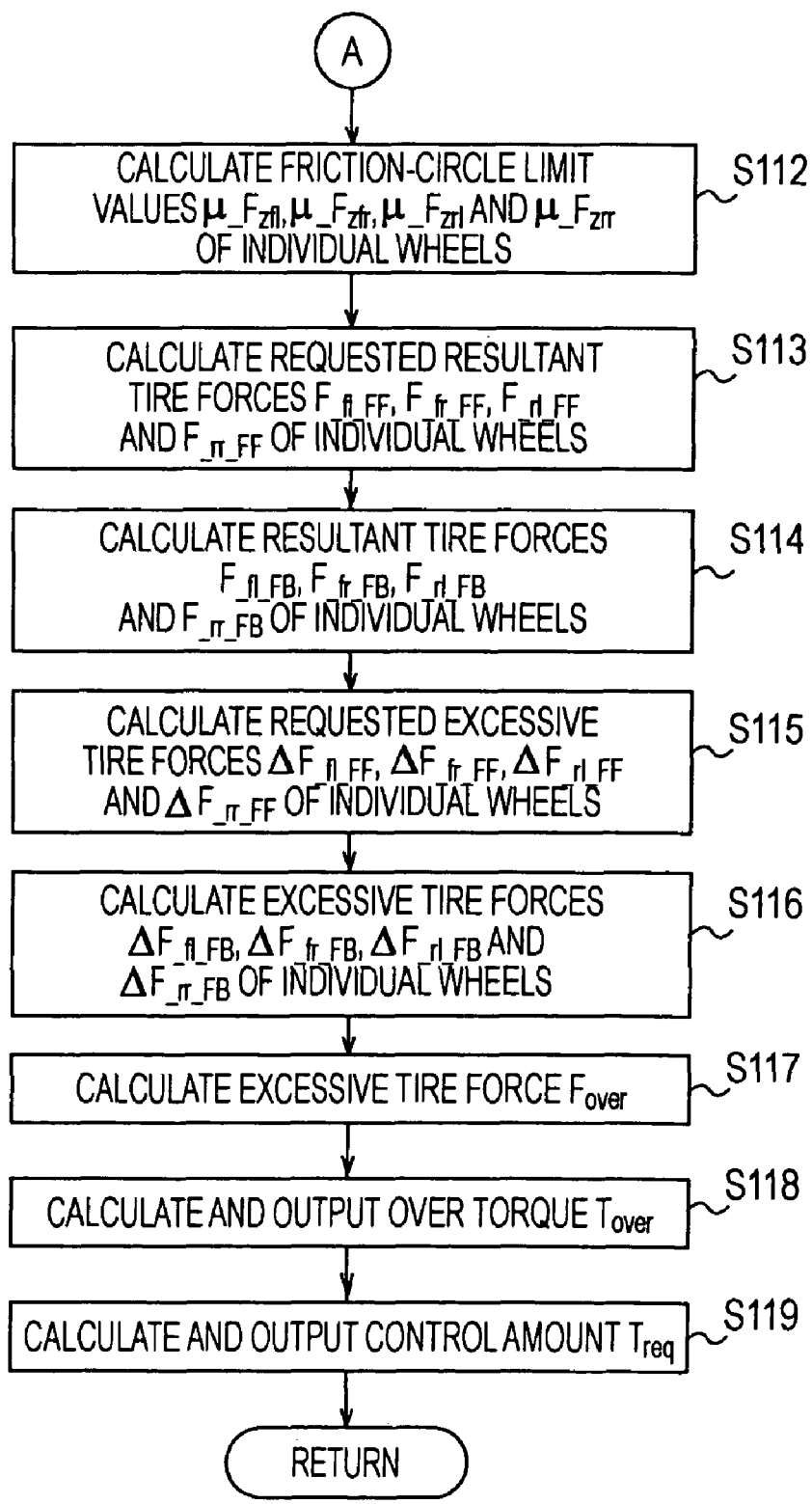
FIG. 4 is a flowchart showing a continuation of the flowchart shown in FIG. 3.

Next, a driving-force control program executed by the above-described traction control unit 20 will be described with reference to FIGS. 3 and 4 serving as flowcharts.

First, in S101, required parameters, namely, the throttle opening θth, the engine speed $N_e$, the accelerator opening θACC, the main transmission gear ratio i, the turbine speed Nt of the torque converter, the transfer torque $T_{LSD}$, the actual lateral acceleration $(d^2y/dt^2)$, the actual yaw rate γ, the steering wheel angle θH, the wheel speeds ωfl, ωfr, ωrl, and ωrr, and the road-surface friction coefficient μ, are read.

Figure 5:
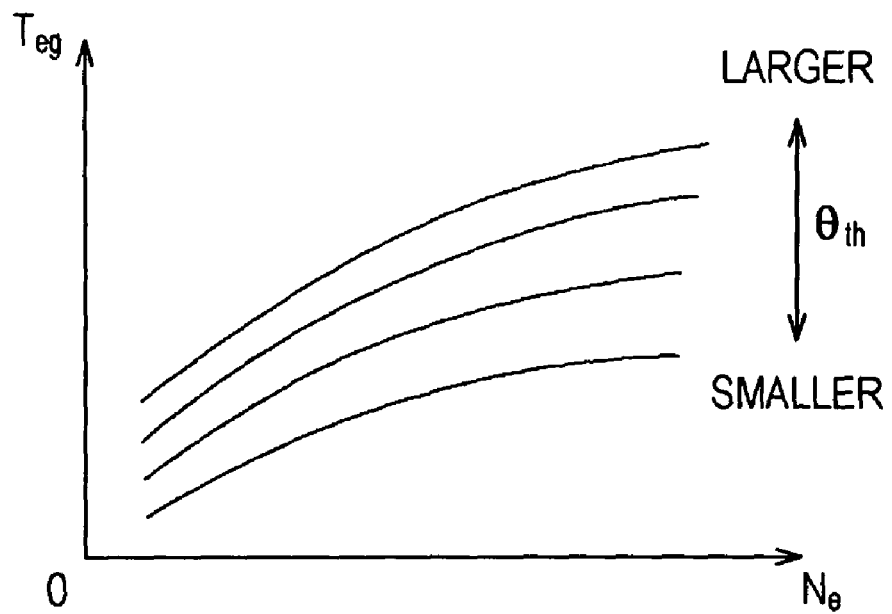
FIG. 5 is an explanatory view showing an example of an engine torque set in accordance with the engine speed and the throttle opening.

Next, in S102, the engine-torque calculation unit 20a finds an engine torque $T_{eg}$ produced currently with reference to a map preset in accordance with the engine characteristics (for example, a map shown in FIG. 5).

Figure 6:
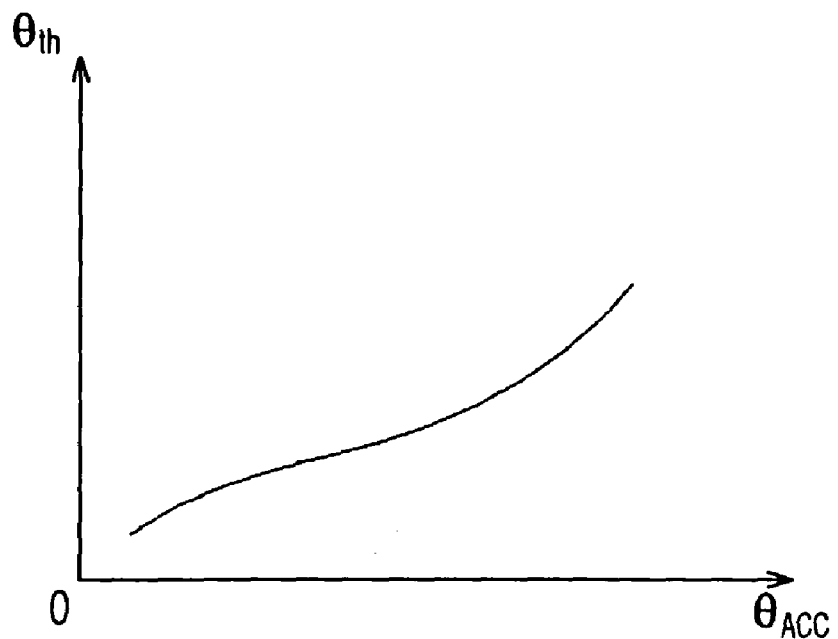
FIG. 6 is an explanatory view showing an example of a relationship between the accelerator opening and the throttle opening for generating the required engine torque.

In S103, the requested-engine-torque calculation unit 20b finds a throttle opening θth with reference to a preset map (for example, a map showing the relationship between θACC and θth, as shown in FIG. 6), and finds an engine torque $T_{eg}$ on the basis of the above-described map shown in FIG. 5.

In S104, the transmission-torque-output calculation unit 20c calculates a transmission output torque Tt according to Expression (1) described above.

In S105, the total-driving-force calculation unit 20d calculates a total driving force Fx according to Expression (2) described above.

In S106, the front-rear grounding-load calculation unit 20e calculates a front-wheel grounding load Fzf according to Expression (3) described above, and calculates a rear-wheel grounding load Fzr according to Expression (4) described above.

In S107, the left-wheel load-ratio calculation unit 20f calculates a left-wheel load ratio WR_l according to Expression (5) described above.

Next, in S108, the individual-wheel grounding-load calculation unit 20g calculates a left-front-wheel grounding load Fzf_l, a right-front-wheel grounding load Fzf_r, a left-rear-wheel grounding load Fzr_l, and a right-rear-wheel grounding load Fzr_r according to Expressions (6), (7), (8), and (9) described above.

In S109, the individual-wheel longitudinal-force calculation unit 20h calculates a left-front-wheel longitudinal force Fxf_l, a right-front-wheel longitudinal force Fxf_r, a left-rear-wheel longitudinal force Fxr_l, and a right-rear-wheel longitudinal force Fxr_r according to Expressions (19) to (22) described above.

In S110, the individual-wheel requested-lateral-force calculation unit 20i calculates a left-front-wheel requested lateral force Fyf_l_FF, a right-front-wheel requested lateral force Fyf_r_FF, a left-rear-wheel requested lateral force Fyr_l_FF, and a right-rear-wheel requested lateral force Fyr_r_FF according to Expressions (25) to (28) described above.

In S111, the individual-wheel lateral-force calculation unit 20j calculates a left-front-wheel lateral force Fyf_l_FB, a right-front-wheel lateral force Fyf_r_FB, a left-rear-wheel lateral force Fyr_l_FB, and a right-rear-wheel lateral force Fyr_r_FB according to Expressions (40) to (43) described above.

In S112, the individual-wheel friction-circle limit-value calculation unit 20k calculates a left-front-wheel friction-circle limit-value μ_Fzfl, a right-front-wheel friction-circle limit-value μ_Fzfr, a left-rear-wheel friction-circle limit-value μ_Fzrl, and a right-rear-wheel friction-circle limit-value μ_Fzrr according to Expressions (44) to (47) described above.

In S113, the individual-wheel requested-tire-resultant-force calculation unit 20l calculates a left-front-wheel requested tire resultant force F_fl_FF, a right-front-wheel requested tire resultant force F_fr_FF, a left-rear-wheel requested tire resultant force F_rl_FF, and a right-rear-wheel requested tire resultant force F_rr_FF according to Expressions (48) to (51) described above.

In S114, the individual-wheel tire-resultant-force calculation unit 20m calculates a left-front-wheel tire resultant force F_fl_FB, a right-front-wheel tire resultant force F_fr_FB, a left-rear-wheel tire resultant force F_rl_FB, and a right-rear-wheel tire resultant force F_rr_FB according to Expressions (52) to (55) described above.

In S115, the individual-wheel requested-excessive-tire-force calculation unit 20n calculates a left-front-wheel requested excessive tire force ΔF_fl_FF, a right-front-wheel requested excessive tire force ΔF_fr_FF, a left-rear-wheel requested excessive tire force ΔF_rl_FF, and a right-rear-wheel requested excessive tire force ΔF_rr_FF according to Expressions (56) to (59) described above.

In S116, the individual-wheel excessive-tire-force calculation unit 20o calculates a left-front-wheel excessive tire force ΔF_fl_FB, a right-front-wheel excessive tire force ΔF_fr_FB, a left-rear-wheel excessive tire force ΔF_rl_FB, and a right-rear-wheel excessive tire force ΔF_rr_FB according to Expressions (60) to (63) described above.

In S117, the excessive-tire-force calculation unit 20p calculates an excessive tire force $F_{over}$ according to Expression (64) described above.

In S118, the over-torque calculation unit 20q calculates an over torque $T_{over}$ according to Expression (65) described above, and outputs the over torque $T_{over}$ to the driving-force distribution control unit 40. In S119, the control-amount calculation unit 20r calculates a control amount $T_{req}$ according to Expression (66) described above, and outputs the control amount $T_{req}$ to the engine control unit 32. Then, the program ends.

In this way, in the traction control unit 20 according to the embodiment of the present invention, a torque value by which the tire force produced in the wheel according to the driver's request exceeds the friction-circle limit value is compared with a torque value by which the tire force currently produced in the wheel exceeds the friction-circle limit value, and correction is performed by subtracting the larger torque value from the driving force requested by the driver. For this reason, the current and further states in which the torque is excessive are properly corrected, and control is properly performed over spin and plow phenomenon, as a form of drift-out, known as a phenomenon that front-wheel exceed a limit of friction force first so that the vehicle strays outside the turning through the front wheel. Consequently, driving stability of the vehicle can be improved while properly maintaining the grip force of the tires.

The value by which the tire force exceeds the friction-circle limit value is subtracted for correction from the driving force requested by the driver. Therefore, the longitudinal driving force will not be rapidly reduced, and the driver will not have an unnatural feeling and a discontent about insufficient acceleration.

The driving-force distribution control unit 40 will be described in detail below.

Figure 11:
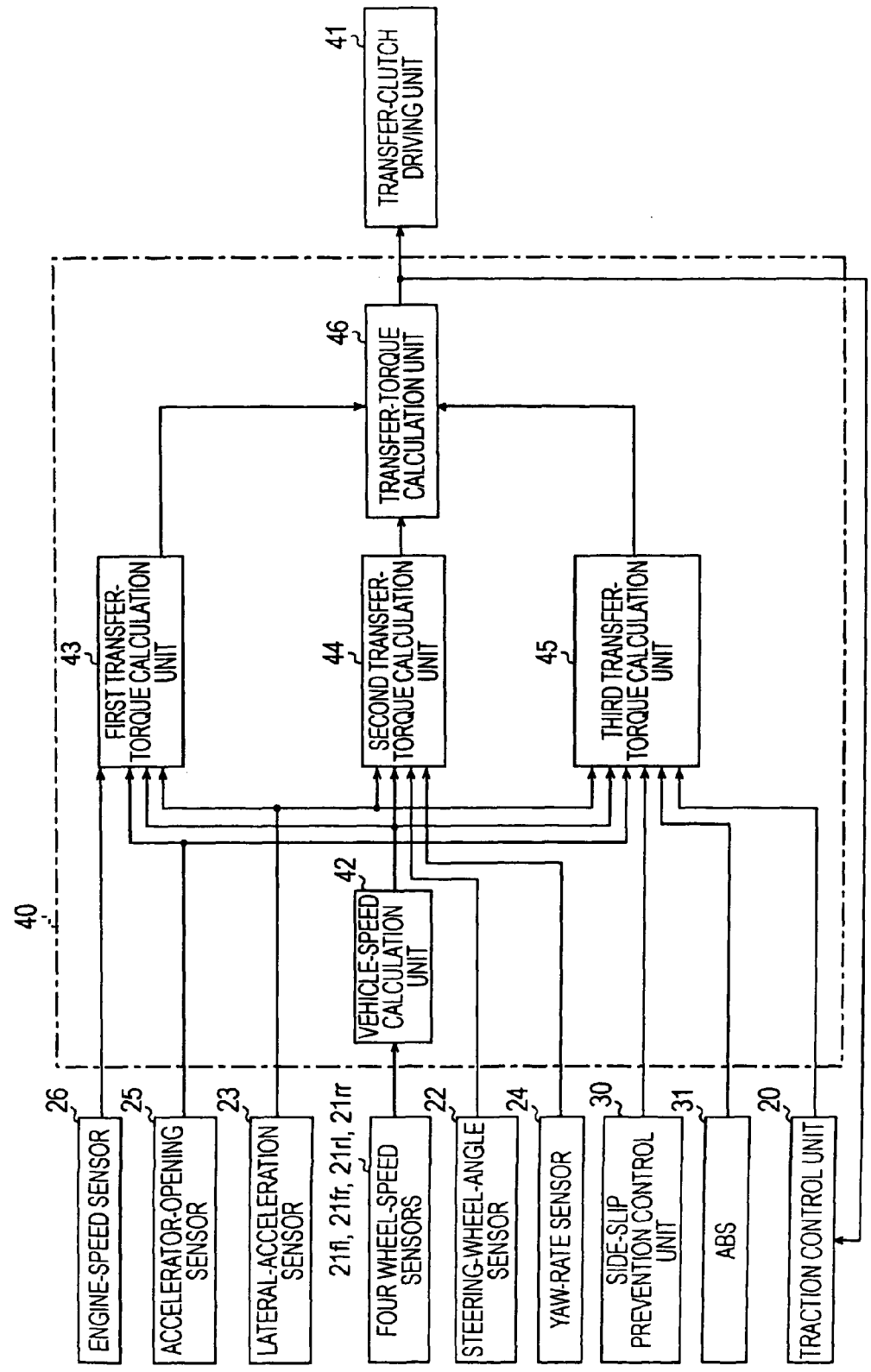
FIG. 11 is a functional block diagram of a driving-force distribution control unit.

As shown in FIG. 11, the driving-force distribution control unit 40 mainly includes a vehicle-speed calculation unit 42, a first-transfer-torque calculation unit 43, a second-transfer-torque calculation unit 44, a third-transfer-torque calculation unit 45, and a transfer-torque calculation unit 46.

The vehicle-speed calculation unit 42 receives wheel speeds ωfl, ωfr, ωrl, and ωrr of the wheels 14fl, 14fr, 14rl, and 14rr from the speed sensors for the four wheels, namely, the wheel speed sensors 21fl, 21fr, 21rl, and 21rr. For example, the vehicle-speed calculation unit 42 calculates a vehicle speed V by averaging the wheel speeds ωfl, ωfr, ωrl, and ωrr (=(ωfl+ωfr+ωrl+ωrr)/4), and outputs the vehicle speed V to the first-transfer-torque calculation unit 43, the second-transfer-torque calculation unit 44, and the third-transfer-torque calculation unit 45.

The first transfer-torque calculation unit 43 receives an actual lateral acceleration ($d^2y/dt^2$) from the lateral-acceleration sensor 23, an accelerator opening $\theta_{ACC}$ from the accelerator-opening sensor 25, an engine speed $N_e$ from the engine-speed sensor 26, and the vehicle speed V from the vehicle-speed calculation unit 42. From these input signals, the first-transfer-torque calculation unit 43 calculates an input-torque sensitive transfer torque $T_{LSDI}$ in accordance with the torque input from the engine, and outputs the input-torque sensitive transfer torque $T_{LSDI}$ to the transfer-torque calculation unit 46.

Figure 12:
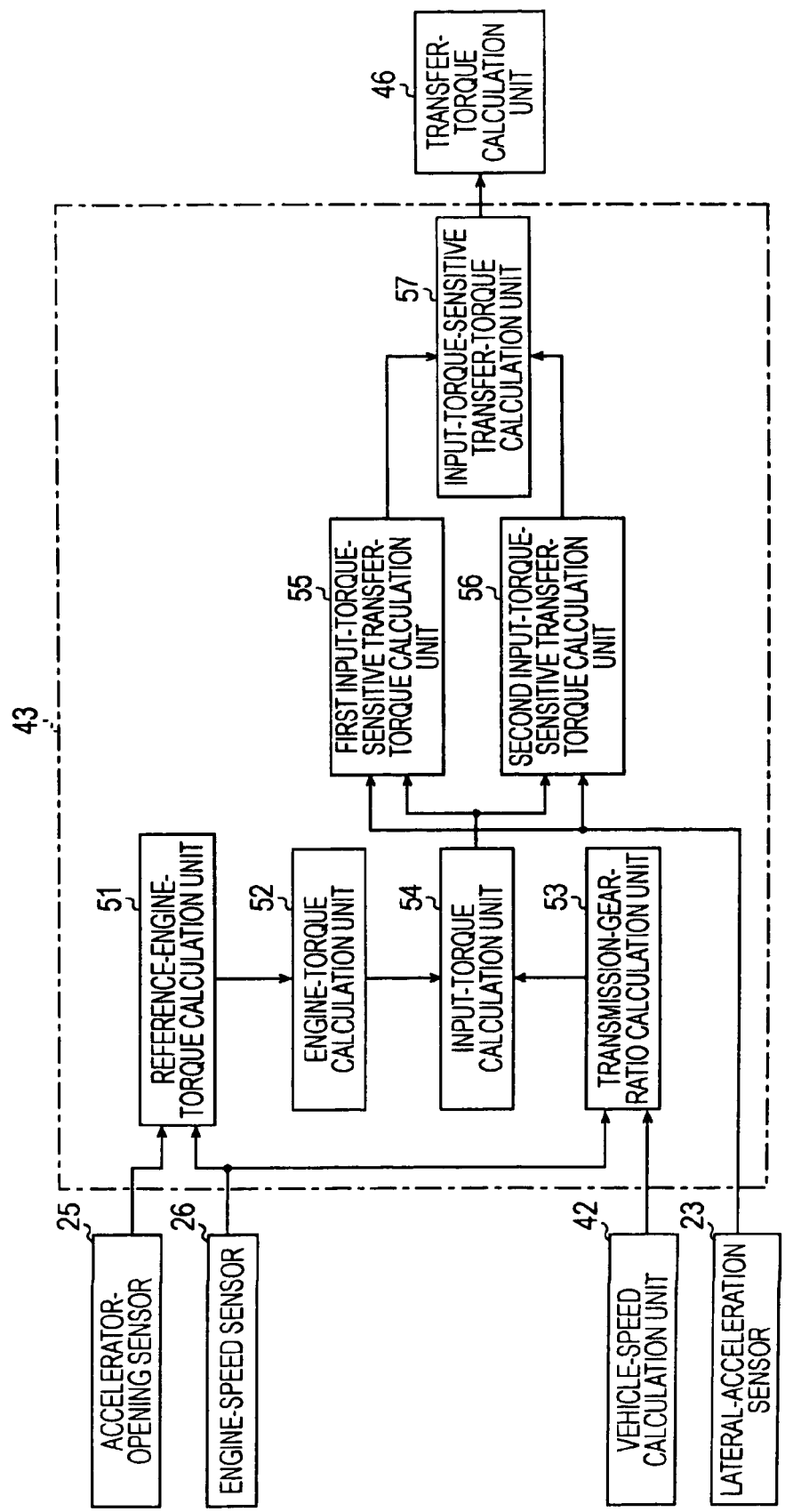
FIG. 12 is a functional block diagram of a first-transfer-torque calculation unit.

In other words, as shown in FIG. 12, the first-transfer-torque calculation unit 43 mainly includes a reference-engine-torque calculation unit 51, an engine-torque calculation unit 52, a transmission-gear-ratio calculation unit 53, an input-torque calculation unit 54, a first input-torque sensitive transfer-torque calculation unit 55, a second input-torque sensitive transfer-torque calculation unit 56, and an input-torque sensitive transfer-torque calculation unit 57.

The reference-engine-torque calculation unit 51 receives the accelerator opening $\theta_{ACC}$ from the accelerator-opening sensor 25 and the engine speed $N_e$ from the engine-speed sensor 26. On the basis of the accelerator opening $\theta_{ACC}$ and the engine speed $N_e$, the reference-engine-torque calculation unit 51 finds an engine torque (for example, corresponding to the requested engine torque $T_{drv}$ in the above-described traction control unit 20) with reference to a preset map showing the engine characteristics, and outputs the engine torque as a reference engine torque $T_{EG0}$ to the engine-torque calculation unit 52.

The reference engine torque $T_{EG0}$ is input from the reference-engine-torque calculation unit 51 to the engine-torque calculation unit 52. The engine-torque calculation unit 52 calculates an engine torque $T_{EG}$ according to the following Expression (67) or (68), and outputs the engine torque $T_{EG}$ to the input-torque calculation unit 54.

When $T_{EG0}(k) > T_{EG}(k-1)$ (the engine torque is increasing), $$T_{EG}=(1/(1+T_{EGTu} \cdot s)) \cdot T_{EG0} \quad (67)$$

When $T_{EG0}(k) \leq T_{EG}(k-1)$ (the engine torque is decreasing), $$T_{EG}=(1/(1+T_{EGTd} \cdot s)) \cdot T_{EG0} \quad (68)$$

where $T_{EG0}(k)$ represents the current reference engine torque, $T_{EG}(k-1)$ represents the previous engine torque, s represents the differential operator, $T_{EGTu}$ represents the delay time constant on the engine torque increase side (for example, 0.5), and $T_{EGTd}$ represents the delay time constant on the engine torque decrease side (for example, 0.2).

In other words, a fixed time is taken from when the accelerator pedal is operated until when the operation appears in the engine torque. Particularly in a supercharged engine, when the accelerator pedal is depressed, more time is taken until the engine speed changes than when the accelerator pedal is released. In view of this fact, different delay time constants are set when the engine torque is increased and when the engine torque is decreased. Delay characteristics are provided so that the delay is made large by setting a large delay time constant when the engine torque is increasing, and the delay is made small by setting a small delay time constant when the engine torque is decreasing. This allows the engine torque $T_{EG}$ to be found accurately.

By thus using different time constants in accordance with the increase and decrease in engine torque when estimating the engine torque $T_{EG}$, an input torque $T_{CD}$ to the transfer clutch 15, which will be described below, can be more properly estimated in accordance with the transient property of the engine. Moreover, the rising of the input torque $T_{CD}$ is slightly delayed when the accelerator pedal is operated, and cornering performance can be improved.

The transmission-gear-ratio calculation unit 53 receives the engine speed $N_e$ from the engine-speed sensor 26 and the vehicle speed V from the vehicle-speed calculation unit 42. The transmission-gear-ratio calculation unit 53 calculates a transmission gear ratio $G_{TM}$ according to the following Expression (69), and outputs the transmission gear ratio $G_{TM}$ to the input-torque calculation unit 54:

$$G_{TM}=(N_e \cdot Rt)/((V/3.6) \cdot if) \quad (69)$$

As the transmission gear ratio $G_{TM}$, a value input from the transmission control unit 28 may be used.

The input-torque calculation unit 54 receives the engine torque $T_{EG}$ from the engine-torque calculation unit 52 and the transmission gear ratio $G_{TM}$ from the transmission-gear-ratio calculation unit 53. Then, the input-torque calculation unit 54 calculates an input torque $T_{CD}$ according to the following Expression (70), and outputs the input torque $T_{CD}$ to the first input-torque sensitive transfer-torque calculation unit 55 and the second input-torque sensitive transfer-torque calculation unit 56:

$$T_{CD}=T_{EG} \cdot G_{TM} \quad (70)$$

The first input-torque sensitive transfer-torque calculation unit 55 receives the actual lateral acceleration ($d^2y/dt^2$) from the lateral-acceleration sensor 23 and the input torque $T_{CD}$ from the input-torque calculation unit 54. The first input-torque sensitive transfer-torque calculation unit 55 calculates a first input-torque sensitive transfer torque $T_{LSDI1}$ in accordance with the actual lateral acceleration ($d^2y/dt^2$) according to any of the following Expressions (71) to (74):

When $(d^2y/dt^2) \leq (d^2yL/dt^2)$, $$T_{LSDI1}=TBR_{L1} \cdot |T_{CD}| \quad (71)$$

When $(d^2yL/dt^2) < (d^2y/dt^2) \leq (d^2yM/dt^2)$, $$T_{LSDI1}=TBR_{L1} \cdot |T_{CD}| \cdot ((d^2yM/dt^2)-(d^2y/dt^2))/((d^2yM/dt^2)-(d^2yL/dt^2))+TBR_{M1} \cdot |T_{CD}| \cdot ((d^2y/dt^2)-(d^2yL/dt^2))/((d^2yM/dt^2)-(d^2yL/dt^2)) \quad (72)$$

When $(d^2yM/dt^2) < (d^2y/dt^2) \leq (d^2yH/dt^2)$, $$T_{LDSI1}=TBR_{M1} \cdot |T_{CD}| \cdot ((d^2yH/dt^2)-(d^2y/dt^2))/((d^2yH/dt^2)-(d^2yM/dt^2))+TBR_{H1} \cdot |T_{CD}| \cdot ((d^2y/dt^2)-(d^2yM/dt^2))/((d^2yH/dt^2)-(d^2yM/dt^2)) \quad (73)$$

When $(d^2y/dt^2) > (d^2yH/dt^2)$, $$T_{LSDf1} = TBR_{H1} \cdot |T_{CD}| \tag{74}$$

Herein, $(d^2yL/dt^2)$, $(d^2yM/dt^2)$, and $(d^2yH/dt^2)$ are constants set beforehand by experiment or the like, and $(d^2yL/dt^2) < (d^2yM/dt^2) < (d^2yH/dt^2)$. For example, $(d^2yL/dt^2)=1$, $(d^2yM/dt^2)=3$, and $(d^2yH/dt^2)=9$. $TBR_{L1}$, $TBR_{M1}$, and $TBR_{H1}$ are input-torque sensitive proportional constants set beforehand by experiment or the like, and $TBR_{L1} > TBR_{M1} > TBR_{H1}$. For example, $TBR_{L1}=0.4$, $TBR_{M1}=0.3$, and $TBR_{H1}=0.2$.

In other words, when $(d^2y/dt^2) \leq (d^2yL/dt^2)$, a first input-torque sensitive transfer torque $T_{LSDf1}$ is calculated by using the input-torque sensing proportional constant $TBR_{L1}$.

When $(d^2yL/dt^2) < (d^2y/dt^2) \leq (d^2yM/dt^2)$, a first input-torque sensing transfer torque $T_{LSDf1}$ is calculated by interpolation between $(d^2yL/dt^2)$ and $(d^2yM/dt^2)$ using the input-torque sensitive proportional constants $TBR_{L1}$ and $TBR_{M1}$.

When $(d^2yM/dt^2) < (d^2y/dt^2) \leq (d^2yH/dt^2)$ a first input-torque sensitive transfer torque $T_{LSDf1}$ is calculated by interpolation between $(d^2yM/dt^2)$ and $(d^2yH/dt^2)$ using the input-torque sensitive proportional constants $TBR_{M1}$ and $TBR_{H1}$.

When $(d^2y/dt^2) > (d^2yH/dt^2)$, a first input-torque sensitive transfer torque $T_{LSDf1}$ is calculated by using the input-torque sensitive proportional constant $TBR_{H1}$.

The second input-torque sensitive transfer-torque calculation unit 56 receives the actual lateral acceleration $(d^2y/dt^2)$ from the lateral-acceleration sensor 23 and the input torque $T_{CD}$ from the input-torque calculation unit 54. The second input-torque sensitive transfer-torque calculation unit 56 calculates a second input-torque sensitive transfer torque $T_{LSDf2}$ in accordance with the actual lateral acceleration $(d^2y/dt^2)$ according to any of the following Expressions (75) to (79):

When $T_{CD} \leq T_{CD0}$, $$T_{LDSf2} = 0 \tag{75}$$

When $(d^2y/dt^2) \leq (d^2yL/dt^2)$, $$T_{LSDf2} = TBR_{L2} \cdot (T_{CD} - T_{CD0}) \tag{76}$$

When $(d^2yL/dt^2) < (d^2y/dt^2) \leq (d^2yM/dt^2)$, $$T_{LSDf2} = TBR_{L2} \cdot (T_{CD} - T_{CD0}) \cdot ((d^2yM/dt^2) - (d^2y/dt^2))/((d^2yM/dt^2) - (d^2yL/dt^2)) + (TBR_{M2} \cdot (T_{CD} - T_{CD0}) \cdot ((d^2y/dt^2) - (d^2yL/dt^2))/((d^2yM/dt^2) - (d^2yL/dt^2))) \tag{77}$$

When $(d^2yM/dt^2) < (d^2y/dt^2) \leq (d^2yH/dt^2)$, $$T_{LSDf2} = TBR_{M2} \cdot (T_{CD} - T_{CD0}) \cdot ((d2yH/dt2) - (d^2y/dt^2))/((d^2yH/dt^2) - (d^2yM/dt^2)) + TBR_{H2} \cdot (T_{CD} - T_{CD0}) \cdot ((d^2y/dt^2) - (d^2yM/dt^2))/((d^2yH/dt^2) - (d^2yM/dt^2)) \tag{78}$$

When $(d^2y/dt^2) > (d^2yH/dt^2)$, $$T_{LSDf2} = TBR_{H2} \cdot (T_{CD} - T_{CD0}) \tag{79}$$

Herein, $T_{CD0}$ is a preset constant and serves as a branch point. That is, the input torque is less than or equal to the constant, it can be determined that grip driving can be performed easily. $TBR_{L2}$, $TBR_{M2}$, and $TBR_{H2}$ are input-torque sensitive proportional constants set beforehand, for example, by experiment. $TBR_{L2} > TBR_{M2} > TBR_{H2}$, and for example, $TBR_{L2} = 0.2$, $TBR_{M2} = 0.1$, and $TBR_{H2} = 0$.

In other words, the second input-torque sensitive transfer torque $T_{LSDf2}$ is set to be higher $T_{CD0}$ and within a region of the input torque $T_{CD}$ wherein the function of the transfer 3 is required more. When $(d^2y/dt^2) \leq (d^2yL/dt^2)$, a second input-torque sensitive transfer torque $T_{LSDf2}$ is calculated by using the input-torque sensitive proportional constant $TBR_{L2}$.

When $(d^2yL/dt^2) < (d^2y/dt^2) \leq (d^2yM/dt^2)$, a second input-torque sensitive transfer torque $T_{LSDf2}$ is calculated by interpolation between $(d^2yL/dt^2)$ and $(d^2yM/dt^2)$ using the input-torque sensitive proportional constants $TBR_{L2}$ and $TBR_{M2}$.

When $(d^2yM/dt^2) < (d^2y/dt^2) \leq (d^2yH/dt^2)$, a second input-torque sensitive transfer torque $T_{LSDf2}$ is calculated by interpolation between $(d^2yM/dt^2)$ and $(d^2yH/dt^2)$ using the input-torque sensitive proportional constants $TBR_{M2}$ and $TBR_{H2}$.

When $(d^2y/dt^2) > (d^2yH/dt^2)$, a second input-torque sensitive transfer torque $T_{LSDf2}$ is calculated by using the input-torque sensitive proportional constant $TBR_{H2}$.

The input-torque sensitive transfer-torque calculation unit 57 receives the first input-torque sensitive transfer torque $T_{LSDf1}$ from the first input-torque sensing transfer-torque calculation unit 55 and the second input-torque sensitive transfer torque $T_{LSDf2}$ from the second input-torque sensitive transfer-torque calculation unit 56. The input-torque sensitive transfer-torque calculation unit 57 calculates an input-torque sensitive transfer torque $T_{LSDI}$ according to the following Expression (80), and outputs the input-torque sensitive transfer torque $T_{LSDI}$ to the transfer-torque calculation unit 46:

$$T_{LSDI} = T_{LSDf1} + T_{LSDf2} \tag{80}$$

Figure 25:
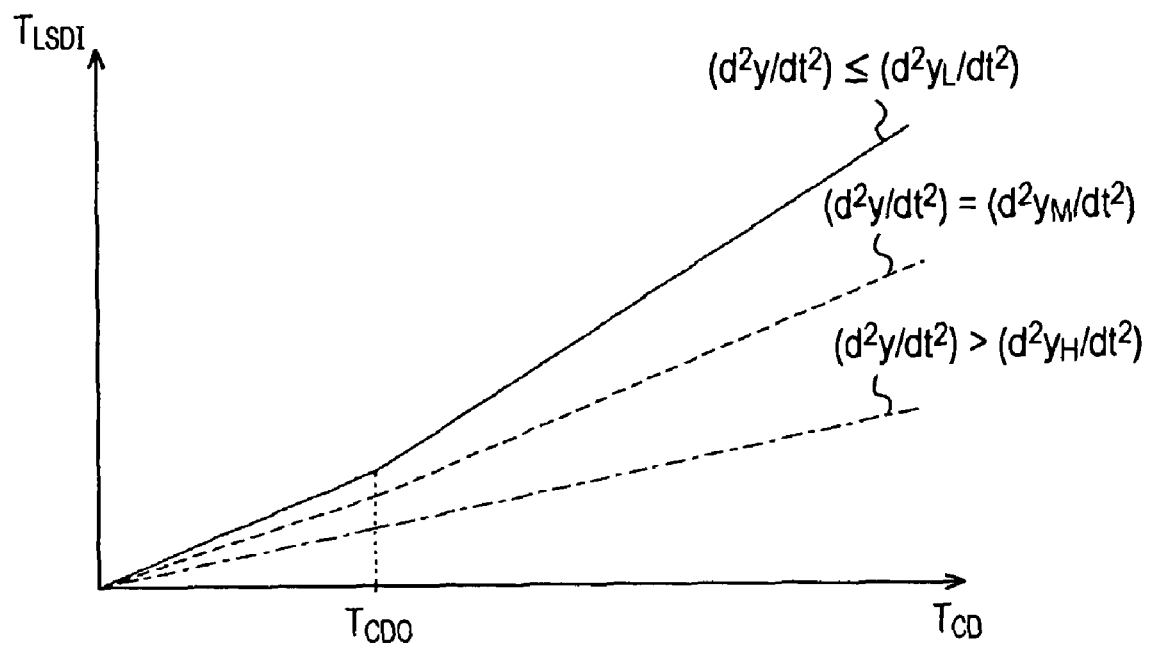
FIG. 25 is a characteristic view showing an input-torque sensitive transfer torque.
Figure 26:
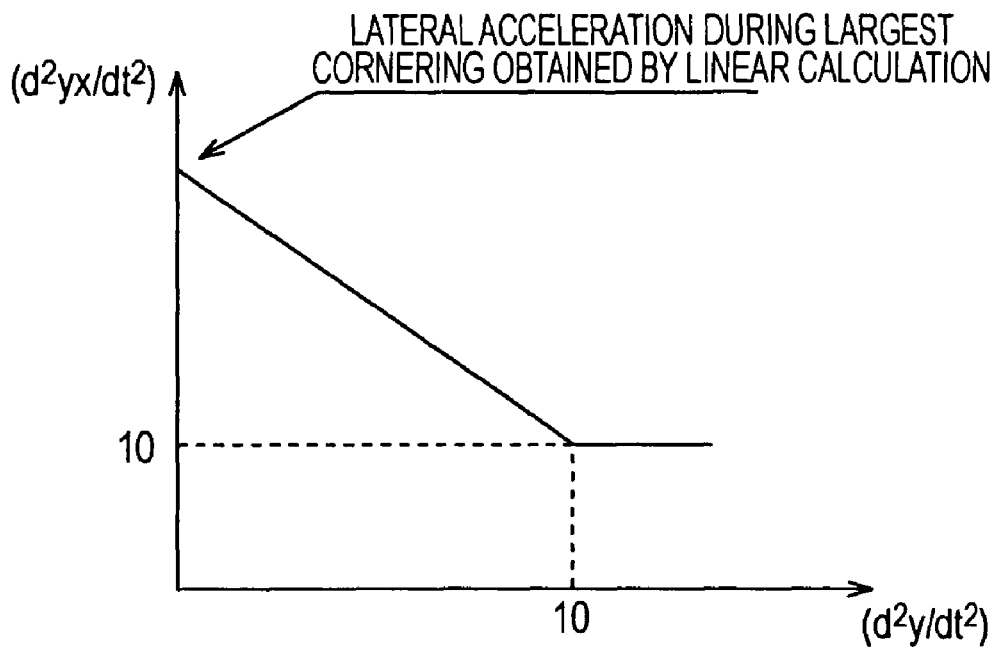
FIG. 26 is a characteristic explanatory view showing the simulated lateral acceleration causing saturation of the reference lateral acceleration for the actual lateral acceleration.

FIG. 25 shows the characteristic of the input-torque sensitive transfer torque $T_{LSDI}$ thus calculated by the first transfer-torque calculation unit 43. In the input-torque sensitive transfer torque $T_{LSDI}$ according to this embodiment, when a transfer torque $T_{LSD}$ for the transfer clutch 15 is found, the change amount is changed by adding the second input-torque sensitive transfer torque $T_{LSDf2}$ in a region where the input torque $T_{CD}$ is large, and a larger transfer torque is added so that a limited differential force will is not insufficient during critical driving on the road with a low friction coefficient. Further, since three reference torque lines are prepared for the actual lateral acceleration $(d^2y/dt^2)$, driving on the road having a low friction coefficient and driving on the road having a high friction coefficient can be performed easily. In this embodiment, while the branch point $T_{CD0}$ is set and a region where the input torque $T_{CD}$ is larger than the branch point $T_{CD0}$ is set as a region where the input-torque sensitive transfer torque $T_{LSDI}$ greatly changes, for example, the change amount of the input-torque sensitive transfer torque $T_{LSDI}$ may be set to increase as the input torque $T_{CD}$ increases, by using a quadratic curve.

The second transfer-torque calculation unit 44 receives the steering wheel angle $\theta_H$ from the steering-wheel-angle sensor 22, the actual lateral acceleration $(d^2y/dt^2)$ from the actual-lateral-acceleration sensor 23, the actual yaw rate γ from the yaw-rate sensor 24, and the vehicle speed V from the vehicle-speed calculation unit 42. From these input signals, the second transfer-torque calculation unit 44 estimates a yaw moment to be added to the vehicle, calculates a steering-wheel-angle/yaw-rate sensitive transfer torque $T_{LSDP}$ in accordance with the yaw moment, and outputs the steering-wheel-angle/yaw-rate sensitive transfer torque $T_{LSDP}$ to the transfer-torque calculation unit 46.

Figure 13:
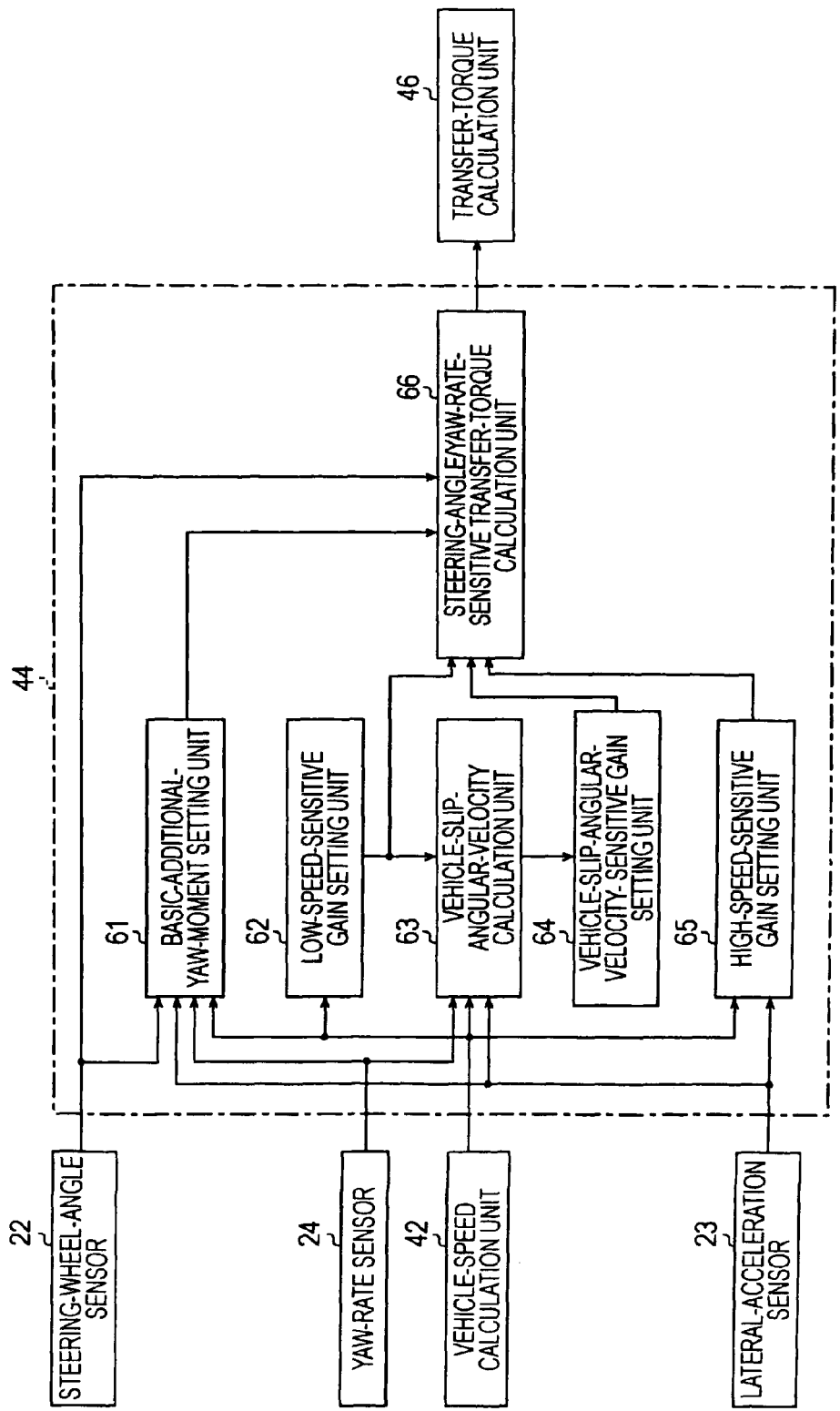
FIG. 13 is a functional block diagram of a second-transfer-torque calculation unit.

In other words, as shown in FIG. 13, the second transfer-torque calculation unit 44 mainly includes a basic-additional-yaw-moment setting unit 61, a low-speed sensitive gain setting unit 62, a vehicle slip-angular-velocity calculation unit 63, a vehicle slip-angular-velocity sensitive gain setting unit 64, a high-speed sensitive gain setting unit 65, and a steering-wheel-angle/yaw-rate sensitive transfer-torque calculation unit 66.

The basic-additional-yaw-moment setting unit 61 receives the steering wheel angle $\theta_H$ from the steering-wheel-angle sensor 22, $(d^2y/dt^2)$ from the lateral-acceleration sensor 23, and the actual yaw rate γ from the yaw-rate sensor 24. On the basis of these input signals, the basic-additional-yaw-moment setting unit 61 calculates a basic additional yaw moment $M_Z\theta$, and outputs the basic additional yaw moment $M_Z\theta$ to the steering-wheel-angle/yaw-rate sensitive transfer-torque calculation unit 66.

Figure 14:
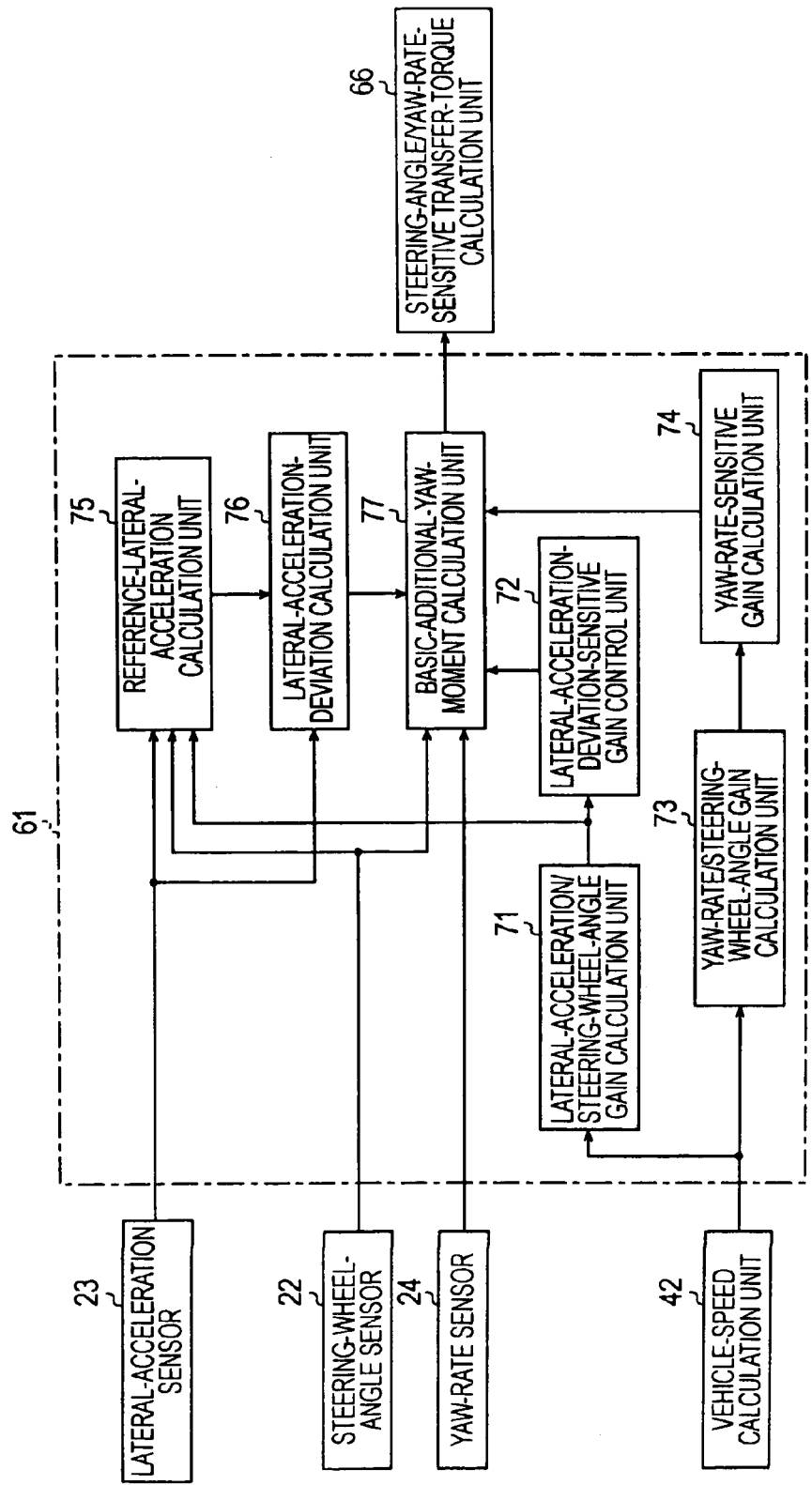
FIG. 14 is a functional block diagram of a basic-additional-yaw-moment setting unit.

The configuration of the basic-additional-yaw-moment setting unit 61 will be described below with reference to FIG. 14. The basic-additional-yaw-moment setting unit 61 mainly includes a lateral-acceleration/steering-wheel-angle gain calculation unit 71, a lateral-acceleration-deviation sensitive gain calculation unit 72, a yaw-rate/steering-wheel-angle gain calculation unit 73, a yaw-rate sensitive gain calculation unit 74, a reference-lateral-acceleration calculation unit 75, a lateral-acceleration-deviation calculation unit 76, and a basic-additional-yaw-moment calculation unit 77.

The lateral-acceleration/steering-wheel-angle gain calculation unit 71 receives the vehicle speed V from the vehicle-speed calculation unit 42. Then, the lateral-acceleration/steering-wheel-angle gain calculation unit 71 calculates a lateral-acceleration/steering-wheel-angle gain Gy according to the following Expression (81), and outputs the lateral-acceleration/steering-wheel-angle gain Gy to the lateral-acceleration-deviation sensitive gain calculation unit 72 and the reference-lateral-acceleration calculation unit 75:

$$Gy = (1/(1+A \cdot V^2)) \cdot (V^2/L) \cdot (1/n) \tag{81}$$

The lateral-acceleration-deviation sensitive gain calculation unit 72 receives the lateral-acceleration/steering-wheel-angle gain Gy from the lateral-acceleration/steering-wheel-angle gain calculation unit 71. Then, the lateral-acceleration-deviation sensitive gain calculation unit 72 calculates a lateral-acceleration-deviation sensitive gain Ky, whose maximum value is set so that $M_Z\theta$ (steady-state value)=0 in a state in which steering is impossible on a road having a low friction coefficient ($\gamma$=0, ($d^2y/dt^2$)=0), according to the following expression (82), and outputs the lateral-acceleration-deviation sensitive gain Ky to the basic-additional-yaw-moment calculation unit 77:

$$Ky = K\theta/Gy \tag{82}$$

The yaw-rate/steering-wheel-angle gain calculation unit 73 receives the vehicle speed V from the vehicle-speed calculation unit 42. Then, the yaw-rate/steering-wheel-angle gain calculation unit 73 calculates a yaw-rate/steering-wheel-angle gain G$\gamma$ according to the following Expression (83), and outputs the yaw-rate/steering-wheel-angle gain G$\gamma$ to the yaw-rate sensitive gain calculation unit 74:

$$G\gamma = (1/(1+A \cdot V^2)) \cdot (V/L) \cdot (1/n) \tag{83}$$

The yaw-rate sensitive gain calculation unit 74 receives the yaw-rate/steering-wheel-angle gain G$\gamma$ from the yaw-rate/steering-wheel-angle gain calculation unit 73. Then, the yaw-rate sensitive gain calculation unit 74 finds and sets a yaw-rate sensitive gain K$\gamma$ so that $M_Z\theta$ (steady-state value)=0 during grip driving (lateral acceleration deviation ($d^2ye/dt^2$)=0), according to the following Expression (84), and outputs the yaw-rate sensitive gain Ky to the basic-additional-yaw-moment calculation unit 77:

$$K\gamma = K\theta/G\gamma \tag{84}$$

where K$\theta$ represents the steering-angle sensitive gain, which is given by the following Expression (85):

$$K\theta = (Lf \cdot Kf)/n \tag{85}$$

The reference-lateral-acceleration calculation unit 75 receives the steering wheel angle $\theta_H$ from the steering-wheel-angle sensor 22, the actual lateral acceleration ($d^2y/dt^2$) from the lateral-acceleration sensor 23, and the lateral-acceleration/steering-wheel-angle gain Gy from the lateral-acceleration/steering-wheel-angle gain calculation unit 71. Then, the reference-lateral-acceleration calculation unit 75 calculates a reference lateral acceleration ($d^2yr/dt^2$) according to the following Expression (86), and outputs the reference lateral acceleration ($d^2yr/dt^2$) to the lateral-acceleration-deviation calculation unit 76. The reference lateral acceleration ($d^2yr/dt^2$) represents the relationship between the actual lateral acceleration and a lateral acceleration which is estimated from the driving state of the vehicle on the basis of a linear vehicle driving model:

$$(d^2yr/dt^2) = (1/(1+Ty \cdot s)) \cdot (d^2yss/dt^2) \tag{86}$$

where s represents the differential operator, Ty represents the primary delay time constant of the lateral acceleration, and ($d^2yss/dt^2$) represents the signed reference lateral acceleration provided without consideration of delay. The signed reference lateral acceleration ($d^2yss/dt^2$) is set as follows:

When $\theta_H \geq 0$, $(d^2yss/dt^2) = (d^2ysm/dt^2)$ (87)

When $\theta_H < 0$, $(d^2yss/dt^2) = -(d^2ysm/dt^2)$ (88)

where ($d^2ysm/dt^2$) represents the unsigned reference lateral acceleration that is saturated by ($d^2yx/dt^2$) that will be described below.

In other words, ($d^2yx/dt^2$) is a pseudo lateral acceleration that saturates the reference lateral acceleration, and is given by the following Expression (89) or (90):

When $(d^2y/dt^2) < 0$, $$(d^2yx/dt^2) = Gy \cdot \theta_{Hmax} \cdot ((10-(d^2y/dt^2))/10) + (d^2y/dt^2) \tag{89}$$

When $(d^2y/dt^2) \geq 0$, $$(d^2yx/dt^2) = 10 \tag{90}$$

where $\theta_{HMax}$ represents the maximum steering wheel angle. The pseudo lateral acceleration ($d^2yx/dt^2$) that is set according to Expression (89) or (90) and that saturates the reference lateral acceleration has a characteristic shown in FIG. 26. In this embodiment, saturation occurs at 10 m/s$^2$.

An unsigned reference lateral acceleration linearly calculated from the steering wheel angle is designated as ($d^2ys1/dt^2$). The unsigned reference lateral acceleration ($d^2ys1/dt^2$) is calculated according to the following Expression (91):

$$(d^2ys1/dt^2) = Gy \cdot |\theta_H| \tag{91}$$

When it is assumed that a difference between ($d^2ys1/dt^2$) and ($d^2yx/dt^2$) is designated as ($d^2yd/dt^2$) (=($d^2ys1/dt^2$)−($d^2yx/dt^2$)), the unsigned reference lateral acceleration ($d^2ysm/dt^2$) that is saturated by ($d^2yx/dt^2$) is given by the following Expression (92) or (93):

When $(d^2yd/dt^2) > 0$, $$(d^2ysm/dt^2) = (d^2ysl/dt^2) - (d^2yd/dt^2) \tag{92}$$

When $(d^2yd/dt^2) \leq 0$, $$(d^2ysm/dt^2) = (d^2ysl/dt^2) \tag{93}$$

Figure 27:
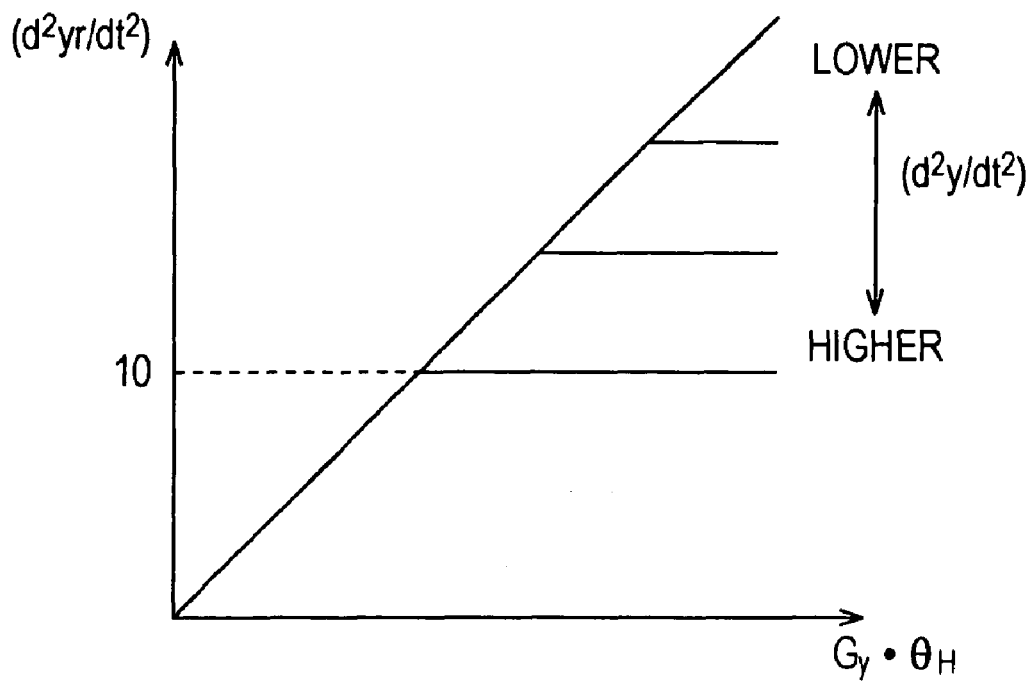
FIG. 27 is a characteristic explanatory view of the reference lateral acceleration for the product of the lateral-acceleration/steering-wheel-angle gain and the steering wheel angle.

FIG. 27 shows the characteristic of the reference lateral acceleration ($d^2yr/dt^2$) representing the relationship between the actual lateral acceleration and the lateral acceleration which is estimated from the set vehicle driving state on the basis of the linear vehicle motion model. In conjunction with (Gy·$\theta_H$), the reference lateral acceleration ($d^2yr/dt^2$) is limited to a small value when the friction coefficient μ of the road surface is high and the actual lateral acceleration ($d^2y/dt^2$) is high. Conversely, the reference lateral acceleration ($d^2yr/dt^2$) is set at a large value when the friction coefficient μ of the road surface is small and the actual lateral acceleration ($d^2y/dt^2$) is low. By thus setting the reference lateral acceleration ($d^2yr/$ $dt^2$), when a basic additional yaw moment $M_Z\theta$ including the reference lateral acceleration ($d^2yr/dt^2$) is calculated by the basic-additional-yaw-moment calculation unit 77 that will be described below, an excessive cornering moment when turning to the large extent on the road having a low friction coefficient is prevented.

The lateral-acceleration-deviation calculation unit 76 receives the actual lateral acceleration ($d^2y/dt^2$) from the lateral-acceleration sensor 23 and the reference lateral acceleration ($d^2yr/dt^2$) from the reference-lateral-acceleration calculation unit 75. Then, the lateral-acceleration-deviation calculation unit 76 calculates a lateral acceleration deviation ($d^2ye/dt^2$) according to the following Expression (94), and outputs the lateral acceleration deviation ($d^2ye/dt^2$) to the basic-additional-yaw-moment calculation unit 77:

$$(d^2ye/dt^2)=(d^2y/dt^2)-(d^2yr/dt^2) \qquad (94)$$

The basic-additional-yaw-moment calculation unit 77 receives the steering wheel angle $\theta_H$ from the steering-wheel-angle sensor 22, the actual yaw rate $\gamma$ from the yaw-rate sensor 24, the lateral-acceleration-deviation sensitive gain Ky from the lateral-acceleration-deviation sensitive gain calculation unit 72, the yaw-rate sensitive gain K$\gamma$ from the yaw-rate sensitive gain calculation unit 74, and the lateral acceleration deviation ($d^2ye/dt^2$) from the lateral-acceleration-deviation calculation unit 76.

Then, the basic-additional-yaw-moment calculation unit 77 calculates a basic additional yaw moment $M_Z\theta$ according to the following Expression (95), and outputs the basic additional yaw moment $M_Z\theta$ to the steering-angle/yaw-rate sensitive transfer-torque calculation unit 66:

$$M_Z\theta=-K\gamma\cdot\gamma+Ky\cdot(d^2ye/dt^2)+K\theta\cdot\theta_H \qquad (95)$$

As shown in Expression (95), the term $-K\gamma\cdot\gamma$ represents the yaw moment sensitive to the yaw rate $\gamma$, the term $K\theta\cdot\theta_H$ represents the yaw moment sensitive to the steering wheel angle $\theta_H$, and the term $Ky\cdot(d^2ye/dt^2)$ represents the corrected value for the yaw moment. For this reason, when driving is performed at a high lateral acceleration ($d^2y/dt^2$) on the road having a high friction coefficient, the additional yaw moment $M_Z\theta$ increases, and motion performance increases. In contrast, during driving on the road having a low friction coefficient, the above-described corrected value acts to reduce the additional yaw moment $M_Z\theta$. Therefore, cornering performance is not increased, and stable driving performance can be obtained.

Referring again to FIG. 13, the low-speed sensitive gain setting unit 62 receives the vehicle speed V from the vehicle-speed calculation unit 42. For example, the low-speed sensitive gain setting unit 62 sets a low-speed sensitive gain KVvl with reference to a map shown in FIG. 28, and outputs the low-speed sensitive gain KVvl to the vehicle-slip-angular-velocity calculation unit 63 and the steering-angle/yaw-rate sensitive transfer-torque calculation unit 66.

Figure 28:
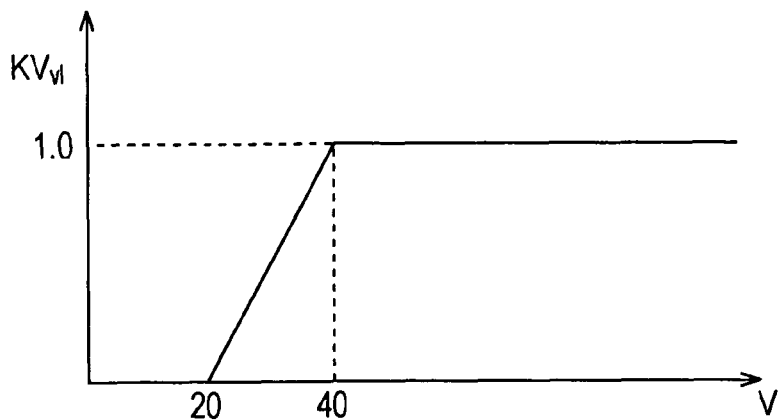
FIG. 28 is a characteristic explanatory view of the vehicle-speed sensitive gain during low-speed running with respect to the vehicle speed.

The low-speed sensitive gain KVvl is set at a low value in order to avoid an unnecessary additional yaw moment $MV_Z\theta$ at an extremely low speed, as shown in FIG. 28. Particularly when the vehicle speed is less than or equal to 20 km/h, the low-speed sensitive gain KVvl is set at 0 so that the additional yaw moment $MV_Z\theta$ due to control does not act.

The vehicle-slip-angular-velocity calculation unit 63 receives the actual lateral acceleration ($d^2y/dt^2$) from the lateral-acceleration sensor 23, the actual yaw rate $\gamma$ from the yaw-rate sensor 24, the vehicle speed V from the vehicle-speed calculation unit 42, and the low-speed sensitive gain KVvl from the low-speed-sensitive-gain setting unit 62.

The vehicle-slip-angular-velocity calculation unit 63 calculates a vehicle slip angular velocity ($d\beta/dt$) according to the following Expression (96), and outputs the vehicle slip angular velocity ($d\beta/dt$) to the vehicle-slip-angular-velocity sensitive gain calculation unit 64:

$$(d\beta/dt)=KVvl\cdot|((d^2y/dt^2)/V)-\gamma| \qquad (96)$$

The vehicle-slip-angular-velocity sensitive gain setting unit 64 receives the vehicle slip angular velocity ($d\beta/dt$) from the vehicle-slip-angular-velocity calculation unit 63.

The vehicle-slip-angular-velocity sensitive gain setting unit 64 calculates a reference vehicle-slip-angular-velocity sensitive gain KV($d\beta/dt$)0 and a return-gradient-limited vehicle-slip-angular-velocity sensitive gain KV($d\beta/dt$)L, and sets the lower gain as a vehicle-slip-angular-velocity sensitive gain KV($d\beta/dt$) within a range less than or equal to 1.0. The vehicle-slip-angular-velocity sensitive gain setting unit 64 outputs the vehicle-slip-angular-velocity-sensitive gain KV($d\beta/dt$) to the steering-angle/yaw-rate sensitive transfer-torque calculation unit 66.

Figure 29:
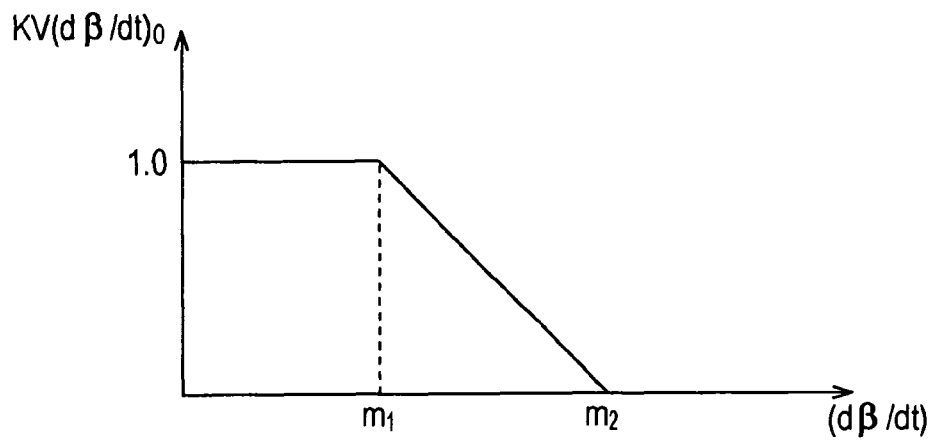
FIG. 29 is a characteristic explanatory view of the basic-vehicle-slip-angular-velocity sensitive gain with respect to the vehicle slip angular velocity.
Figure 30:
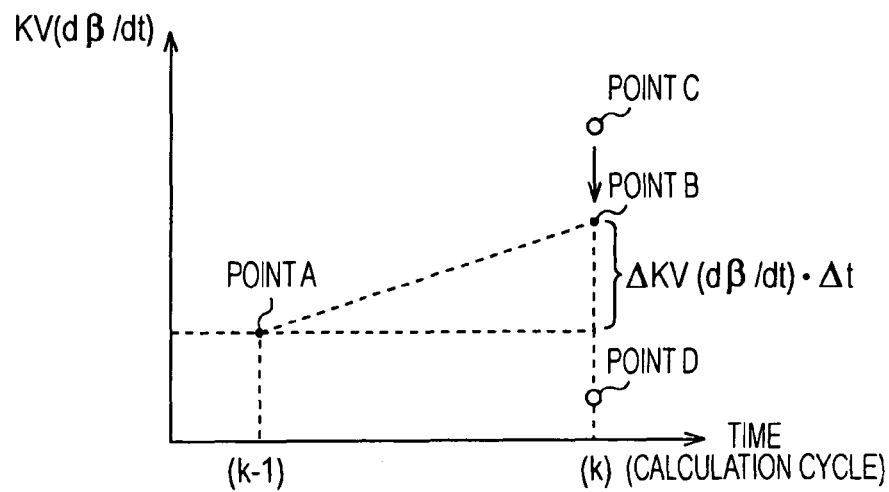
FIG. 30 is an explanatory view showing limitation due to the vehicle-slip-angular-velocity sensitive gain with a return gradient limit.

More specifically, a basic vehicle-slip-angular-velocity sensitive gain KV($d\beta/dt$)0 is set, for example, with reference to a map shown in FIG. 29. As shown in FIG. 29, the basic vehicle-slip-angular-velocity sensitive gain KV($d\beta/dt$)0 is set to avoid excessive cornering within a critical region where the vehicle slip angular velocity ($d\beta/dt$) is high. Particularly when the vehicle slip angular velocity ($d\beta/dt$) is more than or equal to m2, the basic vehicle-slip-angular-velocity sensitive gain KV($d\beta/dt$)0 is set at 0 so that the additional yaw moment $MV_Z\theta$ due to control does not act.

A return-gradient-limited vehicle-slip-angular-velocity sensitive gain KV($d\beta/dt$)L is given by the following Expression (97):

$$KV(d\beta/dt)L(k)=KV(d\beta/dt)(k-1)+\Delta KV(d\beta/dt)\cdot\Delta t \qquad (97)$$

where KV($d\beta/dt$)L(k) represents the current return-gradient-limited vehicle-slip-angular-velocity sensitive gain, KV($d\beta/dt$)(k−1) represents the previous vehicle-slip-angular-velocity sensitive gain, $\Delta$KV($d\beta/dt$) represents the return gradient of the vehicle slip-angular-velocity sensitive gain (a constant, for example, 0.3), and $\Delta t$ represents the calculation cycle.

The return-gradient-limited vehicle-slip-angular-velocity sensitive gain KV($d\beta/dt$)L given by Expression (97) described above has a meaning shown in FIG. 30. When it is assumed that Point A indicates the previous vehicle-slip-angular-velocity sensitive gain, the current return-gradient-limited vehicle-slip-angular-velocity sensitive gain is shown by Point B. Compared with the basic vehicle-slip-angular-velocity-sensitive gain KV($d\beta/dt$)0, the smaller value is set as a vehicle-slip-angular-velocity-sensitive gain KV($d\beta/dt$). Therefore, when the basic vehicle-slip-angular-velocity sensitive gain KV($d\beta/dt$)0 is at Point C, the current return-gradient-limited vehicle-slip-angular-velocity sensitive gain KV($d\beta/dt$)L(k) is set as a vehicle-slip-angular-velocity sensitive gain KV($d\beta/dt$). Conversely, when the basic vehicle-slip-angular-velocity sensitive gain KV($d\beta/dt$)0 is at Point D, it is set as a vehicle-slip-angular-velocity sensitive gain KV($d\beta/dt$). In other words, the current return-gradient-limited vehicle-slip-angular-velocity sensitive gain KV($d\beta/dt$)L(k) is provided as a limiting value.

For example, a case in which the driver steers to the left, steers to the right, and then performs counter steering, as shown in FIG. 31, will now be considered.

Figure 31A:
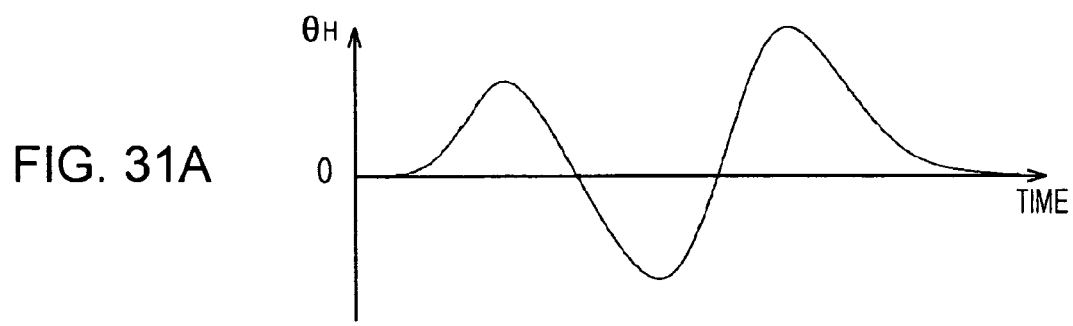
FIGS. 31A to 31D are time charts showing an example of a set vehicle-slip-angular-velocity sensitive gain.
Figure 31B:
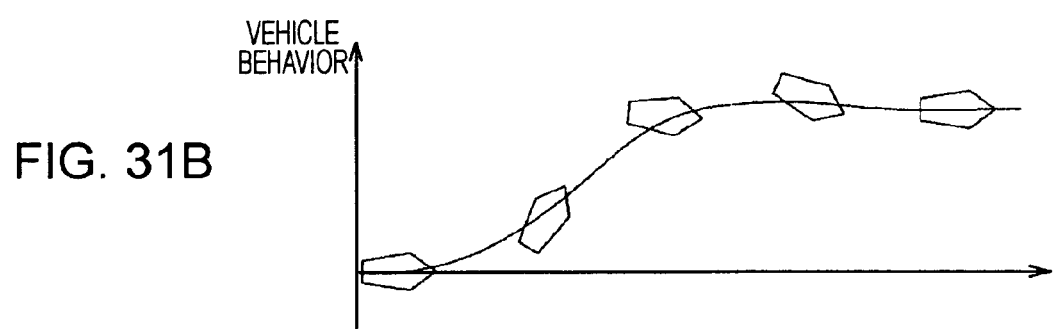
Figure 31C:
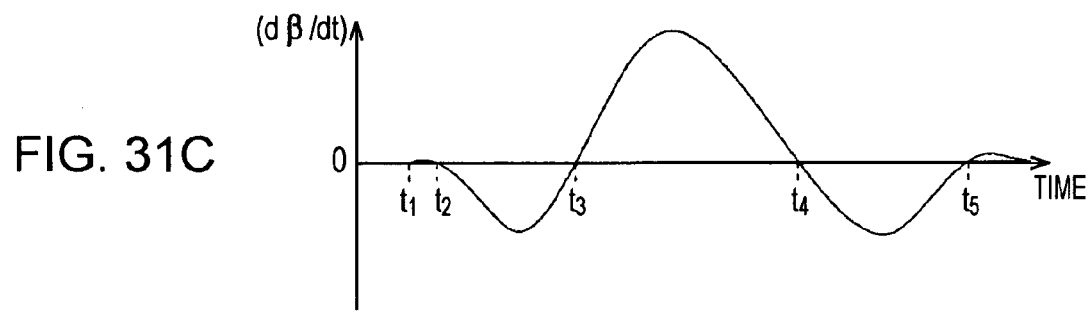
Figure 31D:
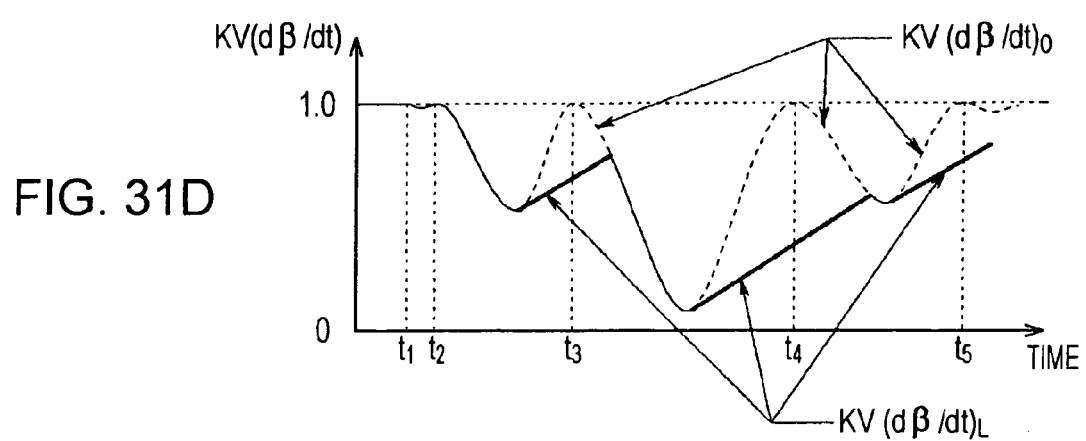

In this case, the vehicle slip angular velocity ($d\beta/dt$) sequentially has a negative value, a positive value, and a negative value, as shown in FIG. 31C. In such a transitional condition in which the sign is switched, the vehicle slip angular velocity (dβ/dt) temporarily becomes 0 or a small value. If an additional yaw moment $MV_Z\theta$ is set only by the basic vehicle-slip-angular-velocity sensitive gain KV (dβ/dt)0 in this condition, the transfer torque $T_{LSD}$ undesirably becomes 0 or a small value, regardless of the vehicle being in an unstable condition (portions shown by broken lines in FIG. 31D). Therefore, by performing limitation by the return-gradient-limited vehicle-slip-angular-velocity sensitive gain KV(dβ/dt)L in consideration of this transitional condition, an unnecessary cornering moment is reliably prevented from being added and the longitudinal driving force is accurately and stably distributed, even in an unstable or transitional condition of the vehicle.

The high-speed sensitive gain setting unit 65 receives the actual lateral acceleration ($d^2y/dt^2$) from the lateral-acceleration sensor 23 and the vehicle speed V from the vehicle-speed calculation unit 42.

First, a vehicle-speed sensitive term KVvhv of a high-speed sensitive gain KVvh is set according to the following Expression (98), (99), or (100):

When $(3.6·V) \leq 60$, $KVvhv=1$  (98)

When $60<(3.6·V)<120$, $KVvhv=1-((3.6·V)-60)/(120-60)$  (99)

When $(3.6·V) \geq 120$, $KVvhv=0$  (100)

On the basis of the above-described vehicle-speed sensitive term KVvhv of the high-speed sensitive gain KVvh, a high-speed sensitive gain KVvh is set according to the following Expression (101), (102), or (103):

When $|d^2y/dt^2| \leq 3$, $KVvh=KVvhv$  (101)

When $3<|d^2y/dt^2|<9$, $KVvh=1·((|d^2y/dt^2|-3)/(9-3))+KVvhv·((9-|d^2y/dt^2|)/(9-3))$  (102)

When $|d^2y/dt^2| \geq 9$, $KVvh=1$  (103)

Figure 32:
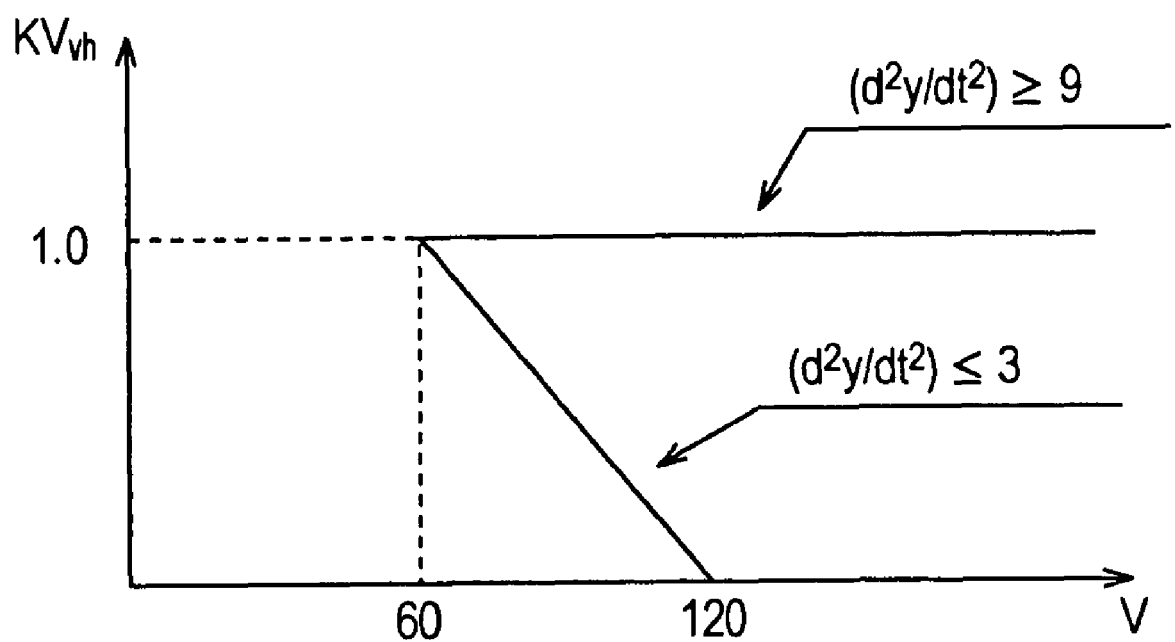
FIG. 32 is a characteristic explanatory view of the vehicle-speed sensitive gain during high-speed running with respect to the vehicle speed and the actual lateral acceleration.

FIG. 32 shows the characteristic of the high-speed sensitive gain KVvh obtained by any of Expressions (101) to (103) described above. In other words, when the absolute value $|d^2y/dt^2|$ of the actual lateral acceleration is low during high-speed driving and there is a probability that driving is being performed on a road having a low friction coefficient, the high-speed sensitive gain KVvh is set at a small value in order to avoid excessive cornering.

The steering-angle/yaw-rate sensitive transfer-torque calculation unit 66 receives the steering wheel angle $\theta_H$ from the steering-wheel-angle sensor 22, the basic additional yaw moment $M_Z\theta$ from the basic-additional-yaw-moment setting unit 61, the low-speed sensitive gain KVvl from the low-speed sensitive gain setting unit 62, the vehicle-slip-angular-velocity sensitive gain KV(dβ/dt) from the vehicle-slip-angular-velocity sensitive gain setting unit 64, and the high-speed sensitive gain KVvh from the high-speed sensitive gain setting unit 65.

Then, the steering-angle/yaw-rate sensitive transfer-torque calculation unit 66 calculates an additional yaw moment $MV_Z\theta$ according to the following Expression (104), calculates a steering-angle/yaw-rate sensitive transfer torque $T_{LSDP}$ according to the following Expression (105) or (106), and outputs these values to the transfer-torque calculation unit 46:

$MV_Z\theta=KVz\theta·KVvl·KVvh·KV(d\beta/dt)·M_Z\theta$  (104)

where $KVz\theta$ represents the gain that determines the assist amount, and is a constant (for example, 1).

When $\theta_H \geq 0$, $T_{LSDP}=-K_{LSDP}·MV_Z\theta$  (105)

When $\theta_H<0$, $T_{LSDP}=K_{LSDP}·MV_Z\theta$  (106)

where $K_{LSDP}$ is a conversion factor.

Referring again to FIG. 11, the third transfer-torque calculation unit 45 is provided as a tack-in prevention control means. The third transfer-torque calculation unit 45 receives the actual lateral acceleration ($d^2y/dt^2$) from the lateral-acceleration sensor 23, the accelerator opening $\theta_{ACC}$ from the accelerator-opening sensor 25, the over torque $T_{over}$ from the traction control unit 20, start signals from the side-slip prevention control unit 30 and the ABS 31, and the vehicle speed V from the vehicle-speed calculation unit 42. From these input signals, the third transfer-torque calculation unit 45 calculates a tack-in preventing transfer torque $T_{LSDD}$ for preventing a tack-in phenomenon, as necessary, and outputs the tack-in preventing transfer torque $T_{LSDD}$ to the transfer-torque calculation unit 46.

Figure 15:
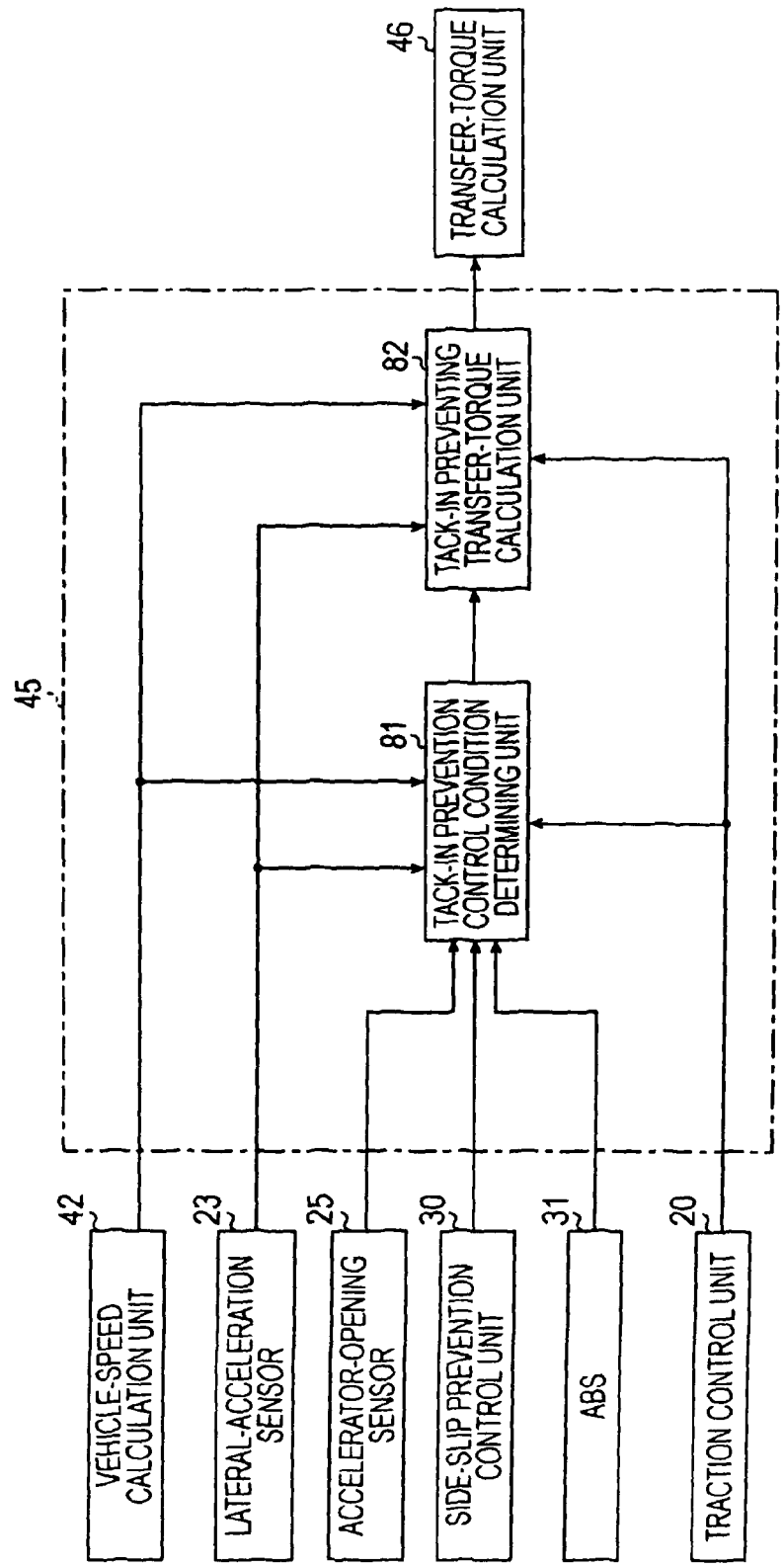
FIG. 15 is a functional block diagram of a third-transfer torque calculation unit.

In other words, the third transfer-torque calculation unit 45 mainly includes a tack-in prevention control condition determining unit 81 and a tack-in preventing transfer-torque calculation unit 82, as shown in FIG. 15.

The tack-in prevention control condition determining unit 81 receives the over torque $T_{over}$ from the traction control unit 20, the actual lateral acceleration ($d^2y/dt^2$) from the lateral-acceleration sensor 23, the accelerator opening $\theta_{ACC}$ from the accelerator-opening sensor 25, the vehicle speed V from the vehicle-speed calculation unit 42, and start signals from the side-slip prevention control unit 30 and the ABS 31.

In a case in which the absolute value $|(d^2y/dt^2)|$ of the actual lateral acceleration serving as the degree of turn is more than a preset value $(d^2y/dt^2)$Doff (for example, $|(d^2y/dt^2)|>3$ m/s²) and the vehicle speed V is more than a preset value VDoff (for example, V>40 km/h), when the over torque $T_{over}$ is more than a set value $T_{overc}$ (a value set beforehand through experiment and calculation), when the accelerator opening is small (for example, a difference between the previous accelerator opening $\theta_{ACCn-1}$ and the current accelerator opening $\theta_{ACC}$ is more than $\Delta\theta_{ACC}$ (for example, 0), or when the current accelerator opening $\theta_{ACC}$ is less than a preset value $\theta_{ACCk}$ (a value set beforehand through experiment and calculation: for example, 0), it is determined that a condition that tack-in prevention control is exerted (tack-in prevention control execution condition) holds (execution is admitted). Under the tack-in prevention control execution condition, the front-rear engaging force is decreased (in this case, the braking force is decreased) so as to increase the lateral force for the purpose of prevention of a tack-in phenomenon (in this case, the lateral force of the front wheels is decreased by increasing the braking force).

When at least one of the side-slip prevention control unit 20 and the ABS 31 is started and a tack-in-prevention-control admission flag TCF is cleared (TCF=0), it is determined that a tack-in prevention control execution condition does not hold (execution is not admitted). Then, the result of determination by the tack-in prevention control condition determining unit 81 is output to the tack-in preventing transfer-torque calculation unit 82.

The tack-in preventing transfer-torque calculation unit 82 receives the over torque $T_{over}$ from the traction control unit 20, the actual lateral acceleration ($d^2y/dt^2$) from the lateral-acceleration sensor 23, the vehicle speed V from the vehicle-speed calculation unit 42, and the result of determination about the tack-in prevention control execution condition from the tack-in prevention control condition determining unit 81.

When it is determined that execution of the tack-in prevention control is admitted, the tack-in preventing transfer-torque calculation unit 82 calculates a first tack-in preventing transfer torque $T_{LSDD1}$ according to the following Expression (107), and calculates a second tack-in preventing transfer torque $T_{LSDD2}$ according to the following Expression (108):

$$T_{LSDD1} = T_{LSDD0} \cdot ((V - V\text{Doff})/(Vc - V\text{Doff})) \cdot ((d^2y/dt^2) - (d^2y/dt^2)\text{Doff})/((d^2y/dt^2)c - (d^2y/dt^2)\text{Doff}) \quad (107)$$

$$T_{LSDD2} = T_{LSDD1} \cdot T_{over}/kT_{LSDD}\text{Doff} \quad (108)$$

Here, $T_{LSDD0}$ is a reference value obtained beforehand through experiment or the like. This reference value allows a tack-in phenomenon to be suppressed when driving is performed at a vehicle speed Vc and an actual lateral acceleration $(d^2y/dt^2)c$. VDoff and $(d^2y/dt^2)$Doff respectively represent the vehicle speed and the lateral acceleration that cancel tack-in prevention control, and $kT_{LSDD}$Doff is a tack-in control correction coefficient (preset value) for traction control.

The first tack-in-preventing transfer torque $T_{LSDD1}$ and the second tack-in-preventing transfer torque $T_{LSDD2}$ are compared, and the lower transfer torque to be added (the value that is larger in a direction such as to increase the braking force on the front shaft side and to decrease the braking force on the rear shaft side) is set as a transfer torque $T_{LSDD}$ in tack-in prevention control, and is output to the transfer-torque calculation unit 46.

In a case in which the transfer torque $T_{LSDD}$ in tack-in prevention control is set by comparing the first tack-in preventing transfer torque $T_{LSDD1}$ and the second tack-in preventing transfer torque $T_{LSDD2}$, when the second tack-in preventing transfer torque $T_{LSDD2}$ based on traction control is selected, the transfer torque $T_{LSDD}$ may be set earlier and lightly. In other words, a tack-in phenomenon is lightly prevented from occurring before the driver perceives the phenomenon. Conversely, when the first tack-in preventing transfer torque $T_{LSDD1}$ based on the operation of the accelerator by the driver is selected, the transfer torque $T_{LSDD}$ may be set later and strongly. In other words, it is determined that the driver intentionally causes a tack-in phenomenon, and execution of the tack-in prevention control is minimized.

When it is determined that execution of tack-in prevention control is not admitted, the transfer torque $T_{LSDD}$ is set at 0, and is output to the transfer-torque calculation unit 46.

In this way, according to this embodiment, a tack-in phenomenon can be effectively prevented by feed-forward control using the tack-in preventing transfer torque $T_{LSDD}$ from the third transfer-torque calculation unit 45.

In the case in which the absolute value $|(d^2y/dt^2)|$ of the actual lateral acceleration is more than the preset value $(d^2y/dt^2)$Doff and the vehicle speed V is more than the preset value VDoff, not only when the accelerator opening is substantially reduced and the current accelerator opening $\theta_{ACC}$ is small, but also when the over torque $T_{over}$ serving as the amount of torque reduced by the traction control unit 20 is more than a preset value $T_{overc}$ (a value set beforehand through experiment or calculation), tack-in prevention control is executed. Therefore, even the throttle valve is controlled to the close side by traction control, a tack-in phenomenon can be reliably prevented and natural control can be performed without bringing discomfort.

The first tack-in preventing transfer torque $T_{LSDD1}$ set in accordance with the actual lateral acceleration $(d^2y/dt^2)$ and the vehicle speed V and the second tack-in preventing transfer torque $T_{LSDD2}$ set in accordance with the first tack-in preventing transfer torque $T_{LSDD1}$ and the over torque $T_{over}$ are compared. The lower transfer torque to be added (the value that is larger in a direction such as to increase the braking force on the front shaft side and to decrease the braking force on the rear shaft side) is set as a transfer torque $T_{LSDD}$ when tack-in prevention control is executed. Therefore, a spin tendency is reliably prevented, and control is performed with emphasis on stability.

When at least one of the side-slip prevention control unit 30 and the ABS 31 is started, tack-in prevention control is prohibited. This can avoid unnecessary interference with the control.

The transfer-torque calculation unit 46 receives the input-torque sensitive transfer torque $T_{LSDI}$ from the first transfer-torque calculation unit 43, the steering-angle/yaw-rate sensitive transfer torque $T_{LSDP}$ from the second transfer-torque calculation unit 44, and the tack-in preventing transfer torque $T_{LSDD}$ from the third transfer-torque calculation unit 45. Then, the transfer-torque calculation unit 46 calculates a transfer torque $T_{LSD}$ according to the following Expression (109), and outputs the transfer torque $T_{LSD}$ to the transfer-clutch driving unit 41:

$$T_{LSD} = T_{LSDI} + T_{LSDP} - T_{LSDD} \quad (109)$$

Driving-force distribution control in the driving-force distribution control unit 40 having the above-described configuration will now be described with reference to FIGS. 16 to 24 serving as flowcharts.

Figure 16:
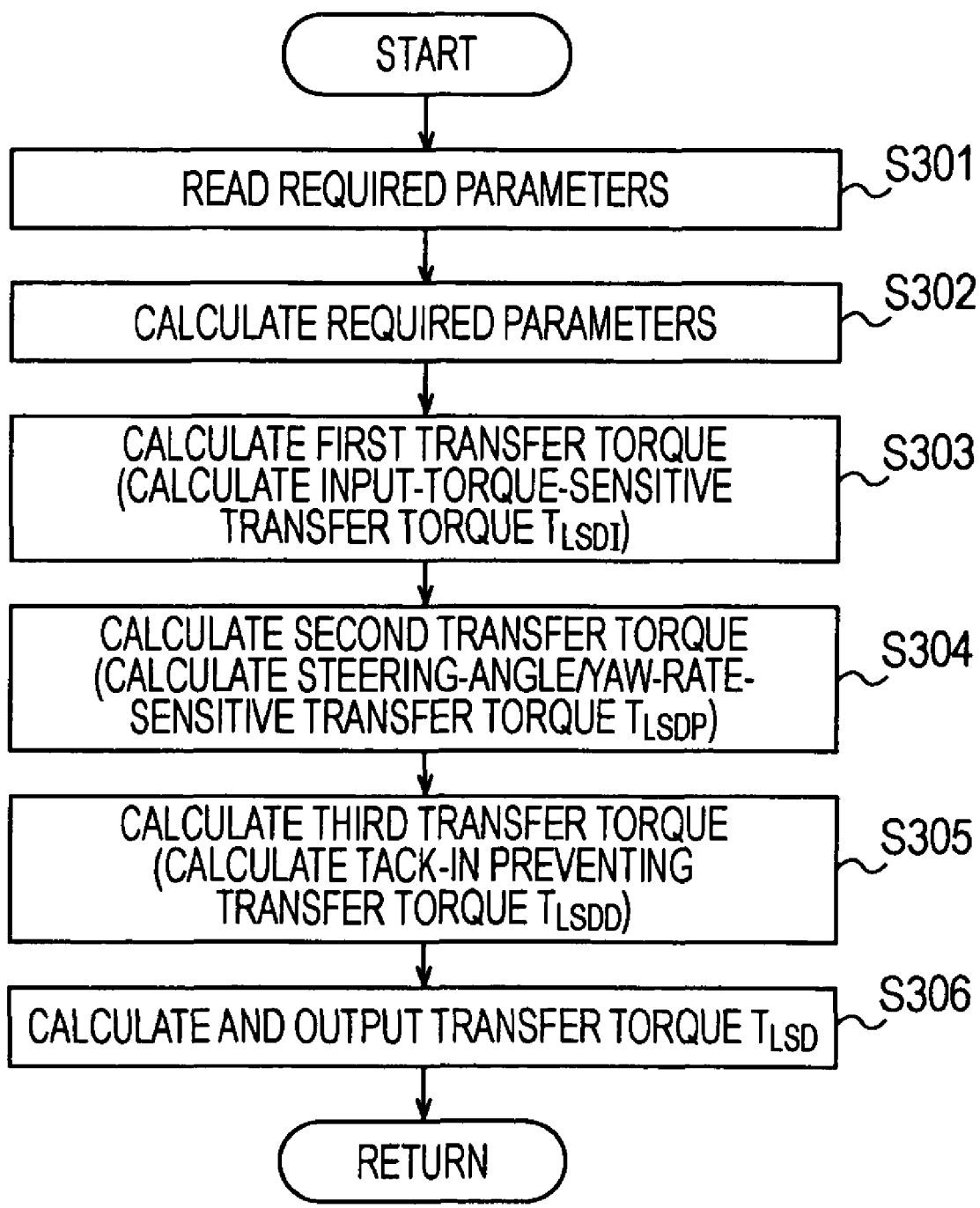
FIG. 16 is a flowchart showing a driving-force distribution control program.

FIG. 16 is a flowchart showing a driving-force distribution control program. First, in S301, required parameters, namely, wheel speeds $\omega fl$, $\omega fr$, $\omega rl$, and $\omega rr$ from the wheel-speed sensors 21fl, 21fr, 21rl, and 21rr, a steering wheel angle $\theta_H$ from the steering-wheel-angle sensor 22, an actual lateral acceleration $(d^2y/dt^2)$ from the lateral-acceleration sensor 23, an actual yaw rate γ from the yaw-rate sensor 24, an accelerator opening $\theta_{ACC}$ from the accelerator-opening sensor 25, an engine speed $N_e$ from the engine-speed sensor 26, an over torque $T_{over}$ from the traction control unit 20, and start signals from the side-slip prevention control unit 30 and the ABS 31, are read.

In S302, required parameters, such as a vehicle speed V from the vehicle-speed calculation unit 42, are calculated.

In S303, a first transfer torque is calculated, and an input-torque sensitive transfer torque $T_{LSDI}$ is calculated by the first transfer-torque calculation unit 43. Calculation of the input-torque sensitive transfer torque $T_{LSDI}$ will be described below with reference to FIG. 17 serving as a flowchart.

In S304, a second transfer torque is calculated, and a steering-angle/yaw-rate sensitive transfer torque $T_{LSDP}$ is calculated by the second transfer-torque calculation unit 44. Calculation of the steering-angle/yaw-rate sensitive transfer torque $T_{LSDP}$ will be described below with reference to FIG. 21 serving as a flowchart.

In S305, a third transfer torque is calculated, and a tack-in preventing transfer torque $T_{LSDD}$ is calculated by the third transfer-torque calculation unit 45. Calculation of the tack-in preventing transfer torque $T_{LSDD}$ will be described below with reference to FIG. 24 serving as a flowchart.

In S306, a transfer torque $T_{LSD}$ is calculated by the transfer-torque calculation unit 46 according to Expression (109) described above, and is output to the transfer-clutch driving unit 41. Then, the program is escaped.

Figure 17:
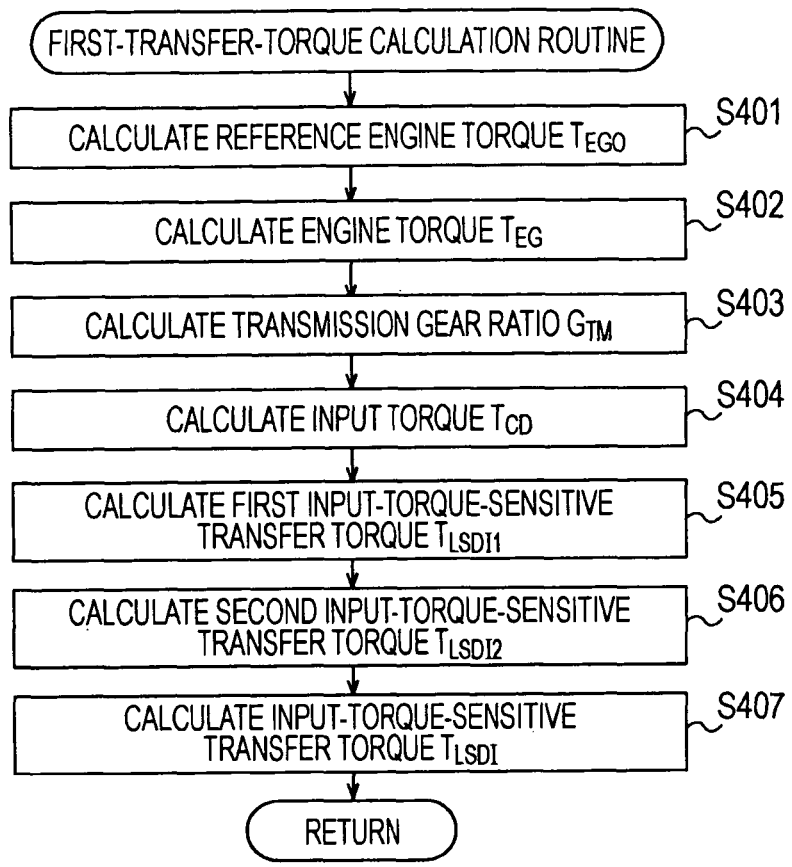
FIG. 17 is a flowchart showing a first-transfer-torque calculation routine.

FIG. 17 shows a first-transfer-torque calculation routine performed by the first transfer-torque calculation unit 43 in S303 described above. First, in S401, the reference-engine-torque calculation unit 51 finds an engine torque with reference to a preset map showing the engine characteristic, and calculates this engine torque as a reference engine torque $T_{EG0}$.

In S402, the engine-torque calculation unit 52 calculates an engine torque $T_{eg}$ according to Expression (67) or (68) described above. Calculation of the engine torque $T_{eg}$ will be described below with reference to FIG. 18 serving as a flowchart.

In S403, the transmission-gear-ratio calculation unit 53 calculates a transmission gear ratio $G_{TM}$ according to Expression (69) described above.

In S404, the input-torque calculation unit 54 calculates an input torque $T_{CD}$ according to Expression (70) described above.

In S405, the first input-torque sensitive transfer-torque calculation unit 55 calculates a first input-torque sensitive transfer torque $T_{LSDI1}$ according to any of Expressions (71) to (74) described above. The first input-torque sensitive transfer torque $T_{LSDI1}$ will be described below with reference to FIG. 19 serving as a flowchart.

In S406, the second input-torque sensitive transfer-torque calculation unit 56 calculates a second input-torque sensitive transfer torque $T_{LSDI2}$ according to any of Expressions (75) to (79) described above. The second input-torque sensitive transfer torque $T_{LSDI2}$ will be described below with reference to FIG. 20 serving as a flowchart.

In S407, the input-torque sensitive transfer-torque calculation unit 57 calculates an input-torque sensitive transfer torque $T_{LSDI}$ according to Expression (80) described above. Then, the routine is escaped.

Figure 18:
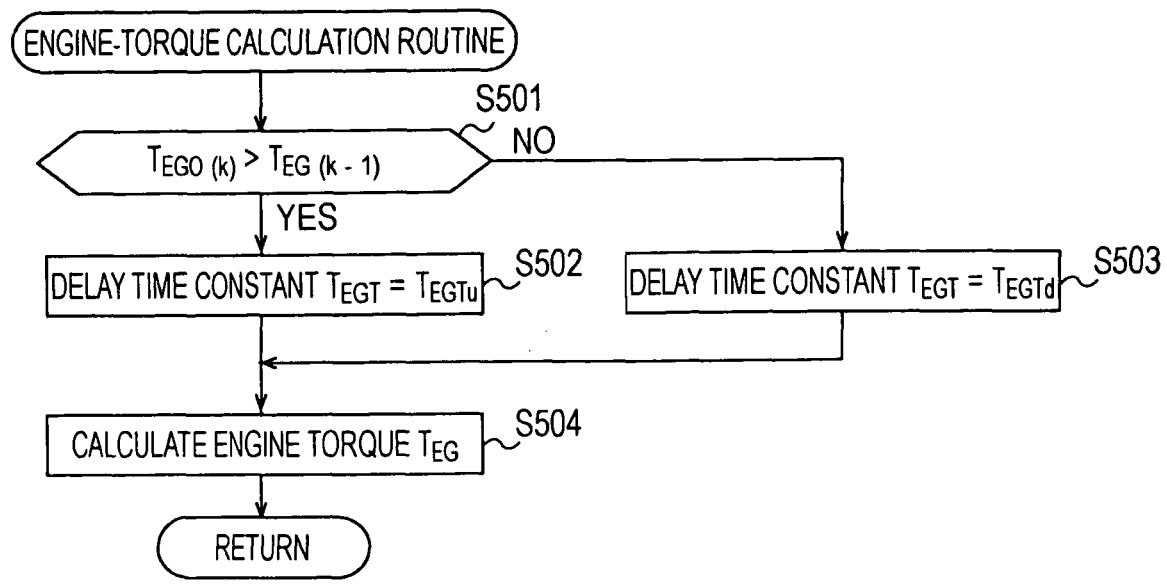
FIG. 18 is a flowchart showing an engine-torque calculation routine.

FIG. 18 shows an engine-torque calculation routine performed by the engine-torque calculation unit 52 in S402 described above. First, in S501, the current reference engine torque $T_{EG0}(k)$ is compared with the previous engine torque $T_{EG(k-1)}$.

As a result of comparison in S501, when $T_{EG0(k)} > T_{EG(k-1)}$ and it is determined that the engine torque is increasing, a delay time constant $T_{EGT}$ is set at a delay time constant $T_{EGTu}$ on the engine increase side (for example, 0.5) in S502. Then, in S504, an engine torque $T_{EG}$ is calculated according to the above Expression (67) using the delay time constant $T_{EGTu}$ on the engine increase side, and the routine is escaped.

As a result of comparison in S501, when $T_{EG0(k)} \leq T_{EG(k-1)}$ and it is determined that the engine torque is decreasing, a delay time constant $T_{EGT}$ is set at a delay time constant $T_{EGTd}$ on the engine decrease side (for example, 0.2) in S503. Then, in S504, an engine torque $T_{EG}$ is calculated according to the above Expression (68) using the delay time constant $T_{EGTd}$ on the engine decrease side, and the routine is escaped.

Figure 19:
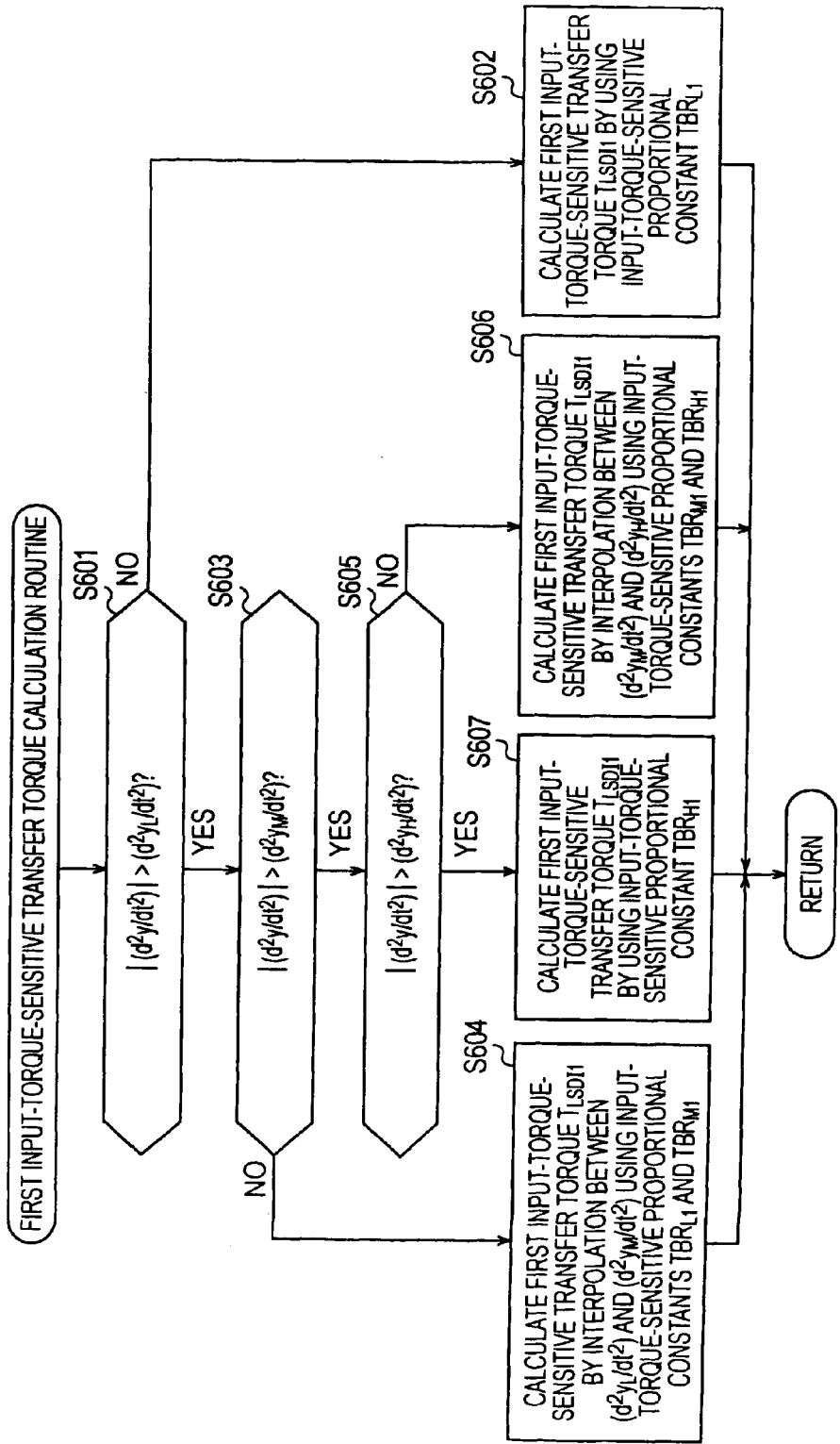
FIG. 19 is a flowchart showing a first-input-torque sensitive transfer-torque calculation routine.

FIG. 19 shows a first-input-torque sensitive transfer-torque calculation routine performed by the first input-torque sensitive transfer-torque calculation unit 55 in S405 described above. First, in S601, an actual lateral acceleration $(d^2y/dt^2)$ is compared with a constant $(d^2yL/dt2)$.

As a result of comparison in S601, when the actual lateral acceleration $(d^2y/dt^2)$ is less than or equal to the constant $(d^2yL/dt2)$ $((d^2y/dt^2) \leq (d^2yL/dt2))$, in S602, a first-input-torque sensitive transfer torque $T_{LSDI1}$ is calculated according to the above Expression (71) using the input-torque sensitive proportional constant $TBR_{L1}$. Then, the routine is escaped.

As a result of comparison in S601, when the actual lateral acceleration $(d^2y/dt^2)$ is more than the constant $(d^2yL/dt^2)$ $((d^2y/dt^2) > (d^2yL/dt^2))$, in S603, the actual lateral acceleration $(d^2y/dt^2)$ is compared with a constant $(d^2yM/dt^2)$ $(> (d^2yL/dt^2))$.

As a result of comparison in S603, when the actual lateral acceleration $(d^2y/dt^2)$ is less than or equal to the constant $(d^2yM/dt^2)$ $((d^2yL/dt^2) < (d^2y/dt^2) \leq (d^2yM/dt^2))$, in S604, a first-input-torque sensitive transfer torque $T_{LSDI1}$ is calculated by interpolation between $(d^2yL/dt^2)$ and $(d^2yM/dt^2)$ according to the above Expression (72) using the input-torque sensitive proportional constants $TBR_{L1}$ and $TBR_{M1}$. Then, the routine is escaped.

As a result of comparison in S603, when the actual lateral acceleration $(d^2y/dt^2)$ is more than the constant $(d^2yM/dt^2)$ $((d^2y/dt^2) > (d^2yM/dt^2))$, in S605, the actual lateral acceleration $(d^2y/dt^2)$ is compared with a constant $(d^2yH/dt^2)$ $(> (d^2yM/dt^2))$.

As a result of comparison in S605, when the actual lateral acceleration $(d^2y/dt^2)$ is less than or equal to the constant $(d^2yH/dt^2)$ $((d^2yM/dt^2) < (d^2y/dt^2) \leq (d^2yH/dt^2))$, in S606, a first-input-torque sensitive transfer torque $T_{LSDI1}$ is calculated by interpolation between $(d^2yM/dt^2)$ and $(d^2yH/dt^2)$ according to the above Expression (73) using the input-torque sensitive proportional constants $TBR_{M1}$ and $TBR_{H1}$. Then, the routine is escaped.

As a result of comparison in S605, when the actual lateral acceleration $(d^2y/dt^2)$ is more than the constant $(d^2yH/dt^2)$ $((d^2y/dt^2) > (d^2yH/dt^2))$, in S607, a first-input-torque sensitive transfer torque $T_{LSDI1}$ is calculated according to the above Expression (74) using the input-torque sensitive proportional constant $TBR_{H1}$. Then, the routine is escaped.

Figure 20:
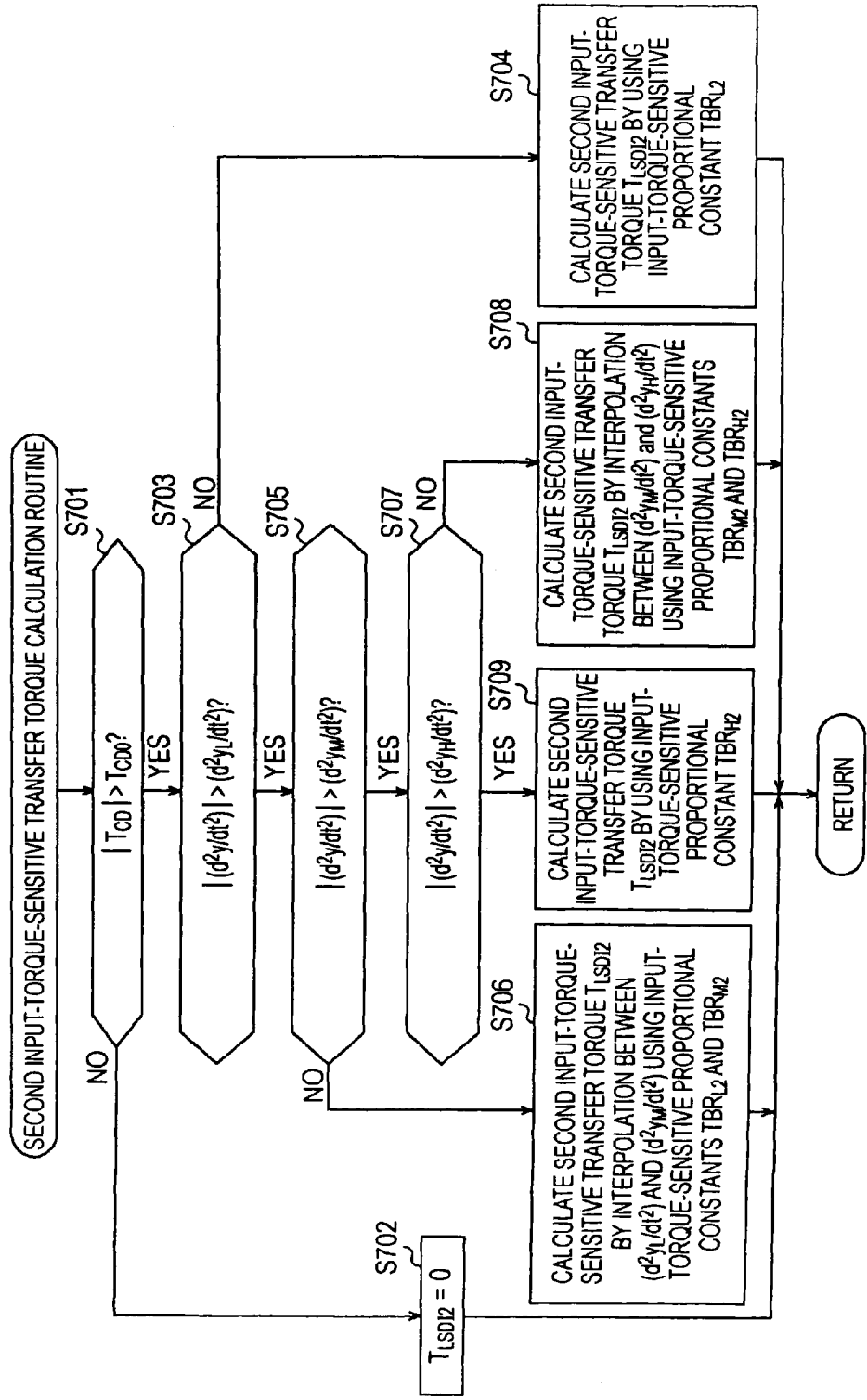
FIG. 20 is a flowchart showing a second-input-torque sensitive transfer-torque calculation routine.

FIG. 20 shows a second input-torque sensitive transfer-torque calculation routine performed by the second input-torque sensitive transfer-torque calculation unit 56 in S406 described above. First, in S701, an input torque $T_{CD}$ is compared with a preset constant $T_{CD0}$.

As a result of comparison in S701, when the input torque $T_{CD}$ is less than or equal to the preset constant $T_{CD0}$ $(T_{CD} \leq T_{CD0})$, in S702, $T_{LSDI2}$ is set at 0 according to Expression (75) described above, and the routine is escaped.

As a result of comparison in S701, when the input torque $T_{CD}$ is more than the preset constant $T_{CD0}$ $(T_{CD} > T_{CD0})$, the routine proceeds to S703 and subsequent steps.

In S703, an actual lateral acceleration $(d^2y/dt^2)$ is compared with a constant $(d^2yL/dt^2)$.

As a result of comparison in S703, when the actual lateral acceleration $(d^2y/dt^2)$ is less than or equal to the constant $(d^2yL/dt_2)$ $((d^2y/dt^2) \leq (d^2yL/dt^2))$, in S704, a second input-torque sensitive transfer torque $T_{LSDI2}$ is calculated according to the above Expression (76) using an input-torque-sensitive proportional constant $TBR_{L2}$, and then, the routine is escaped.

As a result of comparison in S703, when the actual lateral acceleration $(d^2y/dt^2)$ is more than the constant $(d^2yL/dt_2)$ $((d^2y/dt^2) > (d^2yL/dt^2))$, in S705, the actual lateral acceleration $(d^2y/dt^2)$ is compared with a constant $(d^2yM/dt^2)$ $(> (d^2yL/dt^2))$.

As a result of composition in S705, when the actual lateral acceleration $(d^2y/dt^2)$ is less than or equal to the constant $(d^2yM/dt^2)$ $((d^2yL/dt^2) < (d^2y/dt^2) \leq (d^2y/dt^2))$ in S706, a second input-torque sensitive transfer torque $T_{LSDI2}$ is calculated by interpolation between $(d^2yL/dt^2)$ and $(d^2yM/dt^2)$ according to the Expression (77) using input-torque-sensitive proportional constants $TBR_{L2}$ and $TBR_{M2}$.

As a result of composition in S705, when the actual lateral acceleration $(d^2y/dt^2)$ is more than the constant $(d^2yM/dt^2)$ $((d^2y/dt^2) > (d^2yM/dt^2))$, in S707, the actual lateral acceleration $(d^2y/dt^2)$ is compared with a constant $(d^2yH/dt^2)$ $(> (d^2yM/dt^2))$.

As a result of comparison in S707, when the actual lateral acceleration $(d^2y/dt^2)$ is less than or equal to the constant $(d^2yH/dt^2)$ $((d^2yM/dt^2) < (d^2y/dt^2) \leq (d^2yH/dt^2))$, in S708, a second input-torque sensitive transfer torque $T_{LSDI2}$ is calculated by interpolation between $(d^2yM/dt^2)$ and $(d^2yH/dt^2)$ according to the above Expression (78) using the input-torque sensitive proportional constants $TBR_{M2}$ and $TBR_{H2}$. Then, the routine is escaped.

As a result of comparison in S707, when the actual lateral acceleration $(d^2y/dt^2)$ is more than the constant $(d^2yH/dt^2)$ $((d^2y/dt^2)>(d^2yH/dt^2))$, in S709, a second input-torque sensitive transfer torque $T_{LSDl2}$ is calculated according to the above Expression (79) using the input-torque sensitive proportional constant $TBR_{H2}$. Then, the routine is escaped.

Figure 21:
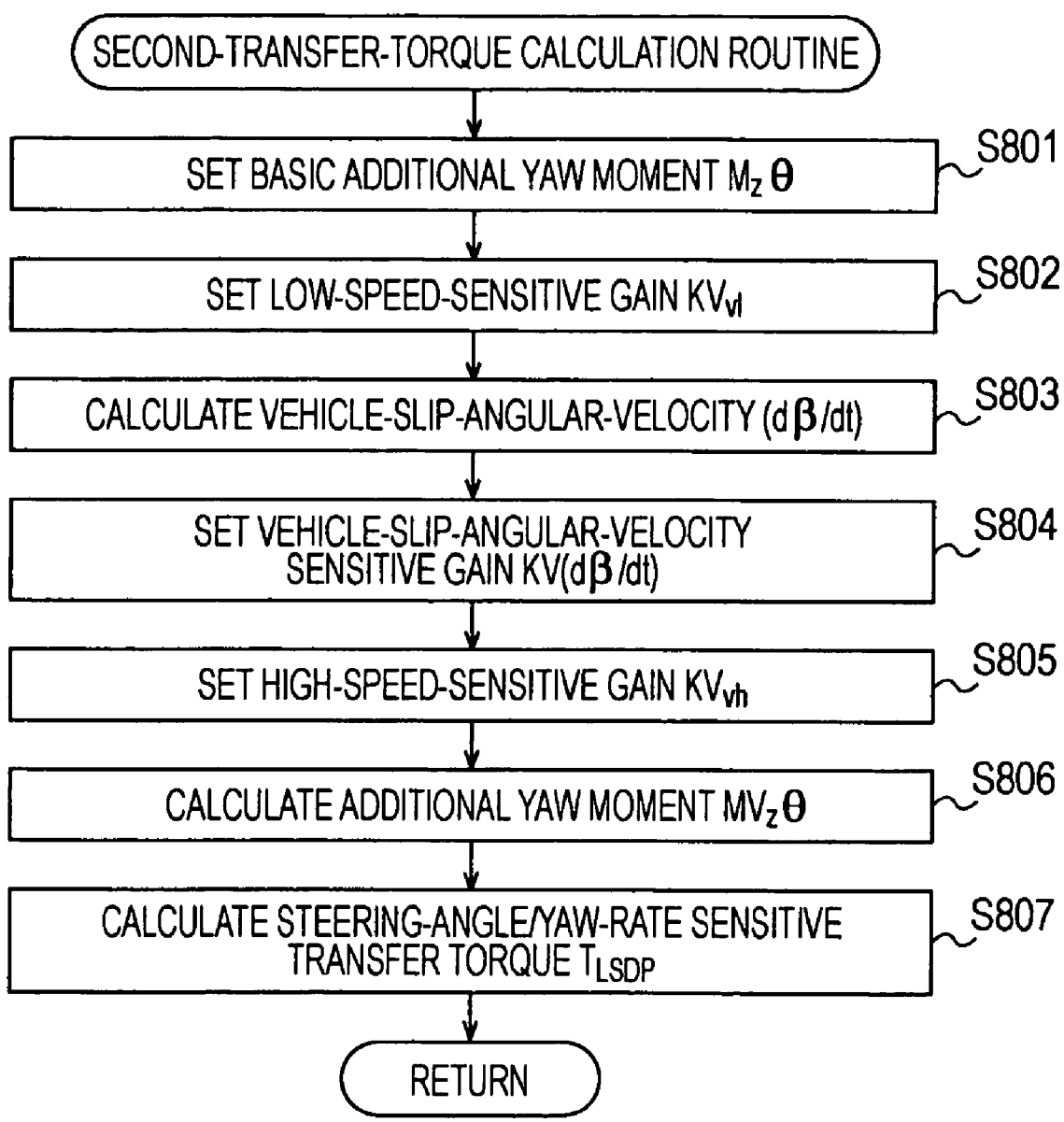
FIG. 21 is a flowchart showing a second-transfer-torque calculation routine.

FIG. 21 shows a second-transfer-torque calculation routine performed by the second transfer-torque calculation unit 44 in S304 described above. First, in S801, the basic-additional-yaw-moment setting unit 61 sets a basic additional yaw moment $M_Z\theta$. Setting of the basic additional yaw moment $M_Z\theta$ will be described below with reference to FIG. 22 serving as a flowchart.

In S802, the low-speed sensitive gain setting unit 62 sets a low-speed sensitive gain KVvl.

In S803, the vehicle-slip-angular-velocity calculation unit 63 calculates a vehicle slip angular velocity $(d\beta/dt)$ according to Expression (96) described above.

In S804, the vehicle-slip-angular-velocity sensitive gain setting unit 64 sets a vehicle-slip-angular-velocity sensitive gain $KV(d\beta/dt)$. Setting of the vehicle-slip-angular-velocity sensitive gain $KV(d\beta/dt)$ will be described below with reference to FIG. 23 serving as a flowchart.

In S805, the high-speed sensitive gain setting unit 65 sets a high-speed sensitive gain KVvh.

In S806, the steering-angle/yaw-rate sensitive transfer-torque calculation unit 66 calculates an additional yaw moment $MV_Z\theta$ according to Expression (104) described above. In S807, the steering-angle/yaw-rate sensitive transfer-torque calculation unit 66 calculates a steering-angle/yaw-rate sensitive transfer torque $T_{LSDP}$ according to Expression (105) or (106) described above. Then, the routine is escaped.

Figure 22:
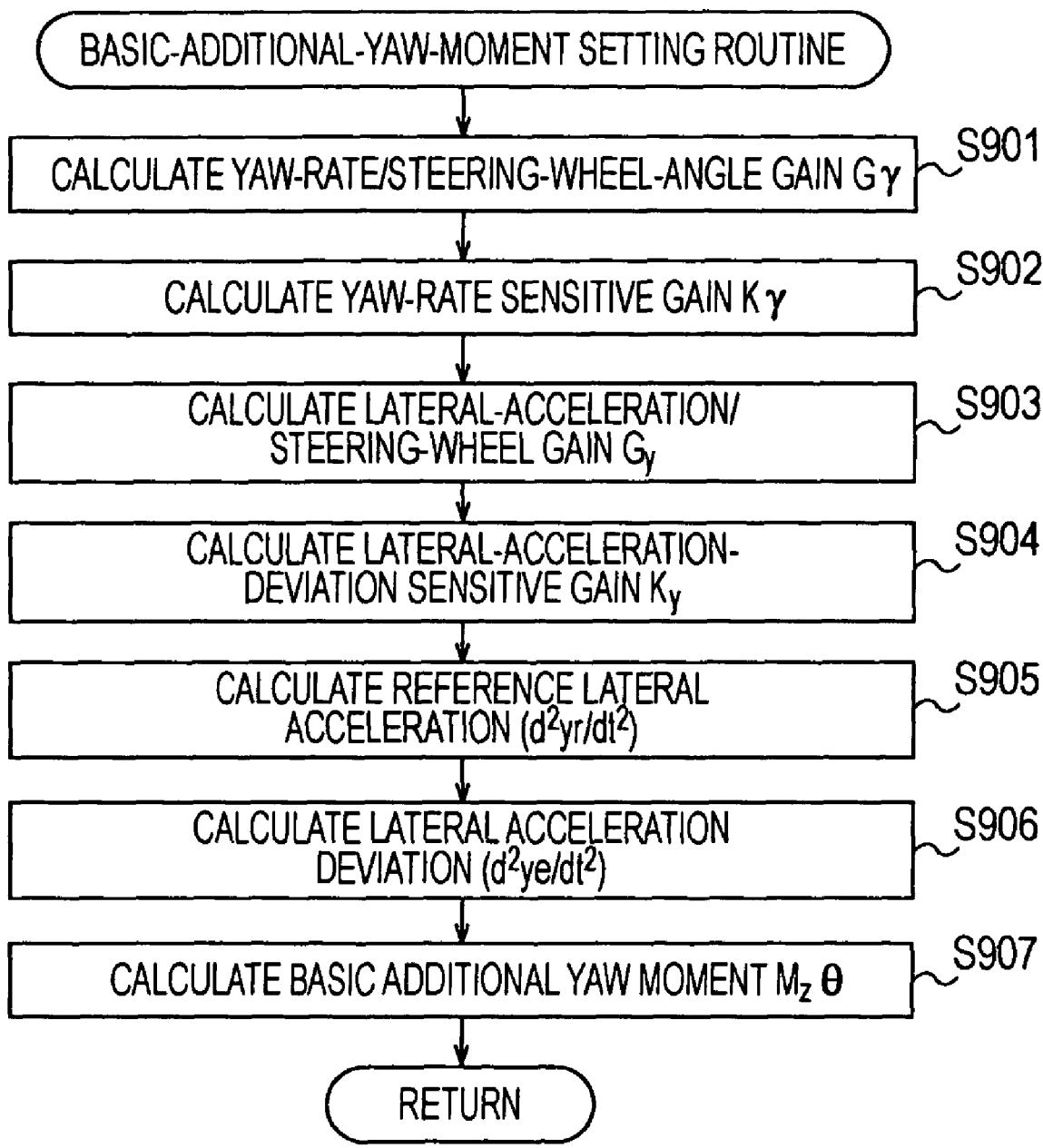
FIG. 22 is a flowchart showing a basic-additional-yaw-moment setting routine.

FIG. 22 shows a basic-additional-yaw-moment setting routine performed by the basic-additional-yaw-moment setting unit 61 in S801 described above. First, in S901, the yaw-rate/steering-wheel-angle gain calculation unit 73 calculates a yaw-rate/steering-wheel-angle gain $G\gamma$ according to Expression (83) described above.

In S902, the yaw-rate sensitive gain calculation unit 74 calculates a yaw-rate sensitive gain $K\gamma$ according to Expression (84) described above.

In S903, the lateral-acceleration/steering-wheel-angle gain calculation unit 71 calculates a lateral-acceleration/steering-wheel-angle gain Gy according to Expression (81) described above.

In S904, the lateral-acceleration-deviation sensitive gain calculation unit 72 calculates a lateral-acceleration-deviation sensitive gain Ky according to Expression (82) described above.

In S905, the reference-lateral-acceleration calculation unit 75 calculates a reference lateral acceleration $(d^2yr/dt^2)$ according to Expression (86) described above.

In S906, the lateral-acceleration-deviation calculation unit 76 calculates a lateral acceleration deviation $(d^2ye/dt^2)$ according to Expression (94) described above.

In S907, the basic-additional-yaw-moment calculation unit 77 calculates a basic additional yaw moment $M_Z\theta$ according to Expression (95) described above. Then, the routine is escaped.

Figure 23:
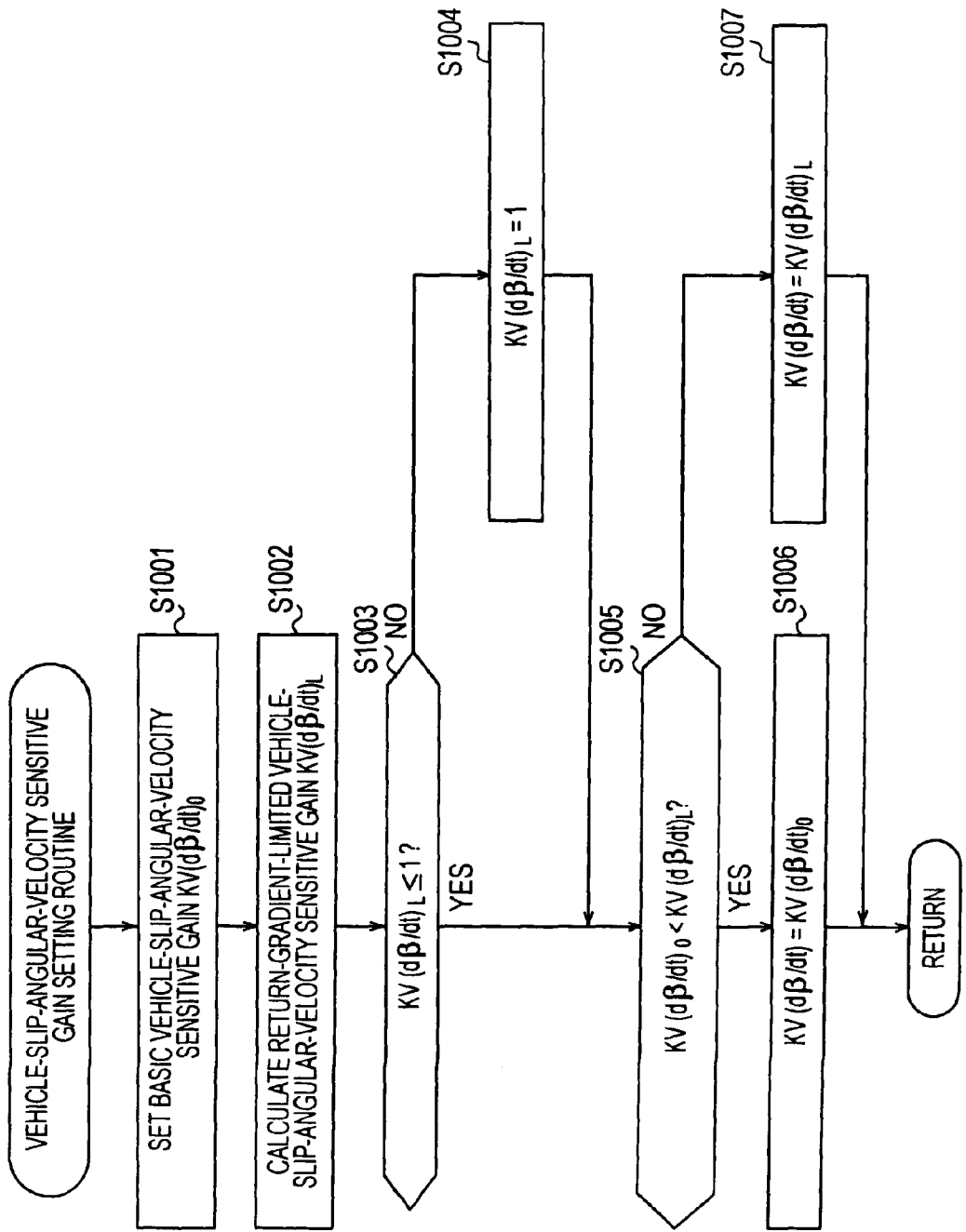
FIG. 23 is a flowchart showing a vehicle-slip-angular-velocity sensitive gain setting routine.

FIG. 23 shows a vehicle-slip-angular-velocity sensitive gain setting routine performed by the vehicle-slip-angular-velocity sensitive gain setting unit 64 in S804 described above. First, in S1001, a basic vehicle-slip-angular-velocity sensitive gain $KV(d\beta/dt)0$ is calculated, for example, with reference to a map shown in FIG. 29.

In S1002, a return-gradient-limited vehicle-slip-angular-velocity sensitive gain $KV(d\beta/dt)L$ is calculated according to Expression (97) described above.

In S1003, it is determined whether the return-gradient-limited vehicle-slip-angular-velocity sensitive gain $KV(d\beta/dt)L$ set in S1002 is less than or equal to 1. If so, the routine proceeds to S1005. In contrast, when the return-gradient-limited vehicle-slip-angular-velocity sensitive gain $KV(d\beta/dt)L$ is more than 1, it is set at 1 in S1004. Then, the routine proceeds to S1005.

In S1005, the basic vehicle-slip-angular-velocity sensitive gain $KV(d\beta/dt)0$ is compared with the return-gradient-limited vehicle-slip-angular-velocity sensitive gain $KV(d\beta/dt)L$. When the basic vehicle-slip-angular-velocity sensitive gain $KV(d\beta/dt)0$ is less than the return-gradient-limited vehicle-slip-angular-velocity sensitive gain $KV(d\beta/dt)L$, it is set as a vehicle-slip-angular-velocity sensitive gain $KV(d\beta/dt)$ in S1006. Then, the routine is escaped.

Conversely, when the basic vehicle-slip-angular-velocity sensitive gain $KV(d\beta/dt)0$ is more than or equal to the return-gradient-limited vehicle-slip-angular-velocity sensitive gain $KV(d\beta/dt)L$, the return-gradient-limited vehicle-slip-angular-velocity sensitive gain $KV(d\beta/dt)L$ is set as a vehicle-angular-velocity sensitive gain $KV(d\beta/dt)$. Then, the routine is escaped.

Figure 24:
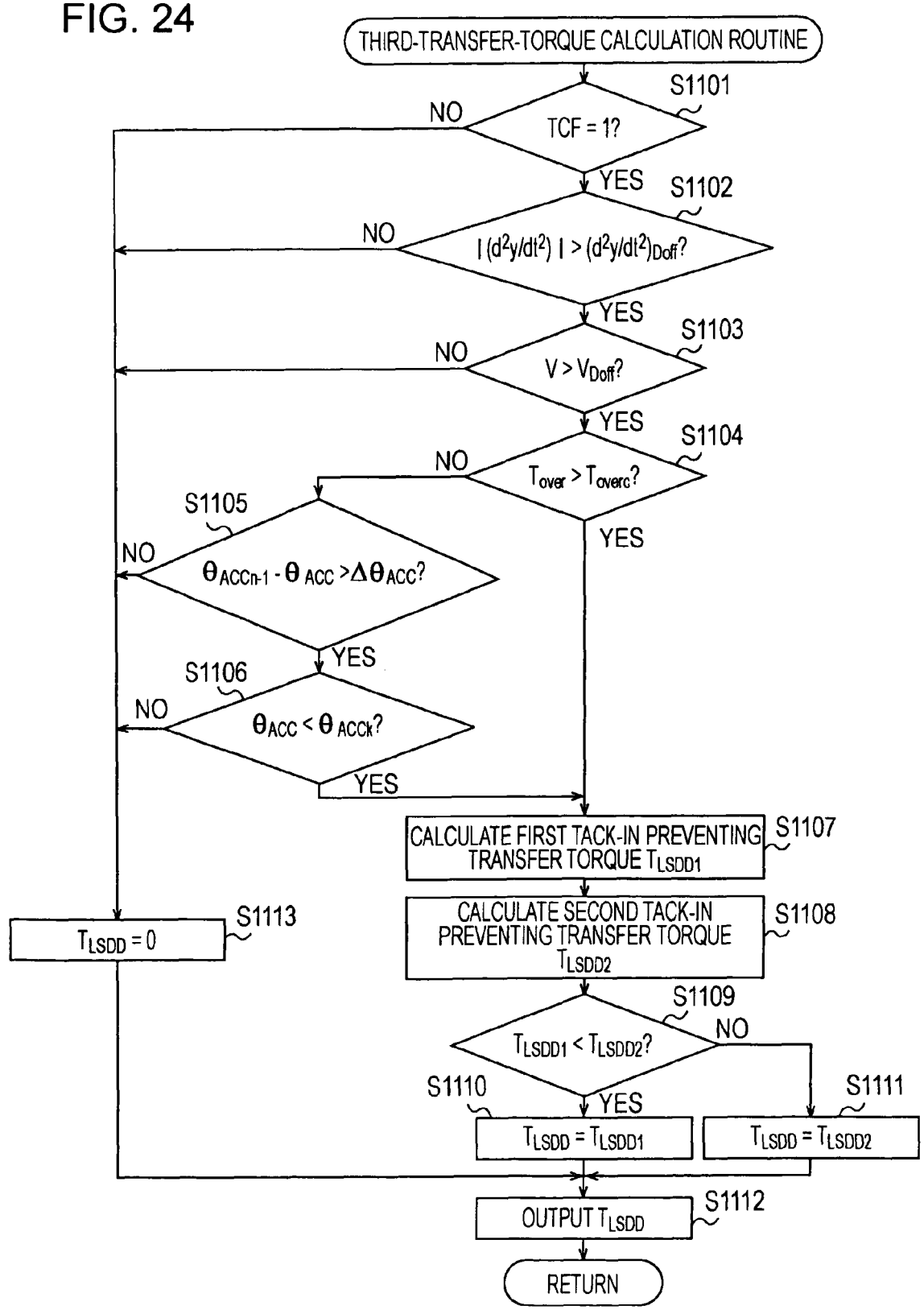
FIG. 24 is a flowchart showing a third-transfer-torque calculation routine.

FIG. 24 shows a third-transfer-torque calculation routine performed by the third transfer-torque calculation unit 45 in S305 described above. First, in S1101, it is determined whether a tack-in prevention control admission flag TCF, which is cleared (TCF=0) when at least one of the side-slip prevention control unit 30 and the ABS 31 is started, is set (TCF=1).

As a result of determination in S1101, when TCF=1 (that is, none of the side-slip prevention control unit 30 and the ABS 31 are started), it is determined in S1102 whether the absolute value $|(d^2y/dt^2)|$ of the actual lateral acceleration is more than a preset value $(d2y/dt2)Doff$ $(|(d^2y/dt^2)|>(d^2y/dt^2)Doff)$. When $|(d^2y/dt^2)|>(d^2y/dt^2)Doff$, it is determined in S1103 whether the vehicle speed V is more than a preset value VDoff (V>VDoff). When V>VDoff, the routine proceeds to S1104.

In S1104, it is determined whether an over torque $T_{over}$ serving as the amount of torque reduced by the traction control unit 20 is more than a set value $T_{overc}$ ($T_{over}>T_{overc}$). When $T_{over}>T_{overc}$, S1107 is performed to exert tack-in prevention control.

When $T_{over} \leq T_{overc}$, it is determined in S1105 whether a difference between the previous accelerator opening $\theta_{ACCn-1}$ and the current accelerator opening $\theta_{ACC}$ is more than $\Delta\theta_{ACC}$ (for example, 0) ($\theta_{ACCn-1} - \theta_{ACC} > \Delta\theta_{ACC}$) and the accelerator opening is greatly reduced. When $\theta_{ACCn-1} - \theta_{ACC} > \Delta\theta_{ACC}$, it is determined in S1106 whether the current accelerator opening $\theta_{ACC}$ is less than a preset value $\theta_{ACCk}$ (a value set beforehand through experiment and calculation: for example, 0) ($\theta_{ACC} < \theta_{ACCk}$).

When $\theta_{ACC} < \theta_{ACCk}$, S1107 is performed to exert tack-in prevention control.

When the routine proceeds from S1104 or S1106 to S1107, a first tack-in preventing transfer torque $T_{LSDD1}$ is calculated according to Expression (107) described above. In S1108, a second tack-in preventing transfer torque $T_{LSDD2}$ is calculated according to Expression (108) described above.

In S1109, the first tack-in preventing transfer torque $T_{LSDD1}$ and the second tack-in preventing transfer torque $T_{LSDD2}$ are compared.

As a result of comparison, when the first tack-in preventing transfer torque $T_{LSDD1}$ is less than the second tack-in preventing transfer torque $T_{LSDD2}$ ($T_{LSDD1} < T_{LSDD2}$), in S1110, the first tack-in preventing transfer torque $T_{LSDD1}$ is set as a transfer torque $T_{LSDD}$ to be added. In contrast, when the first tack-in preventing transfer torque $T_{LSDD1}$ is more than or equal to the second tack-in preventing transfer torque $T_{LSDD2}$ ($T_{LSDD1} \geq T_{LSDD2}$), in S1111, the second tack-in preventing transfer torque $T_{LSDD2}$ is set as a transfer torque $T_{LSDD}$ to be added.

In other words, a smaller transfer torque to be added (a value larger in a direction such as to increase the braking force on the front shaft side and to decrease the braking force on the rear shaft side) is set as a transfer torque $T_{LSDD}$ for tack-in prevention control.

In S1112, the set transfer torque $T_{LSDD}$ is output to the transfer-torque calculation unit 46, and then, the program is escaped.

When it is determined in S1101 that TCF=0 (that is, at least one of the side-slip prevention control unit 30 and the ABS 31 is started), when it is determined in S1102 that $|(d^2y/dt^2)| \leq (d^2y/dt^2)_{Doff}$, when it is determined in S1103 that $V \leq V_{Doff}$, when it is determined in S1105 that $\theta_{ACCn-1} - \theta_{ACC} \leq \Delta\theta_{ACC}$, or when it is determined in S1106 that $\theta_{ACC} \geq \theta_{ACCk}$, tack-in prevention control is not performed or is stopped in S1113. Then, the transfer torque $T_{LSDD}$ is set at 0, and the routine proceeds to S1112. In S1112, the set transfer torque $T_{LSDD}$ is output to the transfer-torque calculation unit 46, and the program is escaped.

As described above, according to this embodiment, a tack-in phenomenon can be effectively prevented by feed-forward control using the tack-in preventing transfer torque $T_{LSDD}$ from the third transfer-torque calculation unit 45.

In a case in which the absolute value $|(d^2y/dt^2)|$ of the actual lateral acceleration is more than the preset value $(d2y/dt2)_{Doff}$ and the vehicle speed V is more than the preset value $V_{Doff}$, not only when the accelerator opening is greatly reduced and the current accelerator opening becomes small, but also when the over torque $T_{over}$ serving as the amount of torque reduced by the traction control unit 20 is more than the preset value $T_{overc}$ (a value set beforehand through experiment and calculation), tack-in prevention control is carried out. Therefore, even when the throttle valve is controlled to be closed by traction control, a tack-in phenomenon can be reliably prevented and natural control can be performed without bringing discomfort.

Further, the first tack-in preventing transfer torque $T_{LSDD1}$ set in accordance with the actual lateral acceleration $(d^2y/dt^2)$ and the vehicle speed V is compared with the second tack-in preventing transfer torque $T_{LSDD2}$ set in accordance with the first tack-in preventing transfer torque $T_{LSDD1}$ and the over torque $T_{over}$. The smaller transfer torque to be added (a value larger in a direction such as to increase the braking force on the front shaft side and to decrease the braking force on the rear shaft side) is set as a transfer torque $T_{LSDD}$ when tack-in prevention control is admitted. Therefore, a spin tendency is reliably prevented, and control is performed on emphasis on stability.

When at least one of the side-slip prevention control unit 30 and the ABS 31 is started, tack-in prevention control is prohibited. Therefore, unnecessary interference with the control can be avoided.

While the FF-based four-wheel drive vehicle that does not have a center differential has been described as an example in the embodiment, the present invention is also applicable to four-wheel drive vehicles of other types. For example, in a four-wheel drive vehicle that has a center differential and the driving-force distribution ratio is high on the front wheel side, when tack-in prevention control is performed, the engaging force of the transfer clutch is reduced, the braking force on the front shaft side is increased, and the braking force on the rear shaft side is decreased so as to increase the lateral force, thus preventing a tack-in phenomenon. In tack-in prevention control over a FR-based four-wheel drive vehicle that does not have a center differential, when tack-in prevention control is performed, the engaging force of the transfer clutch is increased, the braking force on the front shaft side is increased, and the braking force on the rear shaft side is decreased so as to increase the lateral force, thus preventing a tack-in phenomenon.

While the tack-in prevention control is applied to the longitudinal driving-force distribution control device in this embodiment, the tack-in prevention control according to the present invention is also applicable to other vehicle-behavior control devices, for example, a technique of controlling the vehicle behavior by brake control, as disclosed in Japanese Unexamined Patent Application Publication No. 2000-52953, a technique of controlling the vehicle behavior by steering control, as disclosed in Japanese Unexamined Patent Application Publication No. 2003-159966, or a technique of controlling the vehicle behavior by engine control, as disclosed in Japanese Unexamined Patent Application Publication No. 2006-273102.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle tack-in prevention control device comprising:
   traction control means for preventing a slip of a driving wheel by reducing an over torque of a driving force calculated from a driving state of a vehicle; and
   tack-in prevention control means for performing tack-in prevention control when the vehicle is in a turning state and an accelerator opening is less than or equal to a predetermined value,
   wherein the tack-in prevention control means also performs the tack-in prevention control, regardless of the accelerator opening, when the vehicle is in the turning state and the traction control is started.

2. The vehicle tack-in prevention control device according to claim 1, wherein the tack-in prevention control means performs the tack-in prevention control when the traction control is started and when the over torque is more than a preset value.

3. The vehicle tack-in prevention control device according to claim 2,
   wherein the tack-in prevention control device includes a transfer clutch configured to variably control a driving force to a front wheel side and a rear wheel side, and
   wherein an engaging force of the transfer clutch is set in a direction to make a braking force on the rear wheel side smaller when the tack-in prevention control is performed than when the tack-in prevention control is not performed.

4. The vehicle tack-in prevention control device according to claim 3, wherein, when the traction control is started, the tack-in prevention control means compares a first engaging force of the transfer clutch set in accordance with the turning state and a vehicle speed with a second engaging force set in accordance with the first engaging force and the over torque amount, and sets either one of the first engaging force and the second engaging force that further decreases the braking force on the rear wheel side, as the engaging force of the transfer clutch for the tack-in prevention control.

5. The vehicle tack-in prevention control device according to claim 1,
   wherein the tack-in prevention control device includes a transfer clutch configured to variably control a driving force to a front wheel side and a rear wheel side, and
   wherein an engaging force of the transfer clutch is set in a direction to make a braking force on the rear wheel side smaller when the tack-in prevention control is performed than when the tack-in prevention control is not performed.

6. The vehicle tack-in prevention control device according to claim 5, wherein, when the traction control is started, the tack-in prevention control means compares a first engaging force of the transfer clutch set in accordance with the turning state and a vehicle speed with a second engaging force set in accordance with the first engaging force and the over torque amount, and sets either one of the first engaging force and the second engaging force that further decreases the braking force on the rear wheel side, as the engaging force of the transfer clutch for the tack-in prevention control.

7. The vehicle tack-in prevention control device according to claim 1, further comprising at least one of:
   side-slip prevention control means for preventing a side slip of the vehicle by selecting a wheel in accordance with a driving state of the vehicle and applying a braking force to the selected wheel so as to generate a yaw moment in the vehicle; and
   anti-lock brake control means for preventing the wheel from being locked by controlling the braking force during braking,
   wherein the tack-in prevention control means prohibits the tack-in prevention control when at least one of the side-slip prevention control means and the anti-lock brake control means is started even when the traction control is started.

* * * * *